US008938532B2

(12) United States Patent (10) Patent No.: US 8,938,532 B2
Terrell et al. (45) Date of Patent: Jan. 20, 2015

(54) METHODS, SYSTEMS, AND COMPUTER PROGRAM PRODUCTS FOR NETWORK SERVER PERFORMANCE ANOMALY DETECTION

(75) Inventors: Jeffrey Terrell, Durham, NC (US); Kevin Jeffay, Chapel Hill, NC (US); Frank Donelson Smith, Chapel Hill, NC (US); Robert Broadhurst, Carrboro, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 411 days.

(21) Appl. No.: 13/145,850

(22) PCT Filed: Apr. 8, 2010

(86) PCT No.: PCT/US2010/030428
§ 371 (c)(1),
(2), (4) Date: Sep. 2, 2011

(87) PCT Pub. No.: WO2010/118255
PCT Pub. Date: Oct. 14, 2010

(65) Prior Publication Data
US 2012/0278477 A1 Nov. 1, 2012

Related U.S. Application Data

(60) Provisional application No. 61/167,819, filed on Apr. 8, 2009.

(51) Int. Cl.
*G06F 15/173* (2006.01)
*H04L 12/24* (2006.01)
(Continued)

(52) U.S. Cl.
CPC ........ *H04L 41/5009* (2013.01); *H04L 43/0864* (2013.01); *H04L 69/16* (2013.01); *H04L 69/22* (2013.01); *H04L 43/16* (2013.01)
USPC ....................................... 709/224

(58) Field of Classification Search
CPC ................................. H04L 41/5009

USPC ............ 709/203, 224; 370/389, 252; 726/22; 702/186
See application file for complete search history.

(56) References Cited

U.S. PATENT DOCUMENTS 6,597,661 B1 7/2003 Bonn
7,370,357 B2 5/2008 Sekar
(Continued)

FOREIGN PATENT DOCUMENTS

KR 10-2008-0063952 A 7/2008

OTHER PUBLICATIONS

Notification of Transmittal of the International Search Report and the Written Opinion of the International Searching Authority, or the Declaration for International Application No. PCT/US2010/030428 (Oct. 25, 2010).

(Continued)

*Primary Examiner* — Jungwon Chang
(74) *Attorney, Agent, or Firm* — Jenkins, Wilson, Taylor & Hunt, P.A.

(57) ABSTRACT

Methods, systems, and computer readable media for network server performance anomaly detection are disclosed. According to one aspect of the subject matter disclosed, a method is disclosed for real-time computation of an endpoint performance measure based on transport and network layer header information. The method includes passively collecting transport and network layer header information from packet traffic in a network. Connections in the network are modeled using an abstract syntax for characterizing a sequence of application-level bidirectional interactions between endpoints of each connection and delays between the interactions. Application-level characteristics of the packet traffic are determined based on the modeled connections. A performance measure of at least one endpoint is computed based on the application-level characteristics and the modeled connections.

20 Claims, 17 Drawing Sheets

(51) Int. Cl.
*H04L 12/26* (2006.01)
*H04L 29/06* (2006.01)

(56) References Cited

U.S. PATENT DOCUMENTS

| | | | |
|---|---|---|---|
| 7,447,209 | B2 | 11/2008 | Jeffay et al. |
| 2002/0141393 | A1 | 10/2002 | Eriksson et al. |
| 2003/0086425 | A1 | 5/2003 | Bearden et al. |
| 2003/0088664 | A1 | 5/2003 | Hannel et al. |
| 2003/0179777 | A1 | 9/2003 | Denton et al. |
| 2004/0117474 | A1 | 6/2004 | Ginkel et al. |
| 2004/0240387 | A1 | 12/2004 | Nuzman et al. |
| 2005/0107985 | A1* | 5/2005 | Agrawal et al. ............... 702/186 |
| 2006/0083231 | A1* | 4/2006 | Jeffay et al. .................... 370/389 |
| 2006/0239273 | A1 | 10/2006 | Buckman et al. |
| 2007/0169192 | A1* | 7/2007 | Main et al. ....................... 726/22 |
| 2009/0161569 | A1* | 6/2009 | Corlett ........................... 370/252 |
| 2009/0164626 | A1* | 6/2009 | Roll et al. ...................... 709/224 |
| 2009/0287768 | A1* | 11/2009 | Tanaka ........................... 709/203 |

OTHER PUBLICATIONS

Notice of Allowance and Fee(s) Due for U.S. Appl. No. 11/075,992 (Jun. 30 2008).

Non-Final Official Action for U.S. Appl. No. 11/075,992 (Feb. 5, 2008).

Broadhurst, "Compact Appearance in Object Populations Using Quantile Function Based Distribution Families," Ph.D. disseration, Dept. of Computer Science, UNC Chapel Hill (2008).

Notification of Transmittal of the International Search Report and the Written Opinion of the International Searching Authority, or the Declaration for International Application No. PCT/US05/07718 (Jun. 11, 2007).

Zhang et al., "An Approach to Detect Executable Content for Anomaly Based Network Intrustion Detection," IEEE International Parallel and Distributed Processing Symposium, pp. i-8 (Mar. 30, 2007).

Hernandez-Campos et al., "Modeling and Generation of TCP Application Workloads," in Proc. IEEE Int'l Conf. on Broadband Communications, Networks, and Systems (2007).

Bahl et al., "Towards highly reliable enterprise network services via inference of multi-level dependencies," SIGCOMM '07: Proceedings of the 2007 conference on Applications, technologies, architectures, and protocols for computer communications, pp. 13-24, New York, NY, USA, ACM Press (2007).

Hernandez-Campos, "Generation and Validation of Empirically-Derived TCP Application Workloads," Ph.D. dissertation, Dept. of Computer Science, UNC Chapel Hill (2006).

Weigle et al., "Tmix: a tool for generating realistic TCP application workloads in ns-2," in ACM SIGCOMM CCR, vol. 36, No. 3, pp. 65-76 (2006).

Olshefski et al., "Understanding the management of client perceived response time," in ACM SIGMETRICS Performance Evaluation Review, pp. 240-251 (2006).

Viswanath et al., "Realistic and responsive network traffic generations," SIGCOMM '06: Proceedings of the 2006 conference on Applications, technologies, architectures, and protocols for computer communications, pp. 111-122, New York, NY, USA, ACM (2006).

Hussain et al., "Experience with a continuous network tracing infrastructure," Proc. SIGCOMM MineNet, pp. 185-190 (2005).

Hernandez-Campos et al., "Generating Realistic TCP Workoads," Proceedings of the Computer Measurement Group's International Conference, pp. 1-12 (Dec. 2004).

Hernandez-Campos et al., "How 'Real' Can Synthetic Network Traffice Be?," ACM SIGCOMM '04, pp. 1-20 (Aug. 2004).

Jeffay "How 'Real' Can Synthetic Network Traffic Be?" colloquium presented at the University of Virgina, pp. 1-2 (Mar. 15, 2004).

Olshefski et al., "Using certes to infer client response time at the web server," ACM Trans. Comput. Syst., 22(1):49-93 (Feb. 2004).

Oloshefski et al., "ksniffer: determining the remote client perceived response time from live packet streams," in Proc. OSDI, pp. 333-346 (2004).

Malan et al., "An extensible probe architecture for network protocol performance measurement," Software—Practive and Experience 2004: 34:47-67 (Published Online Nov. 26, 2003).

Grant Proposal, NSF Proposal No. 0323648 funded Jul. 1, 2003.

Hernandex-Campos et al., "Statistical Clustering of Internet Communication Patterns," Proceedings of the 35th Symposium on the Interface of Computing Science and Statistics, pp. 1-16 (Jul. 2003).

Estan et al., "Automatically inferring patterns of resouce consumption in network traffic," SIGCOMM '03: Proceedings of the 2003 conference on Applications, technologies, architectures, and protocols for computer communications, pp. 137-148, New York, NY, USA, ACM Press (2003).

Fu et al., "Ete: Passive end-to-end internet service performance monitoring," ATEC '02: Proceeedings of the General Track of the annual conference on USENIX Annual Technical Conference, pp. 115-130, Berkeley, CA, USA, USENIX Association (2002).

Lan et al., "Rapid model parameterization from traffic meausrement," ACM Trans. Model. Comput. Simul., 12(3):201-229, (Aug. 1, 2002).

Cho et al., "Aguri: An aggregation-based traffic profiler," COST 263: Proceedings of the Second International Workshop on Quality of Future Internet Services, pp. 222-242, London, US, Springer-Verlag (2001).

Fraleigh et al., "Design and Deployment of a Passive Monitoring Infrastructure," Lecture Notes in Computer Science, 2170:556-567 (2001).

Gilbert et al., "Quicksand: Quick summary and analysis of network data," DIMACS technical report (Nov. 2001).

Smith et al., "What TCP/IP Protocol Headers Can Tell us About the Web," Proceedings of ACM SIGMETRICS 2001/Performance 2001, pp. 1-12 (Jun. 2001).

Plonka, "Flowscan: A network traffic flow reporting and visualization too," LISA '00: Proceedings of the 14th USENIX conference on System administration, pp. 305-318, Berkeley, CA, USA, USENIX Association (2000).

Feldmann, "BLT: Bi-Layer Tracing of HTTP and TCP/IP," in Proc. of WWW-9 (2000).

Paxson, "Bro: A system for detecting network intruders in real-time," Computer Networks 31(23-24), pp. 2435-2463 (1999).

Barford et al., "Generating representative web workloads for network and server performance evaluation," ACM SIGMETRICS Performance Evaluation Review, pp. 151-160 (1998).

Shannon, "A mathematical theory of communication," Bell System Technical Journal, 27:379-423,623-656, Jul. (Oct. 1948).

* cited by examiner

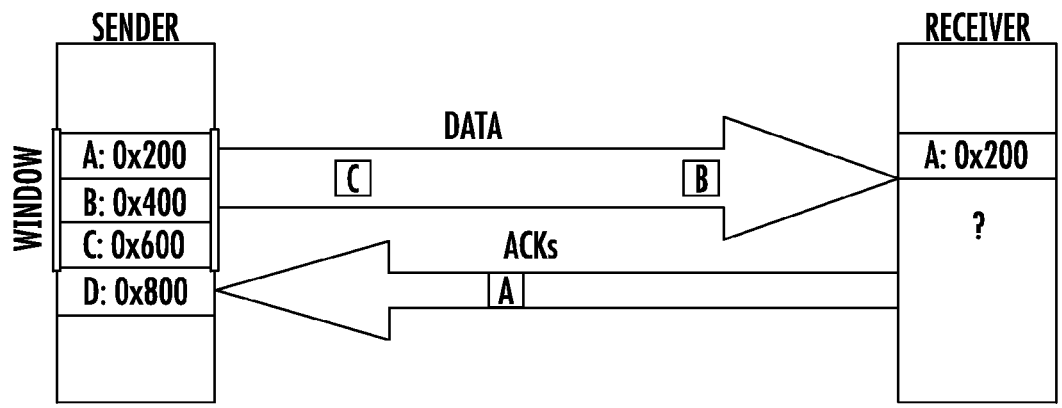
FIG. 2.1(A)
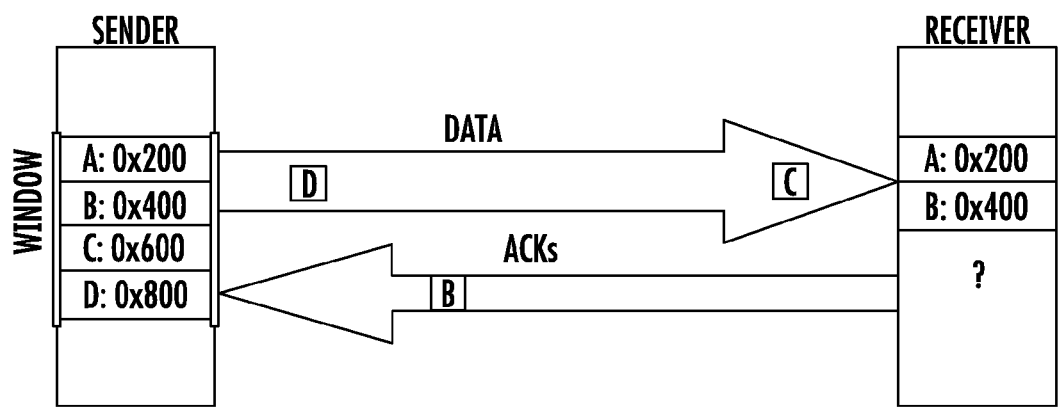
FIG. 2.1(B)

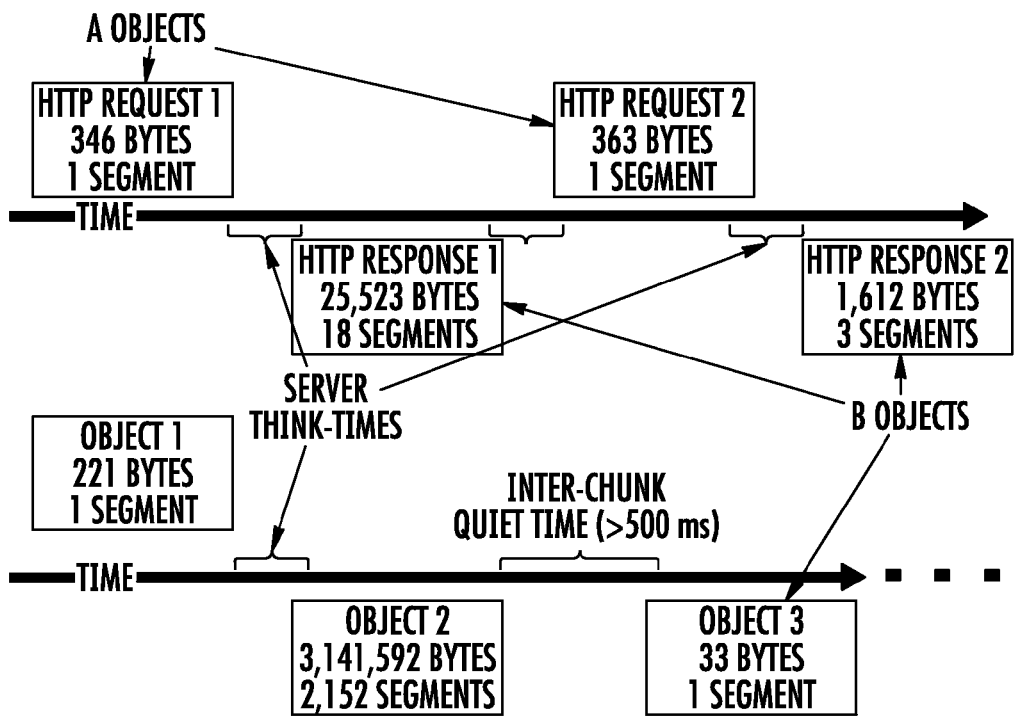
FIG. 2.2
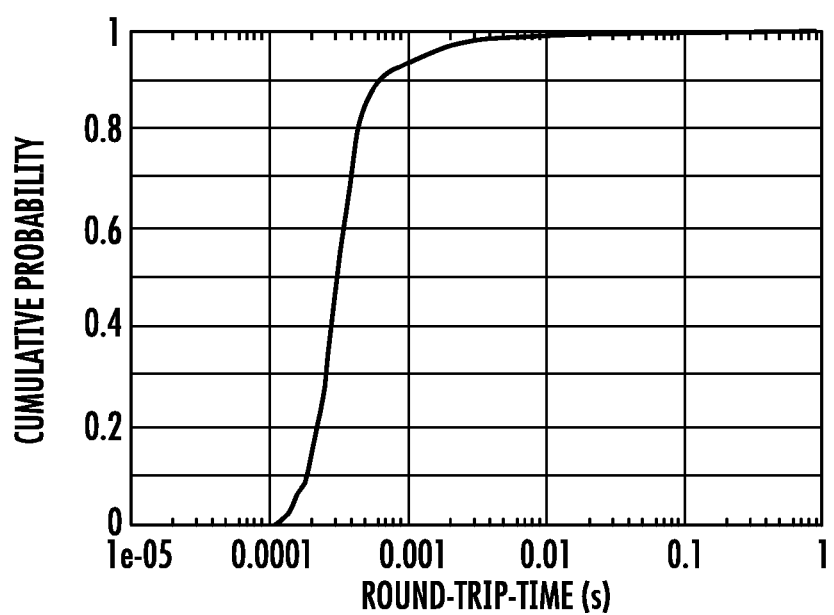
FIG. 3.3

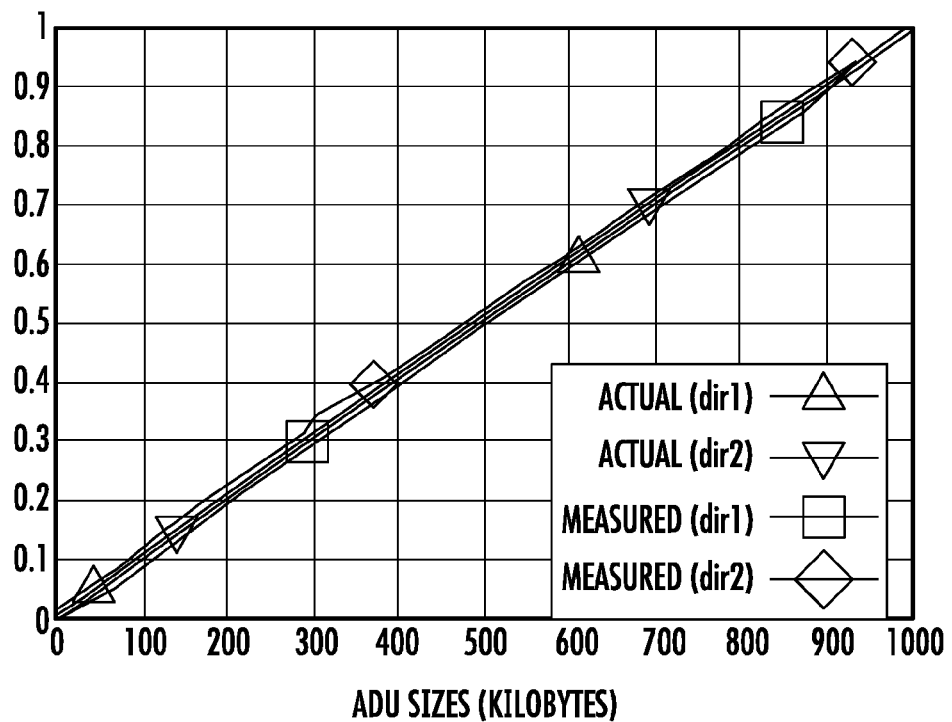
FIG. 3.4(A)
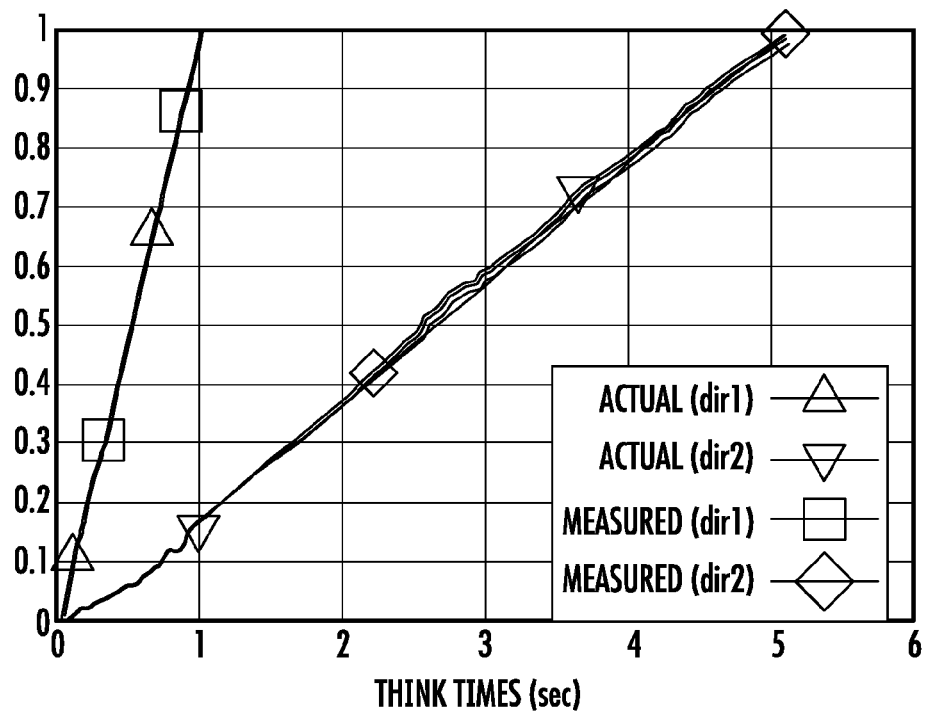
FIG. 3.4(B)

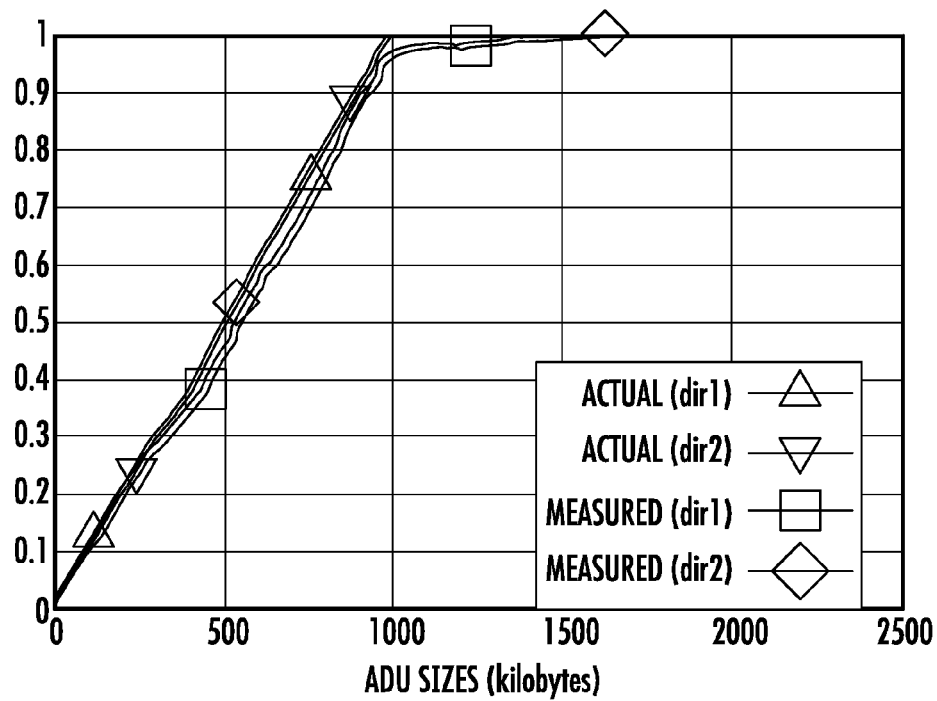
FIG. 3.5(A)
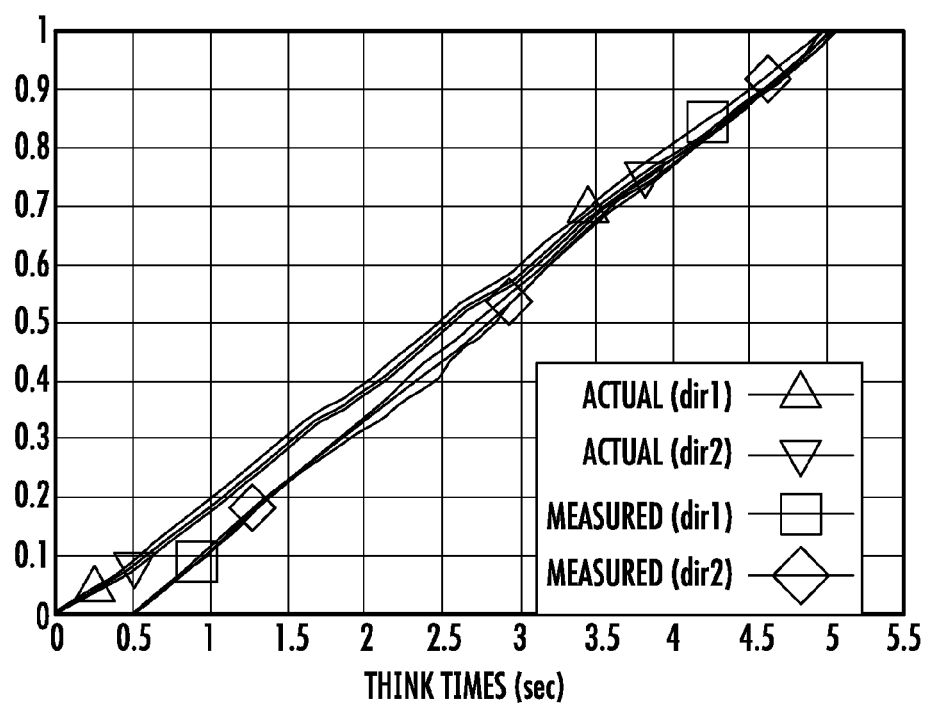
FIG. 3.5(B)

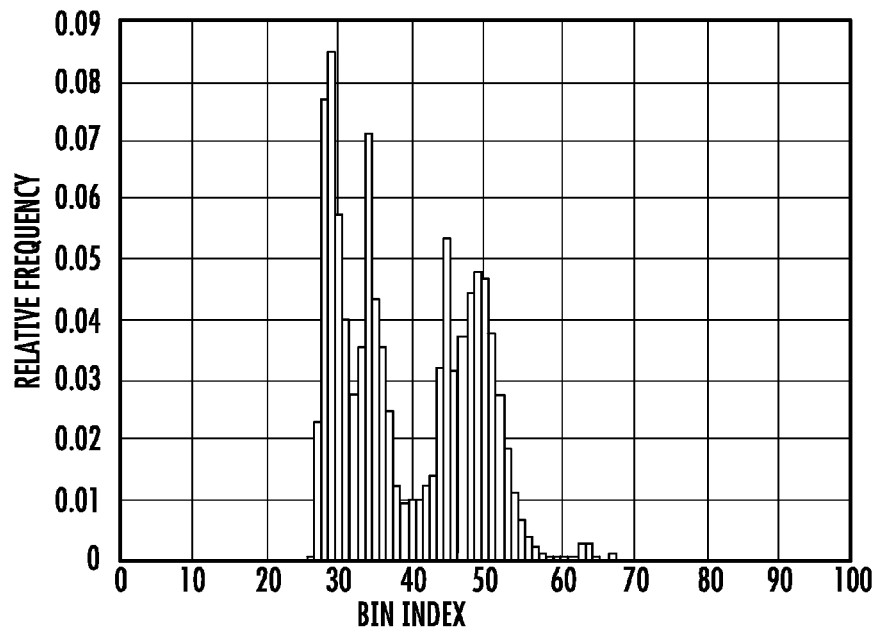
FIG. 4.1
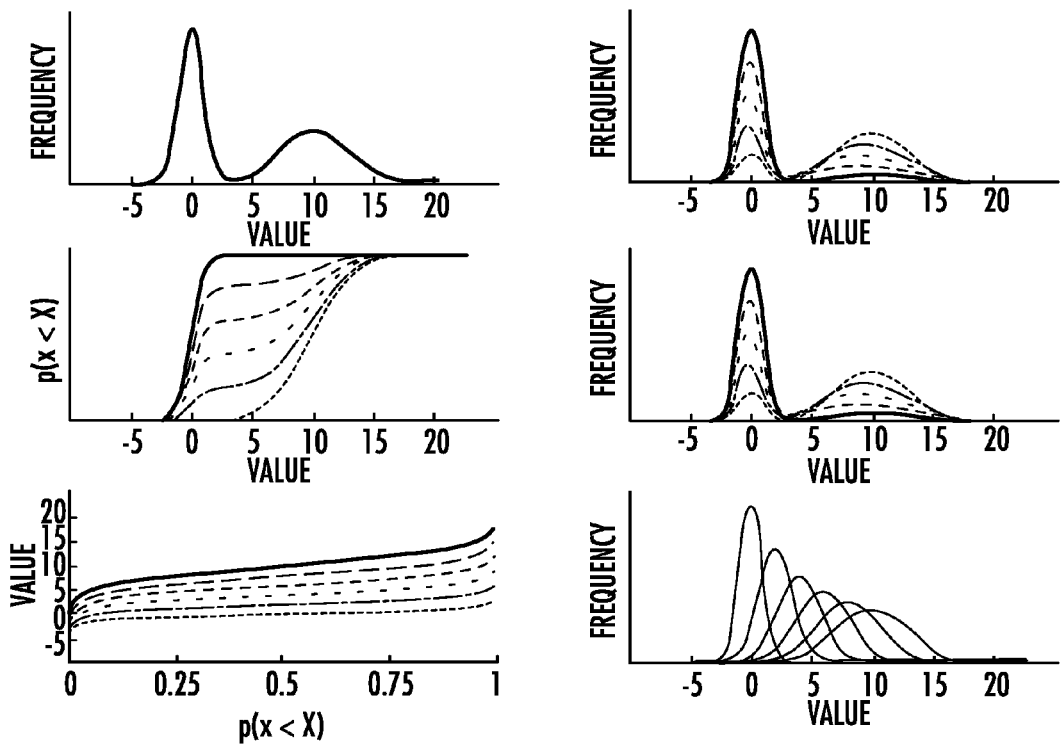
FIG. 4.2

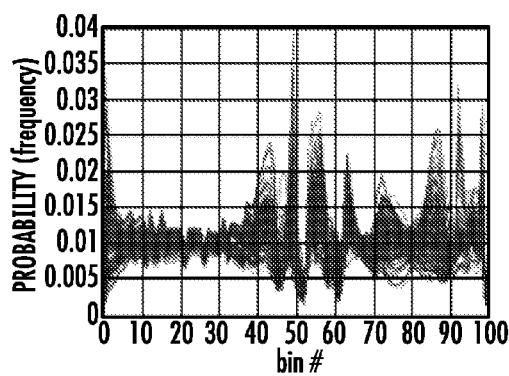
FIG. 4.3(A)
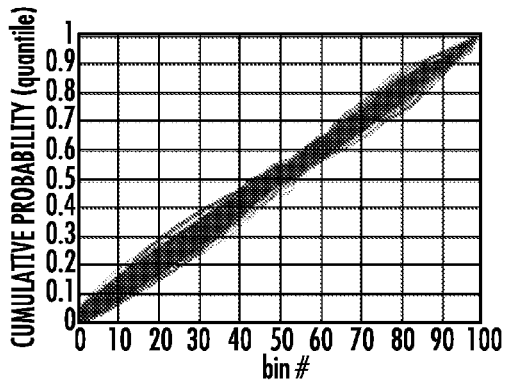
FIG. 4.3(B)
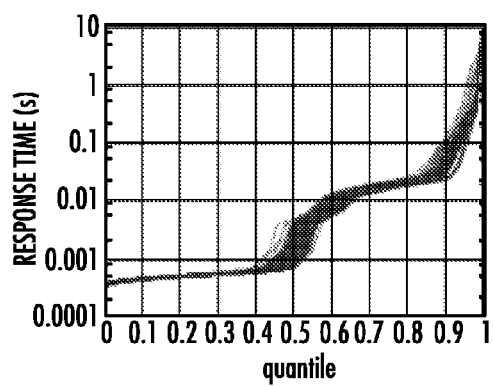
FIG. 4.4(A)
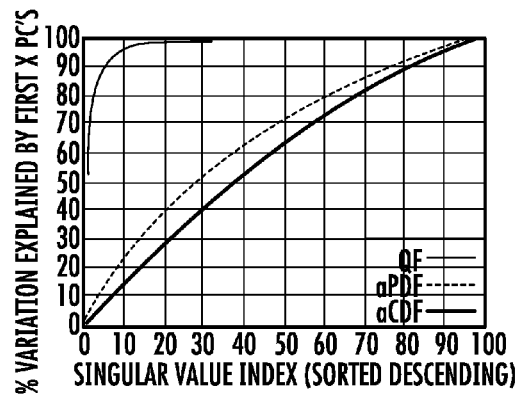
FIG. 4.4(B)

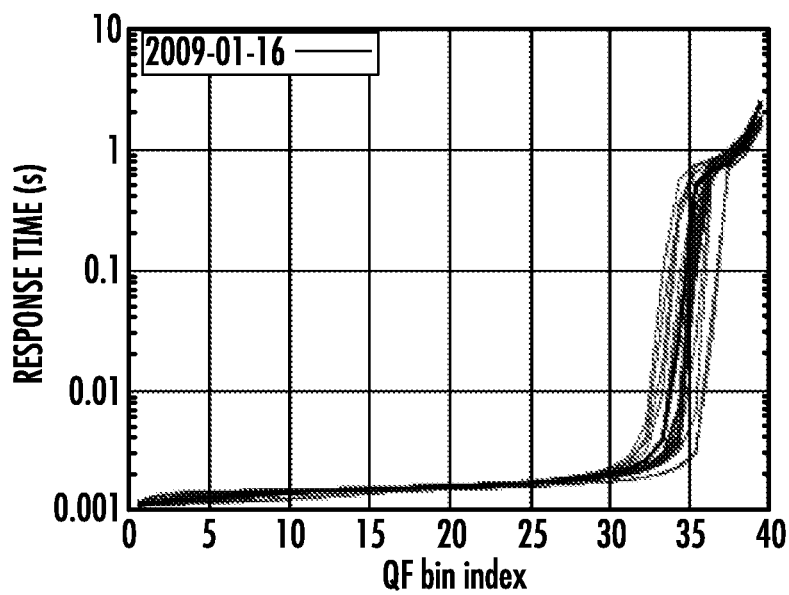
FIG. 4.5
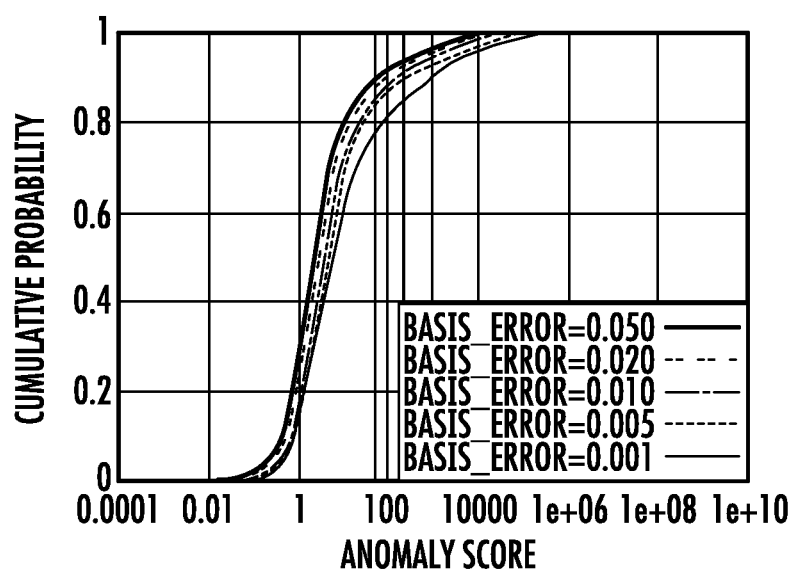
FIG. 4.17

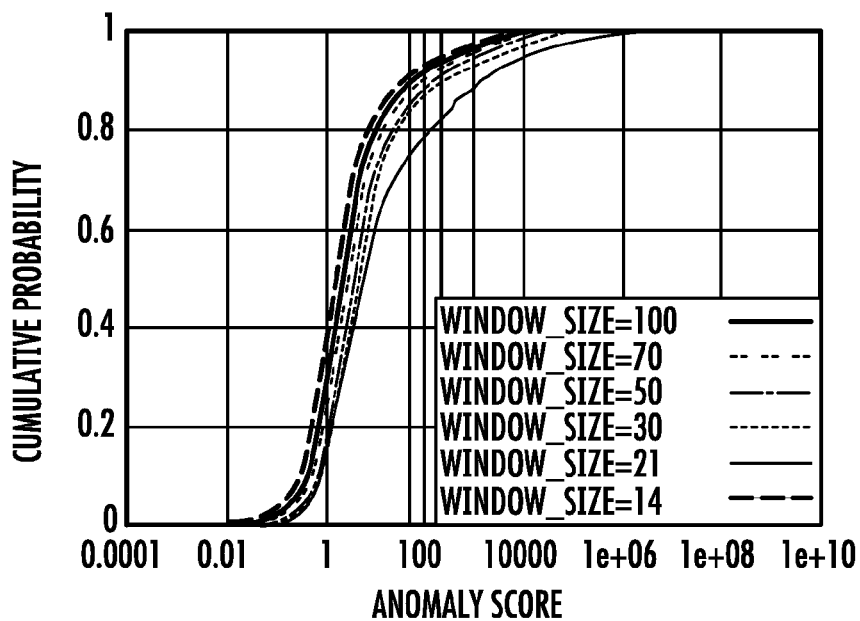
FIG. 4.18
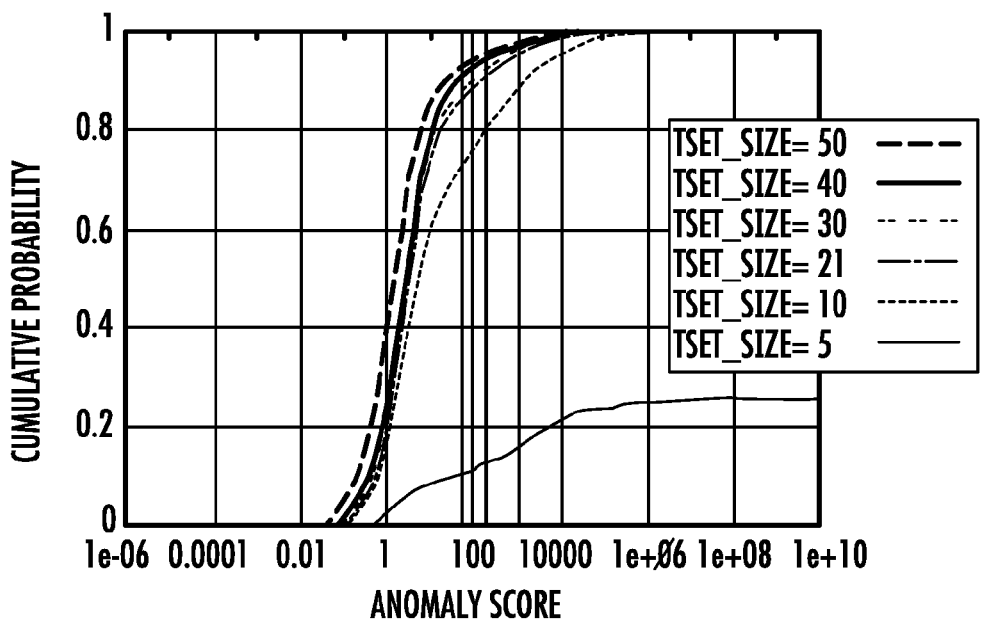
FIG. 4.19

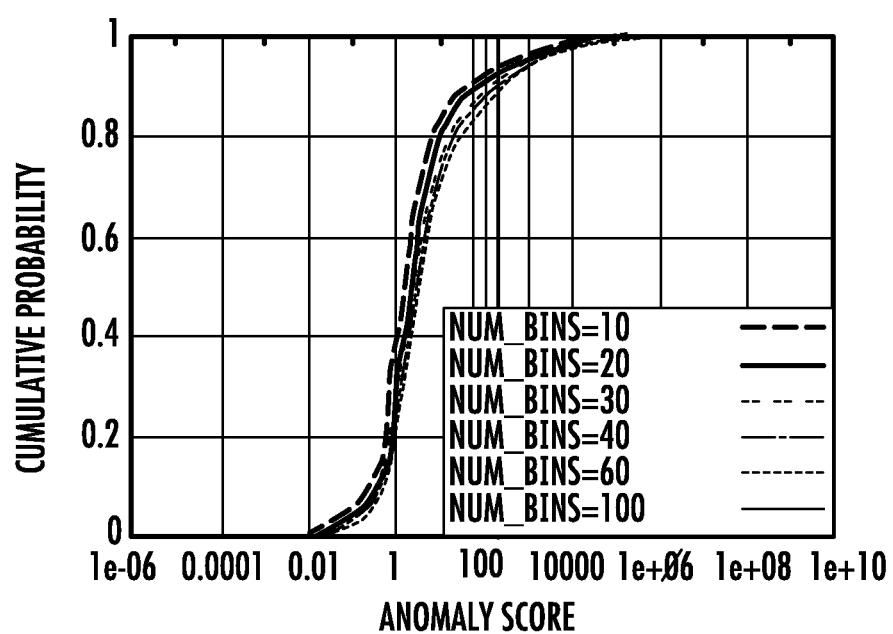
FIG. 4.20

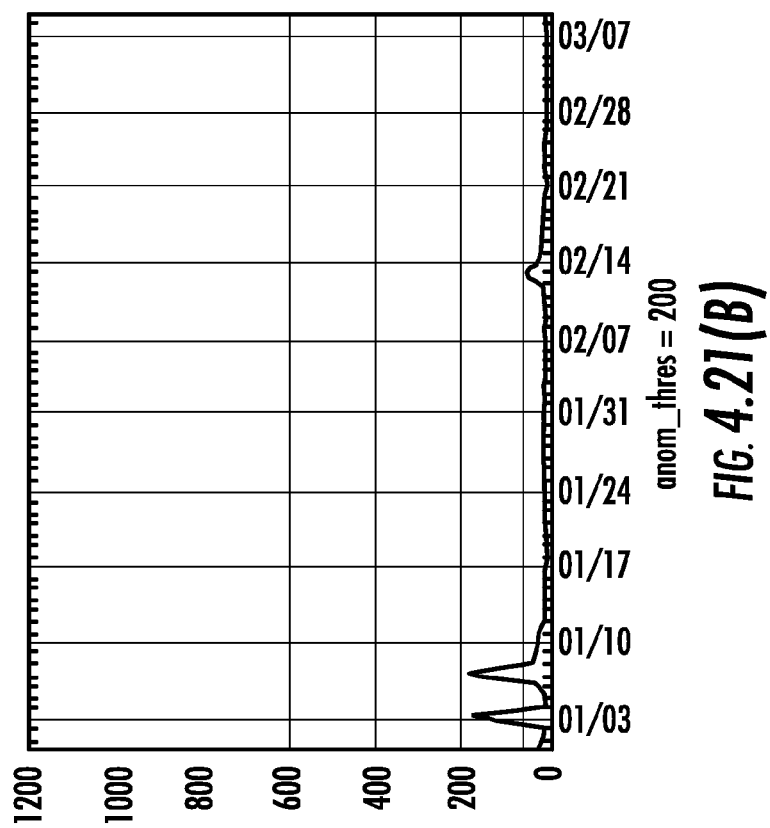
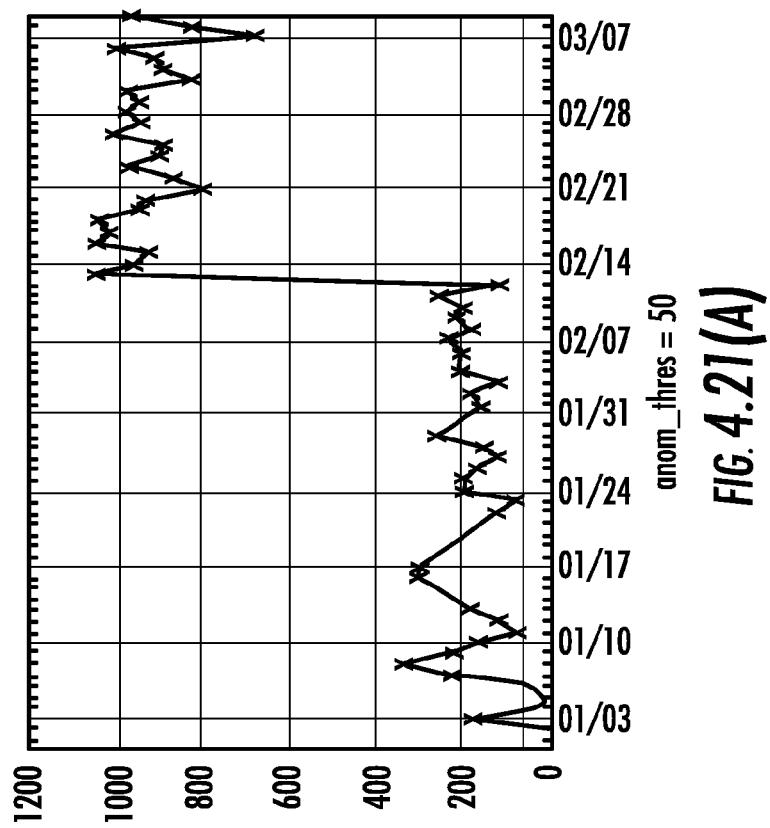
FIG. 4.21(B)
FIG. 4.21(A)

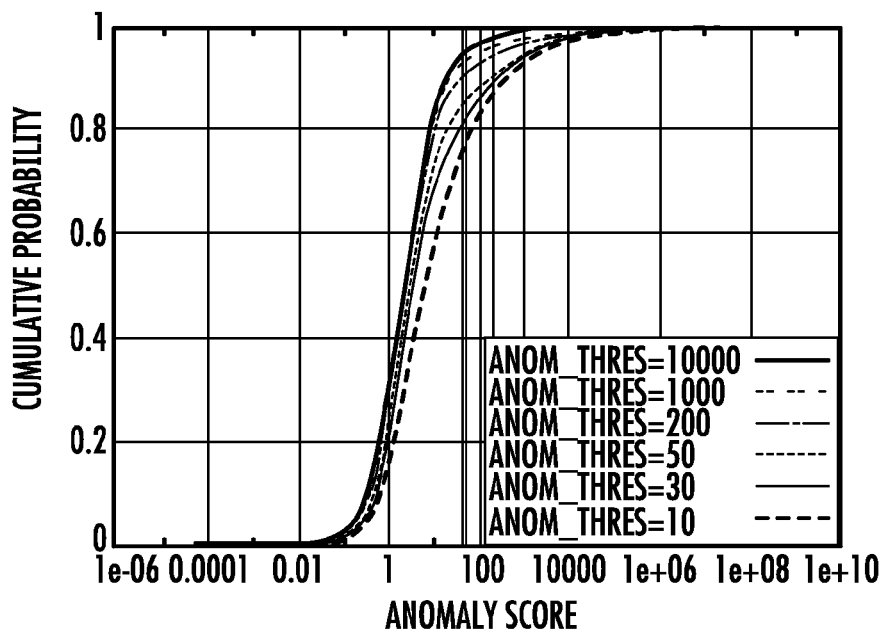
FIG. 4.22
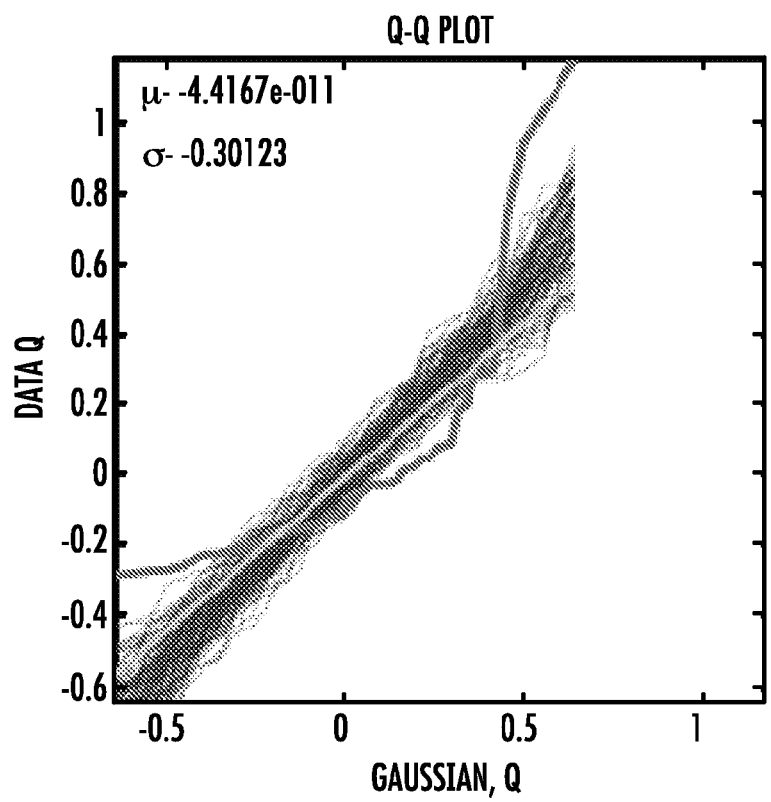
FIG. 4.23

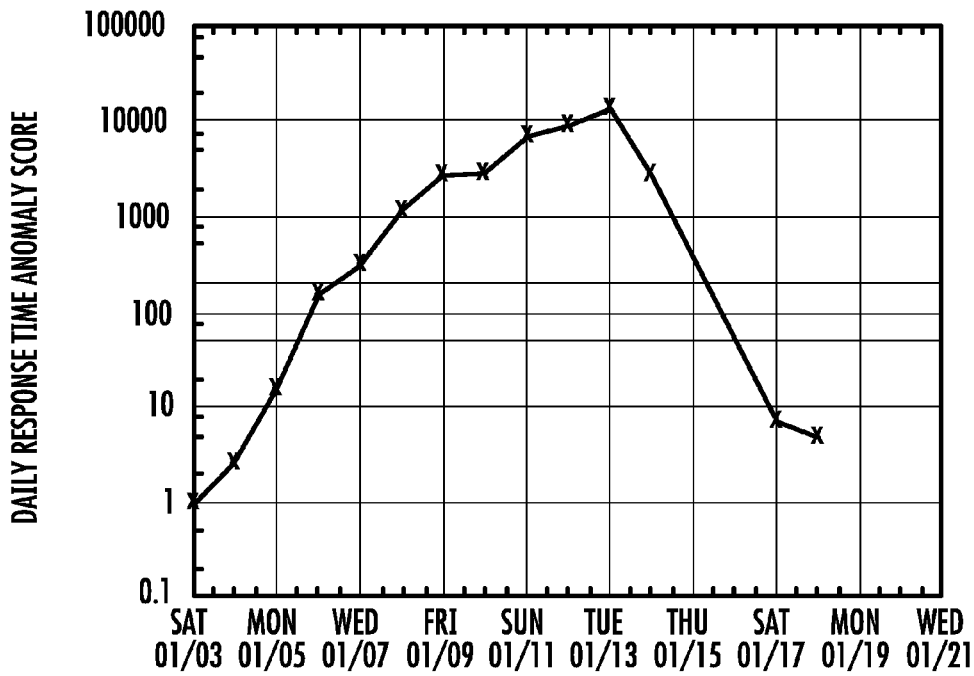
FIG. 4.44
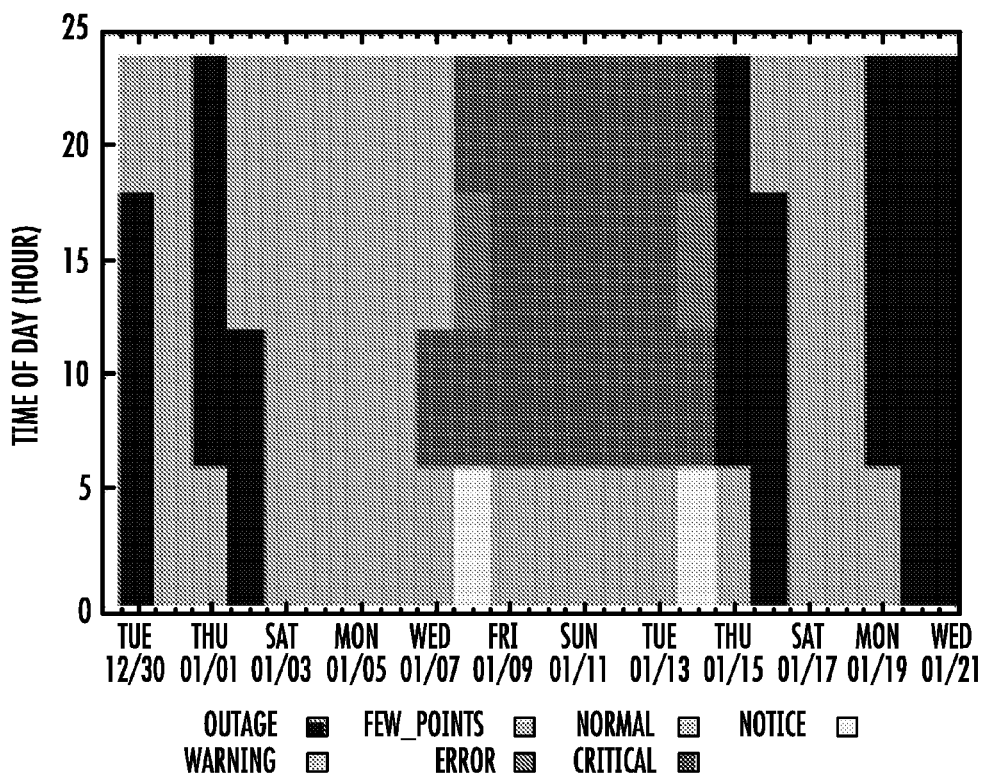
FIG. 4.45

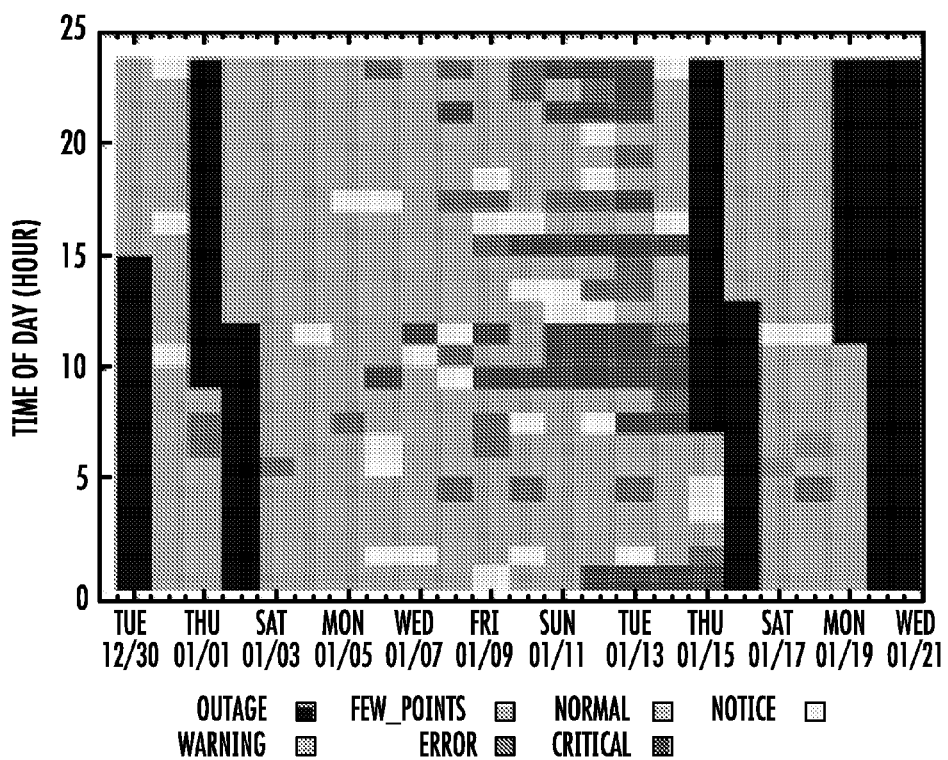
FIG. 4.46
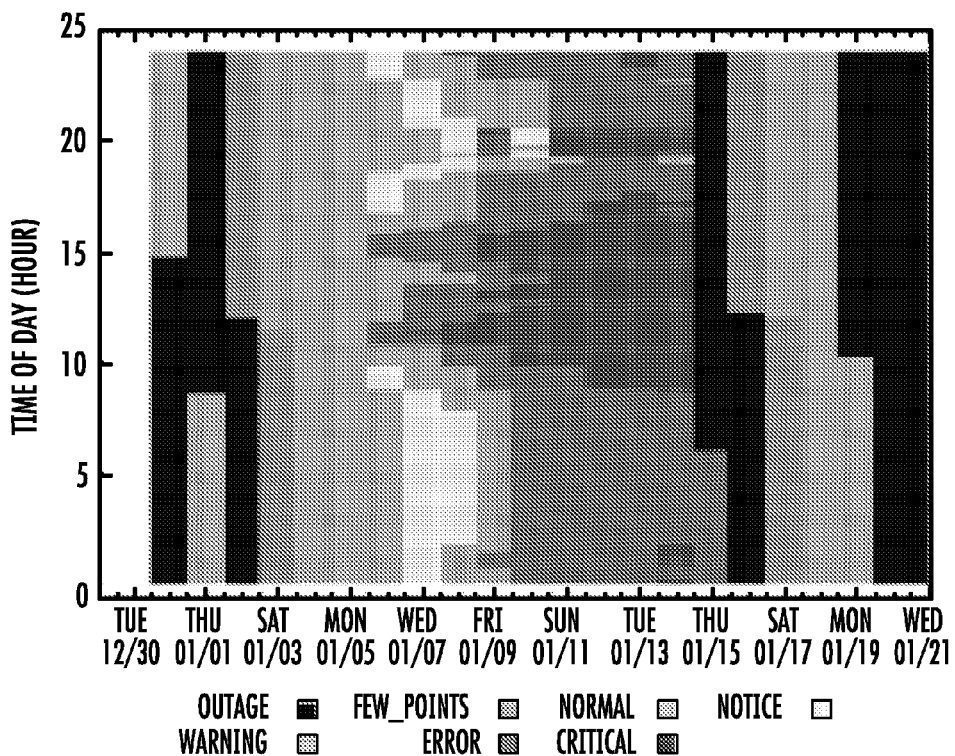
FIG. 4.47

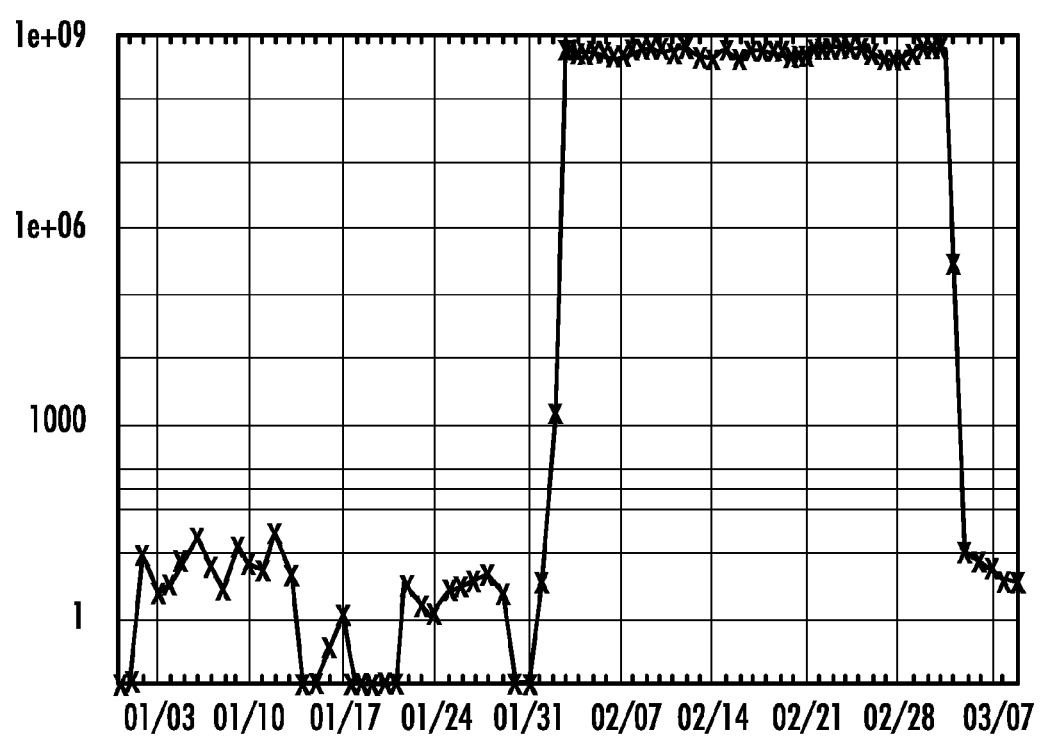
FIG. 4.48

METHODS, SYSTEMS, AND COMPUTER PROGRAM PRODUCTS FOR NETWORK SERVER PERFORMANCE ANOMALY DETECTION

PRIORITY CLAIM

This application claims the benefit of U.S. Provisional Patent Application Ser. No. 61/167,819 filed Apr. 8, 2009; the disclosure of which is incorporated herein by reference in its entirety.

GOVERNMENT INTEREST

This presently disclosed subject matter was made with U.S. Government support under Grant No. CNS-0709081 awarded by National Science Foundation. Thus, the U.S. Government has certain rights in the presently disclosed subject matter.

TECHNICAL FIELD

The subject matter described herein relates to communication network traffic modeling and simulation. More particularly, the subject matter described herein relates to network server performance anomaly detection.

BACKGROUND

Network management in a large organization involves ensuring the availability and responsiveness of network resources attached to the network, such as servers and printers. Users often think of the services they rely on, such as web sites and email, as part of "the network". Although tools exist for ensuring the availability of the servers running these services, ensuring their performance is a more difficult problem.

Broadly speaking, there are two aspects of the end systems that may be managed: whether they are operational, and how well they are performing. The former is called fault management and the latter is called performance management. The FCAPS model is the International Telecommunications Union (ITU) model describing the space of network management tasks by dividing it into five layers [Udu96]: fault, configuration, accounting (or administration), performance, and security, which I will discuss in turn.

Fault management is concerned with whether the individual network components—the routers, switches, and links—are up and running. If not, there is a fault that needs to be detected and addressed. This is typically achieved with the simple network management protocol, SNMP.

Configuration management is concerned with achieving and maintaining a consistent configuration among all the devices in the network. For example, most networks will want to ensure that every side of every link is set to full-duplex (not half-duplex), and that the auto-negotiation of the link rate did not yield a lower rate than the link is capable of. Scaling these issues to a network with tens of thousands of end systems proves the need for an automatic approach to configuration management.

Accounting involves measuring the traffic volume sent between routing domains. Most domains, or autonomous systems (AS's), have agreements with neighboring AS's about the amount and price of network traffic that the neighbor will accept for transit. For example, UNC is charged by (one of) its upstream provider(s) to the Internet according to the 95th percentile of the link utilization each month, so that the more traffic UNC sends and receives to this AS, the higher the price the AS will charge for its service. Other AS's have peering arrangements, so that transit is free as long as the service is mutual (and roughly similar in volume). In any event, accounting involves measuring the traffic volume sent to and from neighboring AS's and sometimes enforcing outgoing rate limits to keep costs down. Another area in the accounting domain is billing users (such as departments on campus) according to their usage.

Performance management is concerned with the same objects as fault management, but the concern is orthogonal. Instead of asking whether the objects are up and running, performance management assumes they are running and asks whether they are running well. This layer describes my research.

Security management is concerned with keeping the network secure from attack. For example, the routers and switches should not accept configuration changes unless the change is appropriately authenticated and authorized. Also, network users should not be able to spy on the network transmissions of other users.

Network management may also include managing the performance of authorized services in the network, such as web services and email services. This extension does not comprise an additional layer of the FCAPS model; rather, it is an extension of the fault and performance layers. The fault layer is extended to detect faults not just of the internal network devices, but also of the servers attached to the network. Likewise, the performance layer is extended to manage the performance not just of routers, switches, and links, but also the servers.

From a user's perspective, the response time is a natural measure of performance: the longer the response time, the worse the performance. For example, if there is a noticeable delay between clicking on a "get new e-mail" button and seeing new e-mail appear in one's inbox, then the response time is high, and the performance is low. Such a conception of performance is naturally supported within the request-response paradigm.

Current passive solutions to monitoring server performance will typically target the most common types of servers, ignoring hundreds of other types. If a new type of service is created, the developers of the monitoring solution will need to understand the application-level protocol upon which the service is based, and incorporate the protocol into their solution. If the protocol is proprietary, then they must guess at its operation. In contrast, my solution incorporates no knowledge about specific application-level protocols, so it works equally well for all TCP-based request/response services, independent of whether they are based on new, proprietary, or standard application-level protocols. (Note that my solution does not work for UDP and other non-TCP types of traffic. Most servers of interest are TCP-based. Notable exceptions include voice-over-IP and streaming media.) As a result, my measurements of server performance do not require access to the application-level information present in a server's protocol messages.

A common problem in many network measurement techniques is the inability to monitor traffic in which the application payload is encrypted and thus unintelligible without the private decryption key. Because these techniques inspect the application payload, encryption foils their measurements. My technique depends only on the packet headers, and thus can be used with traffic that is encrypted. To use an analogy, consider packets as envelopes. Unlike other approaches, my approach looks only at address and other information on the outside of the envelope. Thus, when an envelope is securely sealed (as in the case of encryption), being unable to open the envelope is not a problem for my approach.

Many evaluations of anomaly (or intrusion) detection methods analyze the false positive rate, or the proportion of alarms that did not correspond to real anomalies (intrusions), and the false negative rate, or the proportion of real anomalies (intrusions) that went undiscovered by the methods. Such an analysis requires that all real anomalies (intrusions) are identified a priori. Unfortunately, there is no authoritative source that labels anomalies, partially because the definition of what issues are important to a network manager is an imprecise concept.

One network management tool is Flowscan [Plo00]. Flowscan reads Cisco Netflowl records (obtained through passive measurement), which contain byte and packet counts per flow, and aggregates them into simple volume metrics of byte, packet, and flow counts per five-minute interval. The timeseries of these counts are stored in a round-robin database (using RRDtool), which automatically averages older points to save space. Netflow records do not take internal flow dynamics into account, and they have no notion of anything like a quiet time. Furthermore, it does not correlate the two flows in a connection.

Estan et al's AutoFocus [ESV03] tool (and the similar Aguri [CKK01] tool by Cho et al) summarizes network traffic into a list of the most significant patterns, for some definition of "significant". For example, a flood of SYN packets to a particular host would show up as an anomaly when viewing the number of flows per destination host. Thus, the task of AutoFocus is to look at traffic from various viewpoints and carefully aggregate on one or several dimensions to come up with the list most useful to the network manager. AutoFocus reports in an offline fashion.

Bahl et al's Sherlock system [BCG+07] attempts to localize the source of performance problems in large enterprise networks. They introduce an "inference graph" to model the dependencies in the network, providing algorithms for inferring and building these models automatically. The system is able to detect and diagnose performance problems in the network down to their root cause. However, the system requires deploying "agents" on multiple machines at multiple points in the network, so deployment is not simple. Also, the agents inject traceroutes into the network and make requests to servers, so the system is not passive.

Gilbert et al take a different approach [GKMS01]. They sacrifice exactness for the ability to produce meaningful summaries from high-speed traffic as it streams by. They sacrifice exactness.

Another approach is an open-source network management tool called "Nagios". Nagios sends a probe out to the server and measures the response. In the case of web servers, the probe is an actual HTTP request. If the response time is above a certain threshold, then Nagios sends a warning. If three successive response times are above the threshold, then Nagios sends a more urgent alert, indicating that there is a performance issue with the server.

Lastly, there is a closely related network management solution called OPNET ACE3. ACE is similarly concerned with network service performance, and it is also interested in application response times. ACE is capable of more precisely distinguishing between network transit time and application processing time, but it requires an extensive deployment of measurement infrastructure throughout the network, on clients, servers, and points in between. Furthermore, ACE constitutes an expensive, active measurement approach.

Barford and Crovella [BC98] used user-level think-time modeling to realistically model HTTP users. Lan and Heidemann extended this idea to empirically-derived distributions of think-times in [LH02].

A seminal work from Smith et al introduced the notion of inferring application behavior from transport-level information alone [SHCJ01]. This work eventually led to the A-B-T model and the "t-mix" traffic generator [HC06, HCJS07b, WAHC+06].

Vishwanath and Vandat also create a general model and use it for traffic generation [VV06]. Like "t-mix" and my work, they model TCP connections as request/response pairs, with data unit sizes and "think-time" latencies. However, they take a different approach to modeling for the purpose of generating or replaying traffic, capturing information at higher "session" and request/response "exchange" layers.

Fraleigh et al [FDL+01] propose a design for a system to passively collect and store packet header traces from high-speed links within an Internet service provider's point-of-presence (PoP). The system can enable workload characterization, among other things. However, packet header traces offer a high level of detail and consume vast amounts of storage space.

Hussain et al [HBP+05] describe a passive, continuous monitoring system to collect, archive, and analyze network data captured at a large ISP. They collect packet header traces as well as metadata, and they use vast disk resources to store months of data.

Malan and Jahanian's Windmill system [MJ98] also collects continuous passive measurements. However, they use incoming packets to trigger events in application protocol "replay" modules that they manually created for the most popular application protocols. This approach requires significant work to create each such module.

Feldmann's BLT [Fel00] is a method for capturing HTTP information, including request/response pairs. It abstracts network and transport effects such as out-of-order delivery and retransmissions, instead focusing on the application-level data units exchanged between hosts. However, BLT focuses only on HTTP and gleans information from the TCP payload, so it is not appropriate for encrypted traffic. Furthermore, it uses a multi-pass algorithm, and so is not suitable for continuous monitoring of high-speed links, which require a one-pass approach. Feldmann's BLT system [1] passively extracts important HTTP information from a TCP stream but BLT is an off-line method that requires multiple processing passes and fundamentally requires information in the TCP payload (i.e., HTTP headers). This approach cannot be used for continuous monitoring or monitoring when traffic is encrypted. Another approach, based on BLT, which has similar drawbacks is Fu et al.'s EtE [FVCT02].

In [2] and [3], Olshefski et al. introduce ksniffer and its sibling, RLM, which passively infer application-level response times for HTTP in a streaming fashion. However, both systems require access to HTTP headers, making them unsuitable for encrypted traffic. Furthermore, these approaches are not purely passive. Ksniffer requires a kernel module installed on the server system, and RLM places an active processing system in the network path of the server.

Commercial products that measure and manage the performance of servers include the OPNET ACE system. ACE also monitors response times of network services but is an active measurement system that requires an extensive deployment of measurement infrastructure throughout the network, on clients, servers, and points in between. Fluke's Visual Performance Manager is similar and also requires extensive configuration and integration. Also similar is Computer Associates Wily Customer Experience Manager. CEM monitors the performance of a particular web server, and in the case of HTTPS, it requires knowledge of server encryption keys in order to function.

Thus, common approaches to monitoring the performance of servers in a network may include installing monitoring software on the server, or to use an active monitoring system that generates service requests periodically and measures the response time. This approach to server performance management may include measuring the CPU utilization, memory utilization, and other metrics of the server operating system. In probing or active measurement, the server is given actual requests, and the response time is measured. This approach more accurately reflects the quality of service as perceived by the user.

However, the measurement may negatively affect the service itself-sometimes noticeably. For example, when the quality of service is suffering because of high load, the act of measuring the quality of service will only exacerbate the problem. Yet another drawback is that these approaches typically require extensive customization to work with the specific server/service at hand. Another problem with conventional approaches is that such metrics do not necessarily correlate with the user-perceived quality of service. Another problem with this approach is that the act of measuring computational resources consumes the very same resources that the service itself needs.

Accordingly, there exists a need for methods, systems, and computer program products for network server performance anomaly detection.

SUMMARY

Methods, systems, and computer readable media for network server performance anomaly detection are disclosed. According to one aspect of the subject matter disclosed, a method is disclosed for real-time computation of an endpoint performance measure based on transport and network layer header information. The method includes passively collecting transport and network layer header information from packet traffic in a network. Connections in the network are modeled using an abstract syntax for characterizing a sequence of bidirectional application-level interactions between endpoints of each connection and delays between the interactions. Application-level characteristics of the packet traffic are determined based on the modeled connections. A performance measure of at least one endpoint is computed based on the application-level characteristics and the modeled connections.

In another aspect of the subject matter disclosed, a system is disclosed for performing real-time computation of a server performance measure based on transport and network layer header information. The system includes a data collection module for passively collecting transport and network layer header information from packet traffic in a network. A data processing module models connections in the network using an abstract syntax for characterizing bidirectional interactions between endpoints of each connection and delays between the interactions. The data processing module also determines application-level characteristics of the packet traffic based on the modeled connections and computes a performance measure of at least one endpoint based on the application-level characteristics and the modeled connections.

In another aspect of the subject matter disclosed, a computer program product is disclosed that includes computer executable instructions embodied in a computer-readable medium for real-time computation of an endpoint performance measure based on transport and network layer header information. The computer program performs steps including passively collecting transport and network layer header information from packet traffic in a network. Application-level connections in the network are modeled using an abstract syntax for characterizing a sequence of bidirectional interactions between endpoints of each connection and delays between the interactions. Application-level characteristics of the packet traffic are determined based on the modeled connections. A performance measure of at least one endpoint is computed based on the application-level characteristics and the modeled connections.

The subject matter described herein for real-time computation of an endpoint performance measure based on transport and network layer header information may be implemented using a non-transitory computer readable medium to having stored thereon executable instructions that when executed by the processor of a computer control the processor to perform steps. Exemplary computer readable media suitable for implementing the subject matter described herein include non-transitory computer readable media, such as chip memory devices or disk memory devices accessible by a processor, programmable logic devices, and application specific integrated circuits. In addition, a computer readable medium that implements the subject matter described herein may be located on a single computing platform or may be distributed across plural computing platforms.

Abbreviations

ACK acknowledgement
ADU abstract data unit
API application programming interface
AS autonomous system
CDF cumulative distribution function
DHCP dynamic host configuration protocol
DNS domain name system
Gbps giga-bits per second
GHz giga-hertz
HTTP hyper-text transfer protocol
HTTPs secure hyper-text transfer protocol
IMAP Internet message access protocol
ISN initial sequence number
ISP Internet service provider
IP Internet protocol
Mbps mega-bits per second
MSS maximum segment size
NIC network interface card
PCA principal components analysis
pcap packet capture (library/file format)
PDF probability distribution function
PoP point-of-presence
POP3 post office protocol, version 3
QF quantile function
RTO retransmission timeout
RTT round-trip time
SNMP simple network management protocol
SMTP simple mail transfer protocol
SQL structured query language
TCP transmission control protocol
UDP user datagram protocol
UNC University of North Carolina (at Chapel Hill)
VLAN virtual local area network

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which:

FIGS. 2.1(a) and 2.1(b) show exemplary TCP steady-state operation of TCP's sliding window, where 2.1(a) shows the sequence numbers of the data, the packets in transit, and the state of the connection just before packets A (an acknowledgement) and B (data) are received, and 2.1(b) shows the state of the network afterward according to an embodiment of the subject matter described herein;

FIG. 2.2 is a diagram showing two example connection vectors, or instances, of an A-B-T model for two TCP connections according to an embodiment of the subject matter described herein;

FIG. 3 is a block diagram illustrating an exemplary pattern of ADU exchanges between two endpoints of a connection that may be modeled or simulated according to an embodiment of the subject matter described herein;

FIGS. 3.4(a) and 3.4(b) are diagrams showing exemplary sequential validation results where 3.4(a) shows CDF of actual vs. measured ADU size distributions, for either direction, and 3.4(b) shows CDF of actual vs. measured think time distributions, for either direction, according to an embodiment of the subject matter described herein;

FIGS. 3.5(a) and 3.5(b) are diagrams showing exemplary concurrent validation results where 3.5(a) shows CDF of actual vs. measured ADU size distributions, for either direction, and 3.5(b) shows CDF of actual vs. measured think time distributions, for either direction, according to an embodiment of the subject matter described herein;

FIG. 4.1 is an exemplary histogram for a server, with bins divided equally according to a logarithmic scale according to an embodiment of the subject matter described herein;

FIG. 4.2 shows interpolation between two Gaussian distributions (upper left), PDF interpolation (upper right), CDF interpolation and the corresponding PDFs (middle row), and QF interpolation and the corresponding PDFs (bottom row) according to an embodiment of the subject matter described herein;

FIG. 4.3 is a diagram showing exemplary distributions of response time measurements using adaptive PDF and adaptive CDF representations according to an embodiment of the subject matter described herein;

FIG. 4.4 is a diagram showing an exemplary quantile function representation and singular values of PCA using various representations according to an embodiment of the subject matter described herein;

FIG. 4.5 is a diagram showing exemplary quantile functions for an exemplary server, plotted on a logarithmic scale, with the anomalous QF highlighted according to an embodiment of the subject matter described herein;

FIG. 4.17 is a diagram showing exemplary anomaly scores as basis_error varies for a plurality of servers according to an embodiment of the subject matter described herein;

FIG. 4.18 is a diagram showing exemplary anomaly scores as window_size varies for a plurality of servers according to an embodiment of the subject matter described herein;

FIG. 4.19 is a diagram showing exemplary anomaly scores as test_size varies for a plurality of servers according to an embodiment of the subject matter described herein;

FIG. 4.20 is a diagram showing exemplary anomaly scores as num_bins varies for a plurality of servers according to an embodiment of the subject matter described herein;

FIG. 4.21 is a diagram showing anomaly scores for an exemplary server at different settings of anom_thres according to an embodiment of the subject matter described herein;

FIG. 4.22 is a diagram showing exemplary anomaly scores as anom_thres varies for a plurality of servers according to an embodiment of the subject matter described herein;

FIG. 4.23 is a diagram showing an exemplary quantile-quantile plot of projection along first principal component for an example server according to an embodiment of the subject matter described herein;

FIG. 4.44 is a diagram showing an exemplary anomaly score for a web server according to an embodiment of the subject matter described herein;

FIG. 4.45 is a diagram showing a time-scale analysis for an exemplary web server on a quarter-day distribution according to an embodiment of the subject matter described herein;

FIG. 4.46 is a diagram showing a time-scale analysis for an exemplary web server on an hourly distribution according to an embodiment of the subject matter described herein;

FIG. 4.47 is a diagram showing a time-scale analysis for an exemplary web server on rolling-day distributions according to an embodiment of the subject matter described herein; and FIG. 4.48 is a diagram showing an exemplary anomaly score for an SMTP server according to an embodiment of the subject matter described herein;

DETAILED DESCRIPTION

Figure 1:
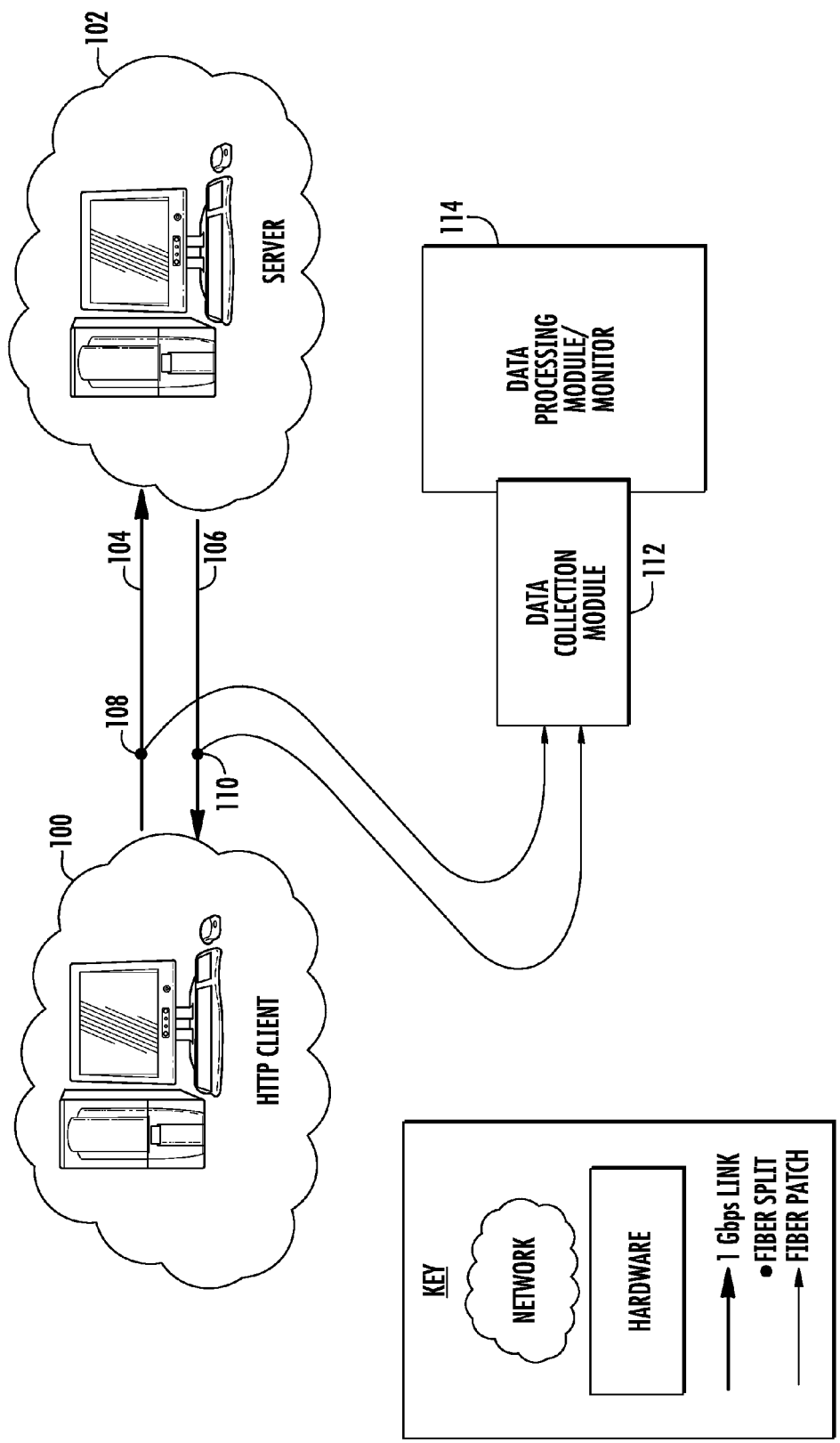
FIG. 1 is a block diagram of an exemplary system for monitoring packet traffic on a link according to an embodiment of the subject matter disclosed herein.

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any non-transitory means that can contain or store the program for use by or in connection with the instruction execution system, apparatus, or device. The computer-readable medium can be, for example but not limited to, an electronic, magnetic, optical, electromagnetic, infrared, or semiconductor system, apparatus, or device. More specific examples (a non exhaustive list) of the computer-readable medium can include the following: an electrical connection having one or more wires, a portable computer diskette, a random access memory (RAM), a read-only memory (ROM), an erasable programmable read-only memory (EPROM or Flash memory), and a portable compact disc read-only memory (CDROM).

Thus, the subject matter described herein can be embodied in many different forms, and all such forms are contemplated to be within the scope of what is claimed. Any such form of embodiment can be referred to herein as "logic configured to" perform a described action.

Overview

The subject matter described herein includes determining a performance measure of servers in a network based on a real-time analysis of passively measured network traffic. TCP and IP headers may be continuously collected and processed in a streaming fashion to first reveal the application-layer structure of all client/server dialogs ongoing in the network. Next, the representation of these dialogs may be further processed to extract performance data such as response times of request-response exchanges for all servers. These data may then be compared against archived historical distributions for each server to detect performance anomalies. Once found, these anomalies may be reported to server administrators for investigation. One method uncovers nontrivial performance anomalies in arbitrary servers with no instrumentation of the server or knowledge of the server's function or configuration. Moreover, the entire process may be completely transparent to servers and clients.

The subject matter described herein also presents an overview of method of capturing and modeling client/server dialogs and its validation. The dialogs may be represented using a format called an a-b-t connection vector where a represents a request size, b represents a response size, and t represents a think time. The subject matter described herein also presents an overview of a tool called adudump that processes TCP/IP packet header traces in realtime to generate a-b-t connection vectors for all client/server connections present in the network.

The subject matter described herein includes an approach based on passive collection of packet header traces, and real-time analysis of the data to automatically construct an empirical model of the requests received by servers and the responses generated. These models can be constructed for arbitrary servers with no knowledge of the functions performed by the server or the protocols used by the server. Given these models, we can easily compute important performance measures such as the response times for a server. Using statistical methods originally developed for medical image processing, distributions of these variables can be compared to archived historical distributions for each server to detect performance anomalies. The approach works for arbitrary servers because it relies solely on properties of TCP. Using knowledge of the TCP protocol, packet header traces (consisting of only TCP/IP headers and no application layer headers or payloads) are processed in a streaming fashion to construct a structural model of the application dialog between each server and each client in realtime.

This model is an abstract representation of the pattern of application-data-unit (ADU) exchanges that a client and server engaged in at the operating system's socket interface. For example, if a web browser made a particular request to a web server that was 200 bytes long, and the server generated a response of 12,000 bytes, then by analyzing the headers of the sequence of TCP/IP packets flowing between the client and server, we would infer this request/response structure and represent this dialog as consisting of a single exchange wherein 200 bytes were sent from client to server and 12,000 bytes were sent from server to client. We intentionally ignore transport-layer effects such as segmentation, retransmission, etc. The model can be augmented to include both server-side and client-side "think times" which can be inferred from the arrival time of the packets. We refer to the server-side think times as response times, and they are our primary performance metric.

The subject matter described herein includes, for each request/response exchange, a measurement of the server response time, which is the fundamental unit of performance. The response times for a particular server are then aggregated into daily distributions. Over many days, these distributions may be used to define a profile of the typical response time distribution for that server. New distributions of response times may then be compared to the profile to determine whether they are anomalous.

The subject matter described herein may be purely passive where no aspect of the measurement perturbs the operation of the service in any way. Instead, the source of data for my measurements is the network traffic already flowing to and from the server. Furthermore, rather than putting a measurement device in line with the network path (thus affecting the service by adding a delay to the delivery of the packets), the measurement device may sit in parallel with the network path, receiving a copy of the packets.

Considering common types of servers, such as HTTP (or web) servers, HTTP servers may get requests for individual HTTP objects (referenced by a URL), and produce the appropriate response: either the requested object or an error code. SMTP servers receive email messages that are sent by a client, and send them on their way to the destination email server. IMAP servers deliver email messages to email clients and modify email folders as requested by the client. All of these servers provide different application services, but at a high level, they are all responding to requests. It is at this higher level that my approach models the server communication in order to detect and diagnose server performance issues.

The subject matter described herein includes measuring and analyzing the performance of services, based on transport-level information in TCP/IP protocol headers on packets sent and received by servers. Specifically, I measure the server performance by building a compact representation of the application-level dialog carried over the connection, I build a profile of typical (or "normal") server performance, detect performance anomalies from this profile, and diagnose the cause of such anomalies. In this manner, it is possible to detect and, to an extent, diagnose server performance issues in a network with hundreds of servers providing multiple diverse types of services without perturbing those services, by accessing only the information available in the TCP/IP headers of the packets the server receives and sends.

The subject matter described herein uses the server response time to measure the server performance. The response time is the amount of time elapsed between a request from the client to the server and the server's subsequent response. Intuitively, the longer the response time, the worse the performance. A naive approach to detecting server performance that includes using the server response time will not work. We cannot simply flag long response times as indicative of anomalies for two reasons. First, the definition of what is anomalous is different for different servers. For example, an SQL database server might be expected to take minutes or even hours to respond, whereas a second might be a long time for a chat server's response. Second, any server will have at least a few long response times as part of its normal operation. For example, most email messages sent to a outgoing mail server can be sent in less than a second, but the occasional five megabyte attachment will take longer, and we would not call that longer response time an anomaly.

According to another aspect of the subject matter described herein, servers in large networks may be automatically discovered and a profile built for them because it may be difficult in a large organization to know about all the servers in the network, especially when individual departments and divisions are free to setup their own servers without the aid of the technology support department.

According to another aspect of the subject matter described herein, the system may be tunable to various situations. For example, the subject matter described herein may provide the ability to redefine what "normal" traffic looks like for that server, to avoid being bombarded with alarms. Also, various parameters may be used to control the performance anomaly detection mechanism.

In summary, the subject matter described herein includes a one-pass algorithm for continuous measurement of server performance from TCP/IP headers at high traffic rates. The subject matter described herein also includes a tool for measuring server performance using a one-pass algorithm that can keep up with high traffic rates. The subject matter described herein also includes a method for building a profile of "normal" performance for a server regardless of the scale of response times, regardless of the distribution of response times, and regardless of how widely the performance typically varies for the server. Finally, the subject matter described herein includes a metric characterizing the extent to which a distribution of response times in anomalous relative to the normal profile and the ability to diagnose performance issues.

FIG. 1 is a network diagram of an exemplary system for real-time computation of an endpoint performance measure based on transport and network layer header information according to an embodiment of the subject matter described herein. Referring to FIG. 1, client devices located in network 100 may bidirectionally communicate with servers located in network 102. For example, network 100 may be connected to network 102 via two unidirectional communications links 104 and 106. Links 104 and 106 may include, for example, fiber optic links. Packets traversing links 104 and 106 may be passively monitored (i.e., copied) using taps or splitters located on each link 104 and 106. For example, tap/splitter 108 may copy packets traversing link 104 and tap/splitter 110 may copy packets traversing link 106.

The packets may be copied by a fiber-optic splitter, which splits the optical signal into two paths, so the network tap is passive, introducing no perturbations to the network. A copy of each packet is sent to the monitor, which passes the information to the adudump process. In one embodiment, data collection module 110 may include an Endace DAG card may be used to capture and timestamp each packet at the monitor, but a standard fiber-optic NIC may also be used without departing from the scope of the subject matter described herein.

In order to fully understand adudump, it is helpful to consider the assumptions that are made about its context and measurement environment. The monitor is the machine on which adudump executes. FIG. 1 illustrates that the monitor receives a copy of all packets that flow between the Internet and the UNC network. The monitored links are 1 Gbps Ethernet carried over fiber-optic cables, which are tapped with optical splitters, so that the monitor gets a copy of each packet. Note that this enables passive measurement; if the monitor were inline, it would delay the delivery of each packet.

The placement of the monitor, also called its vantage point, provides a set of convenient labels, which we will refer to throughout this discussion. A 1 Gbps Ethernet link is carried on two fiber-optic cables, one for each direction of frame transmission on the full-duplex link. Frames transmitted on the fiber optic cable providing a path from the Internet to UNC are called inbound, whereas the other path is outbound. The destination address (port) of inbound traffic (or the source address of outbound traffic) is called a local address, whereas the other address (port) is called a remote address (port).

Connections can also be classified as either inbound or outbound, depending on the direction of the connection request (initial SYN packet). Connection requests from an external client to a local (UNC) server are inbound. I only consider inbound connections in this dissertation because I am managing the performance of UNC servers, not external servers, and I am concerned with response times for the requests of external clients.

The monitor itself may include a computer running FreeBSD 5.4, having a 1.4 GHz Xeon processor, 1.25 GB of RAM, and an Endace DAG 4.5 G4 packet capture card. The DAG card accepts fiber optic input and provides frames and precise timestamps to applications (such as adudump). Such processor hardware may provide enough power to enable adudump to keep up with the links that routinely carry 600 Mbps of traffic (with spikes up to 1 Gbps), with no packet loss. We expect adudump to scale to much heavier link loads even on a 10 Gbps link with modern faster, multicore processors.

Figure 2:
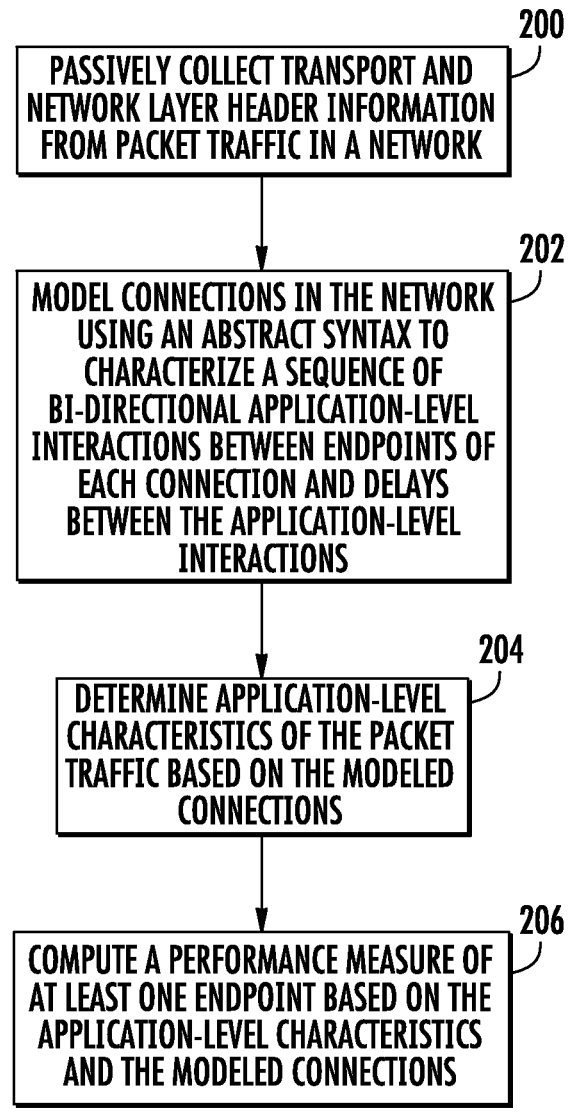
FIG. 2 is a flow chart illustrating an exemplary process for real-time computation of an endpoint performance measure based on transport and network layer header information according to an embodiment of the subject matter described herein.

FIG. 2 is a flow chart illustrating an exemplary process for real-time computation of an endpoint performance measure based on transport and network layer header information according to an embodiment of the subject matter described herein. Referring to FIG. 2, in step 200, transport and network layer header information may be passively collected from packet traffic in a network. For example, data collection module 112 may utilize network taps 108 and 110 to copy and forward every packet traversing links 104 and 106 to adudump. Non-IPv4 packets may be discarded, and only IPv4, TCP segments may considered for processing by data processing module 114.

In step 202, connections in the network may be modeled using an abstract syntax for characterizing a sequence of bidirectional application-level interactions between endpoints of each connection and delays between the interactions. For example, an A-B-T model of a communications interaction between HTTP client 100 and server 102 may be created by data processing module 114. Data processing module 114 may examine inbound SYN segments and report, for example, sequence numbers of the inbound flow and round-trip-time for packets.

In step 204, application-level characteristics of the packet traffic may be determined based on the modeled connections. For example, a performance profile of server 102 may be created that provides a representation of its normal performance under one or more network conditions of interest.

In step 206, a performance measure of at least one endpoint may be computed based on the application-level characteristics and the modeled connections. For example, computing the performance measure may include detecting a performance anomaly of an endpoint (e.g., client or server). Additionally, detecting a performance anomaly in the endpoint may include comparing the computed performance measure to a historical performance measure associated with the endpoint at a previous point in time. For example, the server-side think time of a given server may be measured over a 6-month period in order to determine a baseline normal performance level of the server. Then, real-time data may be compared to determined whether the server-side think times for comparable situations (e.g., time of day, types of requests, etc.) are within acceptable statistical boundaries of normal server performance.

The fundamental operation of performance anomaly detection is to quantify the dissimilarity between a distribution of response times and a set of distributions defining the normal or expected performance. Central to this operation is the issue of how a distribution, or a set of response time measurements, is represented. In the end, the discrete quantile function (QF) representation is used. This representation maximizes information, requires little space, works well even when the number and range of distributions vary widely, and varies linearly in many circumstances. The QF is a b-bin vector, where b is a parameter. Each distribution forms a QF.

Instead of using a simple threshold on the server response time to detect anomalies, my approach builds, for each server, a profile of the typical distribution of response times for that server. The profile is, in a sense, a summary of many response times, and detecting a performance issue is fundamentally a determination of how well the summary of recent response times compares to the historical profile (or profiles). Because each server has its own profile, observing ten-second response times might be indicative of a performance issue for some servers but not for others.

Not only is a profile unique to a given server, but they also vary by different amounts. For example, the individual distributions comprising the profile for one server might be nearly identical. In that case, a new distribution that deviates from the profile even a small amount might be considered highly unusual. On the other hand, other servers might have a profile containing individual distributions that vary widely. In that case, a new distribution would need to be extremely different from the profile before it was considered unusual. Even more subtle, a profile might tolerate wide variation in some places but little variation in other places. For example, many services see wide variation among the tail of response time distributions, but little variation elsewhere, so it makes sense to penalize a distribution that deviates from the profile only in the tail less than one that deviates from the profile only in the body.

The approach corresponds with a user's intuitive understanding of performance issues. A user is not likely to complain about the performance of a server that is always slow; instead, the user learns to expect that behavior from the server. Also, if the response times vary greatly for the server, the occasional long response time will probably not bother the user greatly; however, a long response time in a typically very responsive service such as an interactive remote-desktop session would be more likely to elicit a complaint. Thus, there is a correlation between what a user would deem problematic performance and what my methods detect as problematic performance. Furthermore, note that, by continually applying this approach, the network manager can now proactively discover problems and hopefully fix them before they become severe enough to elicit user complaints.

It is not just performance degradations that are interesting to a network manager, but, more generally, performance anomalies. A good solution should detect when the performance for a server is unusually bad and also when it is unusually good. For example, a mis-configuration might be introduced by a web server upgrade, causing the web server to serve only error pages and yielding faster response times than usual. My approach detects this sort of performance anomaly as well.

In addition to discovering performance issues, I also provide a way to diagnose the issues. This diagnosis is necessarily from an outside perspective, and I cannot incorporate knowledge of packet payloads. To diagnose issues, I can use contextual information provided by my measurement tool, such as the number of connections to a server, as well as the structure of the application-layer dialogs of connections. For example, one diagnosis might be that the third response time of each connection is the one causing the performance anomaly.

In another embodiment, detecting a performance anomaly may include determining a basis performance measure that describes the distribution of response times for an endpoint based on the historical population of distributions of response times for the endpoint.

In another embodiment, detecting a performance anomaly may include determining an anomaly measure that describes the extent to which the collected transport and network layer header information for the endpoint is not described by the basis performance measure. Determining an anomaly measure may further include defining an anomaly threshold value and comparing the anomaly measure to the anomaly threshold value.

From the perspective, of the network, the vast majority of application level protocols are based on a few patterns of data exchanges within a logical connection between the endpoint processes. FIG. 1 is a block diagram illustrating network traffic seen at different levels of abstraction according to an aspect of the subject matter described herein. As illustrated by FIG. 1, the traffic on an Internet link monitored at a point in the link 100 can be seen as an aggregate of packets from many different connections. Each connection is driven by an application running at each of the two associated endpoints. For example, a web connection is used to transport requests for uniform resource locators (URLs) and web objects, such as hypertext markup language (HTML) source code and image files. For TCP applications, the arrivals of packets within a connection are a function of the source-behavior of the application and the congestion control and windowing mechanisms of the transport protocol. Each application has a different set of messages and objects that are exchanged between the two endpoints.

As illustrated in FIG. 1, however, there exists a level of abstraction, i.e., an abstract source-level 102, at which all connections are doing nothing more than sending data back and forth and waiting for application events. This abstract source-level 102 may be used for modeling traffic mixes in a manner that is suitable for generating closed-loop traffic. According to an important aspect of the subject matter described herein, the data exchanges that occur in abstract source level (or can be modeled through analysis of network and transport layer header information and without knowledge of the applications). Methods for characterizing source-level behavior in a network through analysis of packet traces will be described in detail below. Because application behavior can be characterized without knowledge of the applications themselves, traffic modeling and simulation can be simplified over conventional modeling or simulation methods that require simulation of application protocols. In FIG. 1, the two endpoint processes exchange data in units defined by their specific application-level protocol 104. The sizes of these application-data units (ADUs) depend only on the application protocol and the data objects used in the application and, therefore, are largely independent of the sizes of the network-dependent data units employed at the transport level and below. For example, the sizes of HTTP requests and responses depend on the sizes of headers defined by the HTTP protocol and the sizes of files referenced but not on the sizes of TCP segments used at the transport layer.

One common ADU exchange pattern used by TCP applications arises from the client-server model of application structure, such as in the case of a web server and browser, and includes a single ADU exchange. For example, a pattern of ADU exchange over time may include an HTTP connection between a web browser and a web server that may be modeled or simulated using the methods and systems described herein. Web browser may send an HTTP Request to web server, which may sends a Response with the requested object(s). In a typical example, Request may include 341 bytes due to the HTTP header and the length of the file name for the file being requested. HTTP Response may include 2555 bytes, which may include the HTTP header and the file being requested. The time interval between Request and Response may depend on network or end-system properties that are not directly related to or under the control of the application.

Sliding Window Mechanism

The sliding window is the mechanism by which a byte stream is reliably transported from the sender to the receiver over the unreliable communication channel of a computer network. To accomplish reliable transport, it is necessary to associate each byte of the application's byte stream with a sequence number. Then, each packet refers to a specific range of sequence numbers. The sequence numbers are the essential association by which I can infer the request and response boundaries intended by the application.

I exploit the sliding window mechanism of the transmission control protocol (TCP) to infer application intent. Specifically, I observe the sequence and acknowledgement numbers in the header of a TCP segment to determine where the segment fits within the larger transmission.

TCP provides a mechanism to applications for reliable transport over a network, allowing them to transport data without worrying about network effects such as packet loss and reordering. The sliding window is the basic mechanism used to achieve this reliable transport.

The operation of TCP's sliding window is illustrated in FIG. 2.1. The sender sends some data over the network. Upon receipt of the data, the receiver replies with an acknowledgement (ACK) packet indicating that it received the data. When the sender receives the ACK, it advances the sliding window. The window signifies the data that is currently in transit and unacknowledged. There are many related complexities of this scheme that I will not cover here, such as the effect of packet losses and the ability of the receiver to throttle the sender by adjusting the window size.

FIG. 2.1 shows TCP steady-state operation. FIG. 2.1(a) shows the sequence numbers of the data, the packets in transit, and the state of the connection just before packets A (an acknowledgement) and B (data) are received. FIG. 2.1(b) shows the state of the network afterward; note that the sender's window has advanced.

One requirement for correct operation of TCP is that both sides be able to determine where a particular packet belongs within the larger data stream even in the face of reordered packets and packet losses. Therefore, TCP labels the data with 32-bit byte sequence numbers. These sequence numbers enable the receiver to determine whether a packet contains new data (and, if so, where it belongs), and it also enables the sender to determine what data has been received (from the ACK packets).

Both hosts in a TCP connection are allowed to send data at the same time, and each host picks an initial sequence number (or ISN) at the beginning of the connection. These ISNs need not be different (although they almost certainly will be), because each direction (or flow) of traffic within the connection is independently governed by the TCP sliding window mechanism detailed above.

Thus, by observing the sequence numbers of packets as they travel across the network, one can infer how the application is using the network. For example, when a web server sends a 20 kilobyte image to a web browser, the observer will see a series of packets with sequence numbers from the ISN to the ISN+20 KB, and it will infer that the server intended to send a data object of size 20 KB. This higher-level summary of communicating application's behavior is the essence of the A-B-T model.

A-B-T Model

A compact representation of the application-level dialog between two end systems may be called a connection vector. A connection vector is an instance of the A-B-T model. At a high level, the model includes three components: requests, or application-defined chunks of data sent from the connection initiator ("client") to the connection acceptor ("server"), responses, or chunks of data sent in the opposite direction, and think-times, or the times between such chunks. The server-side think-times, or the time elapsed between the end of a request and the beginning of a response, are called "response times". These response times are the fundamental unit of service performance upon which my performance anomaly detection methods are based.

When considering the operation of a connection at the packet level, the complexities can be overwhelming. The A-B-T model [WAHC+06, HCJS07a] was created to abstract away the complexities and focus on the higher-level dialog. The model thus considers the arbitrarily large units of data that are exchanged in turn, along with the times in between such units, rather than the mechanics of how such a dialog occurs over the network. This abstraction is fundamental to my work.

Consider a spoken conversation between two people. Think of every ten word group as a unit of data. I can imagine counting the number of groups each person uttered and doing useful things with the counts. However, it would be better to group words into entire utterances, without artificially restricting the data unit size. Then, I could count the number and size of the larger utterances that make up the dialog. Furthermore, if each person politely waits for his turn to speak, I could find it useful to also measure the "think-time" between the end of one person's utterance and the beginning of the next person's utterance. In the same way, I want to remove network-level effects such as the maximum segment size (MSS), which are irrelevant to the applications using the network. I capture and measure the higher-level dialog between two hosts to unlock the many insights that are otherwise obscured by the details of network transmission.

The A-B-T model is named for its three components: A's are units of data sent from the connection initiator to the connection responder, or requests; B's are units of data sent in the opposite direction, or responses; and T's are the think times between the data units. The application-defined units of data in the A-B-T model are called ADUs (application data units). It is possible to build an A-B-T model for a TCP connection by passively observing the packets from an intermediate vantage point. It is possible to build models from traffic using any reliable transport protocol based on the sliding window mechanism, but TCP is the de facto standard and carries the vast majority of reliable, connection-oriented traffic. It is possible to create approximate or probabilistic models from connectionless traffic or unreliable connections (e.g.

UDP), but it is difficult to make strong claims about the think times using such models. Therefore, I focus on TCP.

It is important to distinguish server-side think times, or response times, from client-side think times. I carefully define a response time as the elapsed time following a request and preceding a response. Conversely, the less interesting client-side think time is the elapsed time following a response and preceding a request. The response time is central to my work because it is the primary metric for server performance. However, the methods described may also be applied to client-side think times without departing from the scope of the subject matter described herein.

The A-B-T model also accounts for connections in which one host pauses for a significant time while sending some data unit. I call such pauses quiet times, and they split a request (response) into multiple requests (responses). Quiet times are only reported if they exceed the intra-unit quiet time threshold, which defaults to five hundred milliseconds; otherwise, they are ignored. Five hundred milliseconds was chosen as a reasonable trade-off between a high level of abstraction and a high level of detail. Choosing a higher threshold means that important delay-based aspects of the application-level dialog will be missed; choosing a lower threshold means that I am likely to insert a quiet time in the dialog even when the application itself neither intended nor caused any delay. Note that, given my lack of definite information about application intent, I cannot get this right in every case. The threshold will be too high for some connections and too low for others. I have merely chosen a reasonable value.

Adudump infers A-B-T instances (called connection vectors) from a sequence of TCP packet headers in a one-pass fashion. The subject matter described herein observes a packet, modifying the saved state for its connection as necessary, and discards it. TCP is designed to provide reliable transport of a byte-stream over an unreliable medium, so it must provide mechanisms for loss detection and retransmission. As such, algorithms described herein make inferences based on what is often incomplete knowledge about the application's behavior. For example, if the first packet of a response is lost before it reaches the vantage point of the monitor, but the second packet reaches the monitor, I must infer (based on the next expected sequence number in the byte-stream) that the responding application intended to start its response earlier. Multiple losses at key points in the connection make for complicated inference algorithms.

The adudump tool reports the individual elements of the A-B-T model as "ADU" records. The direction of an ADU indicates whether it is a request or a response. The subsequent think-time is also reported; think-times following a request ADU are server response times. The server and client addresses and port numbers are also reported, as well as an indication of whether the connection is currently considered "sequential" (i.e. either application waits for the other to finish its transmission before responding) or "concurrent" (i.e. both applications transmit at the same time). In addition, each record has a timestamp in the form of a unix epoch with microsecond precision. The timestamp corresponds to the time at which the current packet was received by the DAG card. In general, adudump prints records as soon as it can, which means that e.g. the timestamp of a request ADU is the timestamp of the first packet of the server's response (that also acknowledges all previous request bytes); that is, the earliest point at which adudump can infer that the request is finished.

Information about the connection context is also reported by adudump. A "SYN" record indicates that a client has attempted to initiate a TCP connection with a server. A "RTT" record measures the time between the TCP SYN segment (the client's attempt to establish a connection) and the TCP SYN/ACK segment (the server's initial response), which is known as the RTT, or round-trip-time. Note that the round-trip-time is relative to the vantage point of the monitor (e.g. the border-link), not the client. A "SEQ" record indicates that the final part of the TCP "three-way handshake" is completed, and a TCP connection is officially established. This event is named "SEQ" because connections are sequential by default, until there is evidence of concurrency, in which case a "CNC" record is printed. When the connection is closed, an "END" record is printed. Lastly, if the adudump process is killed (or it reaches the end of a packet header trace), it will print an "INC" record for every ADU that was in the process of being transmitted.

It is useful to note two caveats about adudump. First, it does not report any information from a connection that it does not see the beginning of. It is sometimes difficult to make reasonable inferences even when seeing the exchange of initial sequence numbers in the connection establishment. Determining the connection state from the middle of a connection is an area of ongoing work. The second caveat is that the server response times are not purely application think-times, because they include the network transit time from the monitor's vantage point to the end system and back. However, most network transit times in the UNC network are quite small, so this does not present a problem.

The A-B-T model can model most types of TCP connections. However, there is a type of TCP connection that has a less structured dialog: both connected hosts "talk" in overlapping time intervals. Such concurrent connections can be easily captured by a generalization of the A-B-T model in which each flow is independently modeled as a sequence of data units and quiet times. However, independently modeling each flow loses the correlation between sequence numbers in one direction and acknowledgement numbers in the opposite direction, which is an essential aspect of inferring the application-level dialog from network traffic (since the acknowledgement number increases only when the application has received the data). For this reason, I cannot make solid inferences about server performance from concurrent connections, so I focus on the think-times in non-concurrent, or sequential, connections.

FIG. 2.2 shows two example connection vectors, or instances of an A-B-T model for two TCP connections. All aspects of the A-B-T model are included: requests (or A objects), responses (or B objects), response times, client-side think times, and quiet times. The figure shows how multiple segments may comprise a single application data unit. The bottom connection shows two data units separated by an intra-unit quiet time. Note that this simple example assumes that the client and server take turns sending data. Such cases are called "sequential connections." "Concurrent connections," wherein both endpoints transmit simultaneously, can also be analyzed. Examples of such applications that employ concurrent connections include HTTP with pipelining enabled, peer-to-peer applications such as BitTorrent, and most interactive applications such as the secure shell. Connections are assumed to be sequential (i.e. non-concurrent) by default, until concurrency is detected by the existence of unacknowledged data in both directions simultaneously. Although concurrent applications do have a think-time, it is not possible to unambiguously determine the think-time without instrumenting the application. For example, ADUs from concurrent connections may constitute approximately 5% of the connections, 25% of the ADUs seen, and 30% of the size in bytes.

One-Pass Approach to Constructing Connection Vectors

In previous work by Hernandez-Campos and others [HCJS07a], A-B-T connection vectors were constructed in an offline fashion. First, packet header traces were captured to disk. Then, a textual representation of the traces was sorted by time within a TCP connection, so that all packets from a particular connection were contiguous and time sorted. Finally, the sorted trace was analyzed to construct the connection vectors. Because only one connection was analyzed at a time, such an approach afforded the algorithm access to the entire packet arrival history of the connection. Storing packet header traces to disk currently requires approximately 30 GB per hour, whereas my approach only uses about 1 GB per hour.

My approach, as implemented in the adudump tool, is similar in many respects; however, because I need a continuous monitoring approach, I cannot analyze traces offline, nor can I require that the input be sorted by connection. This has profound implications, because I must keep track of thousands or potentially millions of active connections. Therefore, the amount of state per connection must be minimized, and it must not be dependent on the number of packets seen in the connection thus far.

Before I describe the details of the one-pass inference algorithm, I will provide an example and give some higher-level intuition for its operation. Consider FIG. 3.2, which shows the packets exchanged in a TCP connection and the inferences made by adudump. The client first sends a SYN segment to the server according to the specification of TCP. Adudump (running on the monitor) records this event with a SYN record, and saves the corresponding packet arrival timestamp. The server responds with a SYN/ACK segment, at which point adudump prints the measured round-trip-time (from the monitor's perspective) in an RTT record. When the client responds with an ACK packet, the TCP three-way handshake is completed, and adudump reports this fact with a SEQ record, which means "start of a sequential connection". All of these records provide contextual information and are not part of the actual A-B-T inference mechanisms.

Next, the client sends 372 bytes to the server, which we will label a request merely because it flows from the client to the server (and not because we leverage HTTP semantics). At this point, adudump merely keeps internal state about the size of the ADU and the time at which it was sent, opting not to report anything because it cannot determine with certainty that the client is finished sending data for now. When adudump sees the server respond with its own ADU, acknowledging (with the acknowledgement number of TCP) all of the request, it then reports the size of the client's request ADU along with the server's "think time". The "think time" reflects the amount of time it took the server to process the client's request and generate a suitable response.

The main body of the connection follows. At a high level, the operation of adudump for a sequential connection such as this one consists of (1) printing records as soon as possible (but no sooner), and (2) keeping track of sequence numbers, acknowledgement numbers, starting points of requests and responses, and the timestamp of the latest segment.

The response time is a crucial metric for measuring server performance, and it is useful to consider this metric in more detail. One weakness of the metric, as measured by adudump running on the monitor, is that it not only includes the amount of time taken by the server to receive, process, and respond to the request, but it also includes a component of network delay in between the server and the monitor, or the time taken to route and deliver a packet to its destination. This is unavoidable in a purely passive solution.

Figure 3:
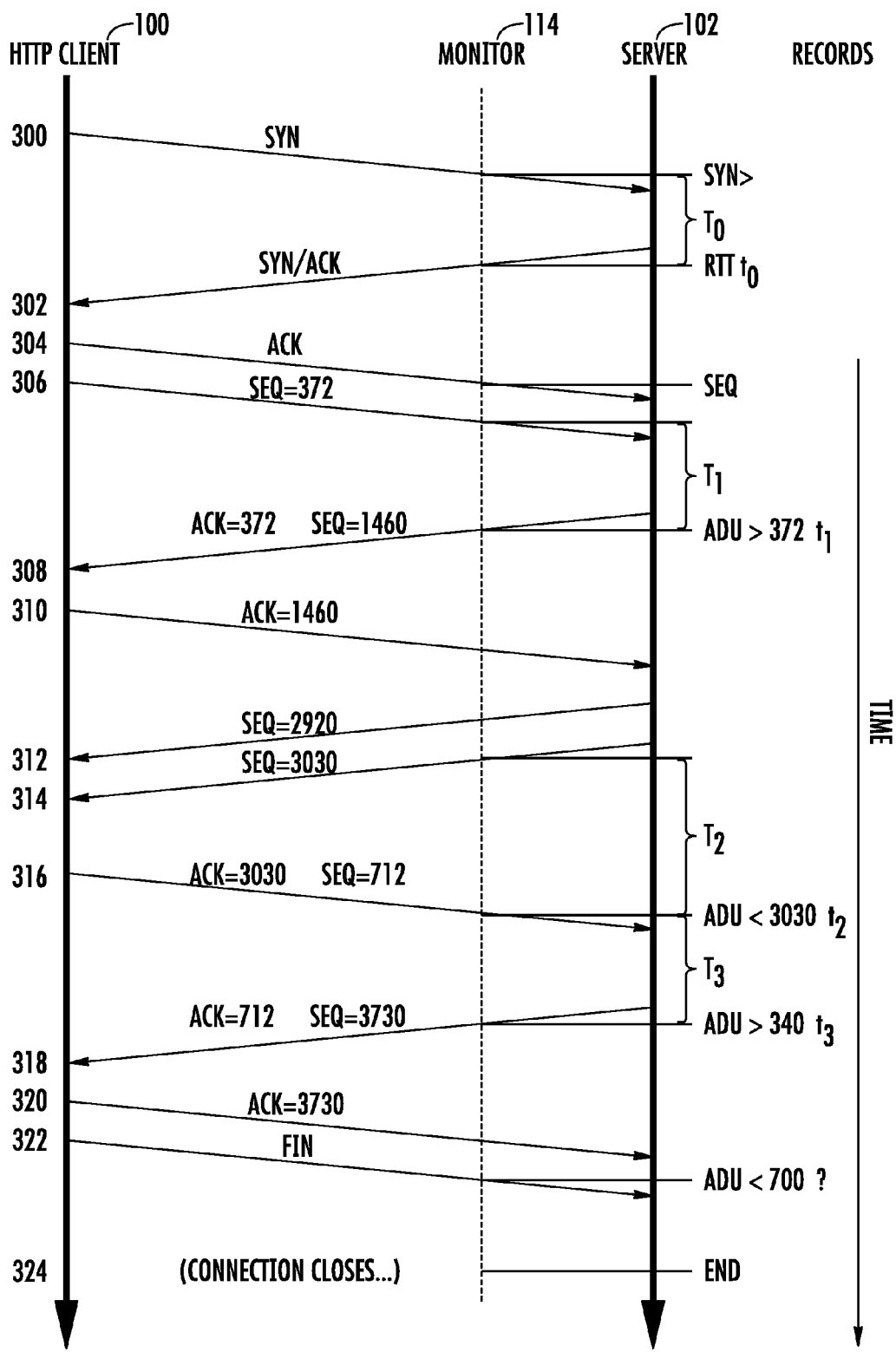
FIG. 3.3 is a diagram showing exemplary route trip time measurements of a TCP handshake for an inbound connection according to an embodiment of the subject matter described herein.

Furthermore, the network delay component for a response time in the UNC monitoring setup is negligible compared to any response times that might be indicative of a performance problem. FIG. 3.3 shows the distribution of RTT (round-trip-time) measurements of the TCP three-way handshake for inbound connections over the course of a 22-minute trace. Over 98 percent of RTTs are less than 5 milliseconds, whereas the response times I am interested in are typically a hundred milliseconds or more. In summary, although the conflation of network delay and server processing time is an unfortunate consequence of the passive measurement approach I take, it does not pose significant problems for a monitor vantage point with small network latency

TABLE 3.1 essential state for a segment record in adudump

| Symbol | Mnemonic | Type | Description |
|---|---|---|---|
| $T_S$ | arrival_time | timestamp | time at which the segment was captured |
| K | connection_id | composite "key" 4-tuple | the local and remote address and port number, as shown in Table 3.2. |
| N | sequence_num | unsigned 4-byte integer | the sequence number of the segment |
| L | payload_size | unsigned 2-byte integer | number of bytes of application data in the segment |
| $N_L$ | next_seq_num | unsigned 4-byte integer | the last sequence number covered by the segment (i.e. $N_L = N + L$) |
| $A_O$ | ack_num | unsigned 4-byte integer | the acknowledgement number of the segment |
| D | direction | enumeration | either IN (i.e. inbound) or OUT (i.e. outbound) |
| F | tcp_flags | set | contains zero or more of: S (SYN), A (ACK), F (FIN), and R (RST) | between it and the server.

An additional advantage of the response time metric is that it includes "top-to-bottom" processing; that is, every aspect of the server's interaction with the request is included in the response time, including the reception of packets at the network interface card, the scheduling of the server application, the execution of the server application, the packetization of outgoing packets, and the queuing delay of sending the packet out. In comparison, most approaches that measure response times from the same machine (including the server's own logging capabilities) will neglect all but the execution of the server application. Thus, the passively measured response time metric represents a more complete picture of the overall response.

Data Structures Used in A-B-T Inference

Before we consider the algorithms of adudump in more detail, I will introduce the data structures manipulated by these algorithms. At a high level, there are two primary data structures: the current segment and the connection state table.

The current segment record, which I refer to as S, contains information from the TCP segment currently being analyzed. There is only one instance of the current segment record. The structure of the record is shown in Table 3.1. The segment record and the connection record both use the connection identifier 4-tuple as the key, which is shown in Table 3.2.

TABLE 3.2 connection identifier structure

| Symbol | Mnemonic | Type | Description |
| --- | --- | --- | --- |
| $I_L$ | local_ip_addr | Internet address | the local (i.e. UNC-side) IPv4 address (See Section 3.1.1.) |
| $I_R$ | remote_ip_addr | Internet address | the remote (i.e. Internet-side) IPv4 address |
| $P_L$ | local_port | unsigned 2-byte integer | the local port number |
| $P_R$ | retmote_port | unsigned 2-byte integer | the remote port number |

The connection state table, which I refer to as T, contains a connection record for each active connection. T is implemented as a chained hash table, keyed by the connection identifier, with 250,000 buckets and three preallocated buckets per chain, and using the hashing functions provided by Bob Jenkins' "lookup3.c" library.

The structure of the records contained in T is shown in Table 3.3. Each connection record contains two flow records, FI and FO, for the inbound and outbound flows, respectively. (Recall that a bidirectional connection contains two unidirectional flows.) The structure of a flow record is shown in Table 3.4.

TABLE 3.3 essential per-connection state in adudump

| Symbol | Mnemonic | Type | Description |
| --- | --- | --- | --- |
| $S_C$ | connection_state | enumeration | either NEW_SYN, NEW_SYNACK, HALF_OPEN, MOSTLY_OPEN, SEQUENTIAL, or CONCURRENT (See Section 3.1.4.) |
| K | connection_id | composite: "key" | the local/remote address/port number, as shown in Table 3.2. |
| $F_I$ | inbound_flow | flow | the inbound flow state |
| $F_O$ | outbound_flow | flow | the outbound flow state |

TABLE 3.4 essential per-flow state in adudump

| Symbol | Mnemonic | Type | Description |
| --- | --- | --- | --- |
| $S_F$ | flow_state | enumeration | either INACTIVE, ACTIVE, or CLOSED (See Section 3.1.4.) |
| $N_O$ | initial_seq_num | unsigned 4-byte integer | the initial sequence number seen in the flow (set during the 3-way handshake) |
| $N_N$ | next_seq_num | unsigned 4-byte integer | the next expected sequence number |
| $N_A$ | adu_seq_num | unsigned 4-byte integer | sequence number of the start of the last request or response |
| $A_O$ | initial_ack_num | unsigned 4-byte integer | the initial acknowledgement number seen in the flow (set during the 3-way handshake) |
| $A_H$ | highest_ack_num | unsigned 4-byte integer | the highest acknowledgement number seen so far |
| $T_L$ | last_send | timestamp | last time a new segment was seen in this direction |

One-Pass Algorithms for A-B-T Inference

This section describes the algorithm of adudump in more detail by considering how the connection-tracking state changes over the lifetime of a connection.

The entire algorithm is driven by packet arrival events. When a TCP packet arrives, adudump checks the corresponding connection state (if it exists) and determines whether the segment should update the state. So, let us first consider what happens when a packet arrives. First, the DAG card receives the packet and attaches metadata to the packet, including a timestamp and the interface on which the packet was observed. The interface number is what enables adudump to distinguish inbound from outbound traffic, since each link is connected to a distinct DAG interface. Adudump interfaces with the DAG card through the CoralReef API, which enables it to work equally well on other types of input, including offline traces in pcap format.

Only certain types of packets are processed. The DAG card provides to adudump every packet received. Non-IPv4 packets are discarded, as are non-TCP packets. Only IPv4, TCP segments are considered for processing. Also, if there is no existing state for the connection of the segment, the segment is only processed if it has enough information to initialize the connection-tracking state without ambiguity—that is, if the segment is either a SYN or SYN/ACK segment. Furthermore, because I am interested only in the performance of UNC servers, and because servers by definition accept rather than initiate connections, I only consider connections that were initiated by a remote host (that is, the initial SYN segment was inbound, and the SYN/ACK segment was outbound). These and other behaviors are run-time options of adudump.

I will begin the discussion of adudump's algorithms by considering what happens at the beginning of a connection, when the segment is a SYN segment and there is no state for the connection. See Algorithm 1, which shows how the connection and flow state is initialized. Because I am only tracking incoming connections, I only care about inbound SYN segments (the second and third preconditions). The new connection function on line 1 adds a new connection with key S.K to the table T of connection states. Then, the notation T [S.K] in lines 2-9 refers to the connection with key S.K in table T. In TCP semantics, the SYN segment advances the window by one byte even

---

Algorithm 1 First SYN segment of a connection

Require: S.K ∉ T
Require: S.F = {S}
Require: S.D = IN
1: newConnection(T, S.K)
2: T[S.K].$F_I$.$N_O$ ← S.N
3: T[S.K].$F_I$.$N_N$ ← S.N + 1
4: T[S.K].$F_I$.$N_A$ ← S.N
5: T[S.K].$F_I$.$A_0$ ← 0
6: T[S.K].$F_I$.$A_H$ ← 0
7: T[S.K].$F_I$.$S_F$ ← INACTIVE
8: T[S.K].$F_I$.$T_L$ ← S.$T_S$
9: T[S.K].$S_C$ ← HALF_OPEN
10: reportSYN(S.$T_S$, S.K, S.D)

--- though it has no application payload, so $F_I$.$N_N$, the next expected sequence number for the inbound flow, is initialized to one more than the segment's sequence number (line 3). The inbound flow is marked as INACTIVE (line 7), which means there is not currently an ADU being sent. The connection state is set to HALF OPEN (line 9), which indicates that we have seen the first part (i.e. the SYN segment) of the TCP connection establishment protocol, called the TCP three-way handshake. Lastly, the reportSYN function (line 10) records the fact that adudump established state to track the connection. Note that $F_I$.$A_O$ and $F_I$.$A_H$ are initialized to zero (lines 5 and 6) because the initial SYN segment does not (and cannot) acknowledge any previous transmissions.

---

Algorithm 2 SYN-ACK segment in a HALF_OPEN connection

Require: S.K ∉ T
Require: T[S.K].$S_C$ = HALF_OPEN
Require: S.F = {S,A}
Require: S.D = OUT
1: T[S.K].$F_O$.$N_O$ ← S.N
2: T[S.K].$F_O$.$N_N$ ← S.N + 1
3: T[S.K].$F_O$.$N_A$ ← S.N
4: T[S.K].$F_O$.$A_0$ ← S.A
5: T[S.K].$F_O$.$A_H$ ← S.A
6: T[S.K].$F_O$.$S_F$ ← INACTIVE
7: T[S.K].$F_O$.$T_L$ ← S.$T_S$
8: T[S.K].$S_C$ ← MOSTLY_OPEN
9: T[S.K].$F_I$.$N_O$ ← S.A − 1
10: T[S.K].$F_I$.$N_N$ ← S.A
11: T[S.K].$F_I$.$N_A$ ← S.A − 1
12: reportRTT(S.$T_S$, S.K, S.D, S.$T_S$ − T[S.K].$F_I$.$T_L$)

---

When the second part of the three-way handshake (the SYN-ACK segment) is received, Algorithm 2 is executed. Precondition 4 is there because adudump only tracks connections for which the server (or connection acceptor) is in the network, which means that the SYN-ACK segment is outbound. Much of the state of the outbound flow is initialized as the inbound flow was in Algorithm 1 (lines 1-3, 6, 7). The connection state is advanced to MOSTLY OPEN (line 8). According to the TCP protocol, the SYN-ACK segment acknowledges the initial sequence number (or ISN) set in the SYN segment. When the SYN-ACK segment is lost, the connection acceptor will sometimes receive multiple SYN segments from the connection initiator with different ISN's. For this reason, it is important to update the sequence numbers of the inbound flow (lines 9-11). Lastly, we report the RTT, or round-trip-time, as measured from the perspective of the monitor (line 12).

When the TCP three-way handshake is completed with the empty ACK segment, thus establishing the connection, Algorithm 3 is executed. Empty ACK segments abound in TCP connections, so preconditions 2 and 6 ensure that the connection context is correct. Just as the SYN-ACK segment acknowledges the connection initiator's choice of ISN, the ACK acknowledges the connection acceptor's ISN, so lines 3-5 update the acceptor's sequence numbers. The connection is advanced to the SEQUENTIAL state (line 7), and the connection establishment is reported with a SEQ record (line 8). Recall that there are two types of connections in the A-B-T model: sequential and concurrent. Connections in adudump are sequential by default, and a connection is only marked as concurrent if there is evidence for concurrency, which I discuss below.

Algorithm 4 shows what happens when a data segment is seen in the context of an INACTIVE flow of a sequential connection. The algorithm is for an inbound data segment only; the outbound case is similar. Data segments by definition contain some amount of application payload, hence Precondition 3. Pure ACKs (i.e. segments without a payload) are redundant information for the problem of A-B-T inference and can be safely ignored. Precondition 4 states that the algorithm is only executed if none of the SYN, FIN, or RST flags are set for the data segment. A data segment with a SYN flag is an error, and the FIN and RST cases are considered in Algorithms 10-13. Finally, the last precondition ensures that the segment is not entirely a retransmission. Partial retransmissions (i.e. segments with both already-transmitted data and new data) will be handled by the algorithm. Note that the >w operator indicates a greater-than operation that respects the boundaries of TCP's wrapped window;

---
Algorithm 3 Connection establishment
in a MOSTLY_OPEN connection
---

Require: $S.K \in T$
Require: $T[S.K].S_C$ = MOSTLY_OPEN
Require: $S.F = \{A\}$
Require: $S.D = IN$
Require: $S.L = 0$
Require: $T[S.K].F_I.A_H = 0$
  1: $T[S.K].F_I.A_O \leftarrow S.A$
  2: $T[S.K].F_I.A_H \leftarrow S.A$
  3: $T[S.K].F_O.N_O \leftarrow S.A - 1$
  4: $T[S.K].F_O.N_N \leftarrow S.A$
  5: $T[S.K].F_O.N_A \leftarrow S.A - 1$
  6: $T[S.K].F_I.T_L \leftarrow S.T_S$
  7: $T[S.K].S_C \leftarrow$ SEQUENTIAL
  8: reportSEQ($S.T_S$, S.K, S.D)

---
Algorithm 4 Inbound data segment arrives
in a SEQUENTIAL connection and an INACTIVE
flow. The outbound case is similar.
---

Require: $S.K \in T$
Require: $T[S.K].S_C$ = SEQUENTIAL
Require: $S.L \neq 0$
Require: $S.F \cap \{S,F,R\} = \emptyset$
Require: $T[S.K].F_I.S_F$ = INACTIVE
Require: $S.D = IN$
Require: $S.N_L >_\omega T[S.K].F_I.N_N$
  // lines 1-9 determine what to set the inbound flow's $N_A$ to
  1: if $T[S.K].F_I.N_N = T[S.K].F_O.A_H \wedge S.N >_\omega T[S.K].F_I.N_N$ then
  2:    if $|T[S.K].F_O.A_H - S.N|_\omega > \alpha \cdot$ MSS then
  3:        $T[S.K].F_I.N_A \leftarrow S.N$
  4:    else
  5:        $T[S.K].F_I.N_A \leftarrow T[S.K].F_O.A_H$
  6:    end if
  7: else
  8:    $T[S.K].F_I.N_A \leftarrow T[S.K].F_I.N_N$
  9: end if
10: $T[S.K].F_I.S_F \leftarrow$ ACTIVE
11: $T[S.K].F_I.N_N \leftarrow S.N_L$
12: $T[S.K].F_I.A_H \leftarrow S.A$
13: $T[S.K].F_I.T_L \leftarrow S.T_S$
14: if $T[S.K].F_O.N_N >_\omega S.A \wedge S.N >_\omega T[S.K].F_O.A_H$ then
15:    $T[S.K].S_C \leftarrow$ CONCURRENT
16:    reportCONC($S.T_S$, S.K)
17: else if $T[S.K].F_O.S_F$ = ACTIVE then
18:    $T[S.K].F_O.S_F \leftarrow$ INACTIVE
19:    reportADU($S.T_S$, S.K, ~ S.D, $T[S.K].F_O.N_N -_\omega T[S.K].F_O.N_A$,
          $T[S.K].S_C$, $S.T_S - T[S.K].F_O.T_L$)
20: end if that is, the >w operator takes into account the case in which the 32-bit sequence number value wraps from the highest value to the lowest. Retransmissions still update the flow's $T_L$ timestamp, however.

Now, consider the body of Algorithm 4. As the comment states, lines 1-9 are concerned with the setting of $T[S.K].F_I.N_A$, which marks the sequence number of the first byte of application data sent in the ADU started by this segment. Line 1 tests for an out-of-order segment; that is, perhaps the first segment of the ADU was lost, and the current segment is actually the second segment. In the case of an out-of-order segment (line 1), $N_A$ is set to the highest acknowledgement number seen in the outbound flow (line 5), unless that number is more than α·MSS away from the current segment's sequence number S.N (line 2), in which case $N_A$ is set to S.N (line 3). The MSS is TCP's maximum segment size, which I assume to be 1,460 bytes. (‖w, like >w, respects window boundaries.) This special case seems unlikely, but it is unfortunately necessary, because, in rare cases, two (broken) TCP implementations will not agree on their respective ISNs during the handshake, which can result in spurious ADU sizes. α controls the extent to which gaps in the sequence number stream are tolerated. Too small a setting will result in legitimate ADUs exhibiting a sequence number gap being ignored, and too large a setting will result in spurious (and potentially large) ADUs being reported; I chose 5 as a reasonable trade-off between these cases.

---
Algorithm 5 The checkQuietTime(T, S.K, τ) algorithm
---

Require: $S.K \in T$
Require: $T[S.K].S_C$ = SEQUENTIAL
  1: if $S.T_S - T[S.K].F_I.T_L > \tau$ then
  2:        reportADU($S.T_S$, S.K, S.D, $T[S.K].F_I.N_N -_\omega T[S.K].F_I.N_A$,
              $T[S.K].S_C$, $S.T_S - T[S.K].F_I.T_L$)
  3:       $T[S.K].F_I.N_A = T[S.K].F_I.N_N$
  4: end if ---
Algorithm 6 The updateSeqNum(T, S.K, ρ) algorithm
---

Require: $S.K \in T$
Require: $T[S.K].S_C$ = SEQUENTIAL
  1: if $S.N_L >_\omega T[S.K].F_I.N_N \wedge |T[S.K].F_I.N_N - S.N_L|_\omega \leq \rho \cdot$ MSS then
  2:        $T[S.K].F_I.N_N \leftarrow S.N_L$
  3: end if Line 10 reflects the fact that the inbound flow is now considered ACTIVE, and lines 11-13 are a standard state update. Line 14 tests for concurrency, which is detected if there is unacknowledged data in both flows, in which case adudump updates the connection state and reports the concurrency detection event. Lastly, line 17 checks for the existence of an ADU in progress on the outbound flow. For sequential connections, the outbound flow is finished with its ADU when the inbound flow begins sending data (and vice versa). In that case, the outbound flow is marked as inactive, and the now complete outbound ADU is reported, including its direction (where ~ indicates the opposite direction), size (where -w also respects window boundaries), the type of connection (i.e. SEQUENTIAL or CONCURRENT) from which the ADU was seen, and its "think time".

The checkQuietTime(T, S.K, τ) algorithm is listed in Algorithm 5, and it will be referred to frequently in later algorithms. The condition in line 1 is true when the current segment arrived at least τ seconds from the flow's $T_L$ timestamp. This case is called a "quiet time" and is controlled by run-time parameter τ, the intra-ADU quiet time threshold parameter, which defaults to 500 milliseconds. In the case of a quiet time, the ADU in progress is reported as finished (line 2), and a new ADU is begun (line 3).

The updateSeqNum(T, S.K, ρ) algorithm, listed in Algorithm 6, is another common algorithm that will be used frequently. It updates the current flow's next sequence number if the current segment is in order, within a certain tolerance. The tolerance is controlled by the parameter ρ (e.g. α), which is maximum size of an acceptable gap, in units of the maximum segment size, or MSS.

When an inbound data segment is seen in the context of an ACTIVE flow of a sequential connection, Algorithm 7 is executed. (The outbound case is similar.) As in Algorithm 4, the last precondition ensures that only data segments with at least some new data (even if some data is also old) are considered—although, as before, if this is the only precondition not met, the flow's $T_L$, timestamp is still updated. Line 1 checks the quiet time condition, as discussed above. Line 2 updates the flow's $N_N$ state variable conditional on β. I found β=15 to be a good choice that balances the probability of missing data (when β consecutive segments are lost and the next is delivered) with the probability of a random sequence number being accidentally within the range (approximately β*MSS/$2^{32}$, or about one in 200,000 when β is 15). It might be acceptable to use a single parameter for both α and β, since they control similar situations. I have not done an in-depth study of this issue, but I merely

---

Algorithm 7 Inbound data segment arrives
in a SEQUENTIAL connection and an ACTIVE
flow. The outbound case is similar.

Require: S.K ∈ T
Require: T[S.K].$S_C$ = SEQUENTIAL
Require: S.L ≠ 0
Require: S.F ∩ {S,F,R} = ∅
Require: T[S.K].$F_I$.$S_F$ = ACTIVE
Require: S.D = IN
Require: S.$N_L$ >$_ω$ T[S.K].$F_I$.$N_N$
 1: checkQuietTime(T, S.K, τ)
 2: updateSeqNum(T, S, β)
 3: T[S.K].$F_I$.$A_H$ ← S.A
 4: T[S.K].$F_I$.$T_L$ ← S.$T_S$

---

Algorithm 8 Inbound data segment arrives in a CONCURRENT
connection. The outbound case is similar.

Require: S.K ∈ T
Require: T[S.K].$S_C$ = CONCURRENT
Require: S.L ≠ 0
Require: S.F ∩ {S,F,R} = ∅
Require: S.D = IN
Require: S.$N_L$ >$_ω$ T[S.K].$F_I$.$N_N$
 1: checkQuietTime(T, S.K, τ)
 2: T[S.K].$F_I$.$T_L$ ← S.$T_S$
 3: updateSeqNum(T, S, β)
 4: T[S.K].$F_I$.$A_H$ ← S.A

--- changed the parameters during the debugging and validation phase as I encountered interesting connections—and in any case, this is a rare issue affecting few connections or ADUs. Lastly, lines 3 and 4 update the flow state.

Algorithm 8 shows what happens when a data segment is seen in a concurrent connection. It is substantially similar to Algorithm 7 for active sequential connections.

The endFlow algorithm, listed in Algorithm 9, will be used frequently in the algorithms to handle RST and FIN segments. The idea is to set the current flow state to CLOSED, and if the opposite flow is also closed, then end the connection. endConn, the dual of newConn, deallocates connection-tracking state.

---

Algorithm 9 The endFlow algorithm

Require: S.K ∈ T
Require: T[S.K].$S_C$ = SEQUENTIAL
 1: T[S.K].$F_I$.$S_F$ ← CLOSED
 2: if T[S.K].$F_O$.$S_F$ = CLOSED then
 3:  reportClose(S.$T_S$, S.K)

---

Algorithm 9 The endFlow algorithm

4:  endConn(T, S.K)
 5: end if

---

Algorithm 10 lists what happens when a RST segment is received. By TCP semantics, the sender of the RST segment guarantees that no new data will be sent, which enables adudump to deduce that any seen or inferred ADU in progress by the RST sender can immediately be ended and reported. The algorithm is predicated on δ, the amount of "gap" seen between the next expected sequence number and the sequence number of the RST segment, which is computed on line 1. Note that if δ is negative, no processing occurs. When δ is 0 or 1 (lines 3-18), all the data sent in the current flow has been accounted for. If the flow is ACTIVE, adudump will report the ADU (lines 7, 16). An active ADU in the reverse direction will also need to be reported (line 11). If the RST packet contains data (which does happen in some TCP implementations), adudump checks the quiet time (line 5). If δ is more than γ·MSS (line 19), then the RST probably has a spurious sequence number, and adudump ignores it, except that it will end and report an active ADU. The last case is when δ is more than 1 but less than γ·MSS (line 24). In this case, the RST represents a sequence number gap that probably indicates missing data, and adudump can infer the presence of an ADU. The ordering of the next steps is very delicate. First, if the flow is inactive, update $F_I$. $N_A$ and $F_I$. $N_N$ to span the inferred ADU (lines 25-28). Next, check for concurrency (lines 29-31 ). Then, if the connection is not concurrent and there is an active ADU in the reverse direction, end and report the ADU (lines 32-35). Lastly, update the flow's sequence number (line 36), report the ADU (line 37), and end the flow (line 38).

Handling the arrival of a FIN segment is the most complicated algorithm. I will break up the algorithm into three cases: (1) a concurrent connection, (2) a sequential connection with an inactive or closed reverse flow, (3) a sequential connection with an active reverse flow. Algorithm 11 lists the behavior of adudump in the concurrent case. This case is the easiest to handle because no matter what the current flow does, it will not affect the reverse flow.

---

Algorithm 10 Inbound RST segment arrives in a SEQUENTIAL
or CONCURRENT connection. The outbound case is similar.

Require: S.K ∈ T
Require: T[S.K].$S_C$ ∈ {SEQUENTIAL,CONCURRENT}
Require: S.F ∩ {R} ≠ ∅
Require: S.D = IN
 1: δ ← S.N − T[S.K].$F_I$.$N_N$
 2: if δ = 0 ∧ δ = 1 then
 3:  if T[S.K].$F_I$.$S_F$ = ACTIVE then
 4:   if S.L > 0 then
 5:    checkQuietTime(T, S.K, τ)
 6:    T[S.K].$F_I$.$N_N$ ← S.$N_L$
 7:    reportADU(S.$T_S$, S.K, S.D, T[S.K].$F_I$.$N_N$ −$_ω$
      T[S.K].$F_I$.$N_A$, T[S.K].$S_C$, 0)
 8:   end if
 9:  else if T[S.K].$F_I$.$S_F$ = INACTIVE ∧ S.L > 0 then
10:   if T[S.K].$F_O$.$S_F$ = ACTIVE then
11:    reportADU(S.$T_S$, S.K, ~ S.D, T[S.K].$F_O$.$N_N$ −$_ω$
      T[S.K].$F_O$.$N_A$,
       T[S.K].$S_C$, S.$T_S$ − T[S.K].$F_O$.$T_L$)
12:    T[S.K].$F_O$.$S_F$ ← INACTIVE
13:   end if
14:   T[S.K].$F_I$.$N_A$ ← T[S.K].$F_I$.$N_N$ Algorithm 10 Inbound RST segment arrives in a SEQUENTIAL
or CONCURRENT connection. The outbound case is similar.

```
15:         T[S.K].F_I.N_N ← S.N_L
16:         reportADU(S.T_S, S.K, S.D, T[S.K].F_I.N_N -_ω T[S.K].F_I.N_A,
            T[S.K].S_C, 0)
17:       end if
18:       endFlow(T,S.K,F_I)
19: else if δ > γ · MSS then
20:       if T[S.K].F_I.S_F = ACTIVE then
21:         reportADU(S.T_S, S.K, S.D, T[S.K].F_I.N_N -_ω T[S.K].F_I.N_A,
            T[S.K].S_C, 0)
22:       end if
23:       endFlow(T,S.K,F_I)
24: else if δ > 1 then
25:       if T[S.K].F_I.S_F = INACTIVE then
26:         T[S.K].F_I.N_A ← T[S.K].F_I.N_N
27:         T[S.K].F_I.N_N ← S.N
28:       end if
29:       if A ∈ S.F ∧ S.A < T[S.K].F_O.N_N then
30:         T[S.K].S_C ← CONCURRENT
31:         reportCONC(S.T_S,S.K)
32:       else if T[S.K].F_O.S_F = ACTIVE then
33:         reportADU(S.T_S, S.K, ~ S.D, T[S.K].F_O.N_N -_ω
            T[S.K].F_O.N_A, T[S.K].S_C, 0)
34:         T[S.K].F_O.S_F ← INACTIVE
35:       end if
36:       T[S.K].F_I.N_N ← S.N
37:       reportADU(S.T_S, S.K, S.D, T[S.K].F_I.N_N -_ω T[S.K].F_I.N_A,
            T[S.K].S_C, 0)
38:       endFlow(T,S.K,F_I)
39: end if
```

Algorithm 11 Inbound FIN segment arrives in a CONCURRENT
connection. The outbound case is similar.

```
Require: S.K ∈ T
Require: T[S.K].S_C =CONCURRENT
Require: S.F ∩ {F} ≠ ∅
Require: S.D = IN
1: checkQuietTime(T, S.K, τ)
2: T[S.K].F_I.A_H ← S.A
3: updateSeqNum(T, S, β)
4: if T[S.K].F_I.N_A ≠ T[S.K].F_I.N_N then
5:    reportADU(S.T_S, S.K, S.D, T[S.K].F_I.N_N -_ω T[S.K].F_I.N_A,
      T[S.K].S_C, 0)
6: end if
7: endFlow(T,S.K,F_I)
```

Algorithm 12 Inbound FIN segment arrives in
a SEQUENTIAL connection, and the outbound flow
is either INACTIVE or CLOSED. The algorithm
for an outbound FIN segment is similar.

```
Require: S.K ∈ T
Require: T[S.K].S_C =SEQUENTIAL
Require: T[S.K].F_O.S_F ∈ {INACTIVE, CLOSED}
Require: S.F ∩ {F} ≠ ∅
Require: S.D = IN
1: if T[S.K].F_I.S_F =ACTIVE then
2:    if S.N >_ω T[S.K].F_I.N_NV S.L > 0 then
3:      checkQuietTime(T,S.K, τ)
4:    end if
5:    updateSeqNum(T, S, γ)
6:    reportADU(S.T_S, S.K, S.D, T[S.K].F_I.N_N -_ω T[S.K].F_I.N_A,
      T[S.K].S_C, 0)
7: else if T[S.K].F_I.S_F =INACTIVE then
8:    if S.N >_ω T[S.K].F_I.N_NV S.L > 0 then
9:      if T[S.K].F_O.N_N >_ω S.A ∧ S.N >_ω T[S.K].F_O.A_H then
10:        T[S.K].S_C ←CONCURRENT
11:        reportCONC(S.T_S, S.K)
12:     end if
13:     if |T[S.K].F_I.N_N - S.N_L|_ω ≤ γ · MSS then
```

Algorithm 12 Inbound FIN segment arrives in
a SEQUENTIAL connection, and the outbound flow
is either INACTIVE or CLOSED. The algorithm
for an outbound FIN segment is similar.

```
14:         T[S.K].F_I.N_A ← T[S.K].F_I.N_N
15:         T[S.K].F_I.N_N ← S.N
16:         reportADU(S.T_S, S.K, S.D, T[S.K].F_I.N_N -_ω
            T[S.K].F_I.N_A, T[S.K].S_C, 0)
17:       end if
18:    end if
19: end if
20: endFlow(T,S.K,F_I)
```

Algorithm 12 lists the behavior of adudump in the second FIN case, when the connection is SEQUENTIAL and the reverse (in this case OUTBOUND) flow is not ACTIVE. In this case, we do not need to worry about ending and reporting the active ADU in the reverse direction (or the associated concurrency checks). The cases of the reverse flow's state (INACTIVE or CLOSED) are handled almost the same, except that if it's closed, we will subsequently close the connection as well.

Algorithm 13 Inbound FIN segment arrives in a SEQUENTIAL
connection, and the outbound flow is ACTIVE. The algorithm
for an outbound FIN segment is similar.

```
Require: S.K ∈ T
Require: T[S.K].S_C =SEQUENTIAL
Require: T[S.K].F_O.S_F =ACTIVE
Require: S.F ∩ {F} ≠ ∅
Require: S.D = IN
1: if T[S.K].F_O.N_N >_ω S.A ∧ S.N_L >_ω T[S.K].F_O.A_H then
2:    T[S.K].S_C ←CONCURRENT
3:    reportCONC(S.T_S, S.K)
4: else if S.N >_ω T[S.K].F_I.N_NV S.L > 0 then
5:    reportADU(S.T_S, S.K, ~ S.D, T[S.K].F_O.N_N -_ω T[S.K].F_O.N_A,
      T[S.K].S_C, S.T_S - T[S.K].F_O.T_L)
6:    T[S.K].F_O.S_F ← INACTIVE
7: end if
8: if S.N >_ω T[S.K].F_I.N_NV S.L > 0 then
9:    T[S.K].F_I.N_A ← T[S.K].F_I.N_N
10:   T[S.K].F_I.A_H ← S.A
11:   T[S.K].F_I.N_N ← S.N_L
12:   reportADU(S.T_S, S.K, S.D, T[S.K].F_I.N_N -_ω T[S.K].F_I.N_A,
      T[S.K].S_C, 0)
13: end if
14: T[S.K].F_I.S_F ←CLOSED
```

Algorithm 13 lists the process of handling an inbound FIN segment in a sequential connection when the outbound flow is active. Note that, because the connection is sequential, the outbound flow being active implies that the inbound flow is inactive, which simplifies things. The ordering of this algorithm is delicate and not obvious. First, adudump checks for concurrency, because if concurrency is detected on this segment, the connection state should be changed (and the concurrency event reported) before reporting any ADUs or connection close events. Therefore, the concurrency check in lines 1-3 occurs first. If concurrency was not detected and the current segment indicates an inbound ADU (either by a sequence number gap or a payload), end and report the outbound ADU (lines 4-7) before the new inbound ADU (lines 8-13). Because the segment is a FIN, it constitutes a promise by the host that it will not send any more data, which is why adudump does not wait for more data before reporting the ADU. Line 14 closes the inbound flow; adudump does not call endFlow here because the outbound flow is never closed at this point.

Measurement

The adudump tool may generate a model of ADU exchanges for each TCP connection seen in the network. The subject matter described herein extends these techniques for online (real-time) inference. This affords the capability for continuous measurement of application-level data. For a given connection, the core inference method is based on an analysis of TCP sequence numbers. As explained in [4], [5], sequence numbers provide enough information to reconstruct the application-level dialogue between two end points. FIG. 1 details the inferences that adudump draws for an example connection. adudump not only reports the size of the ADUs, but the application-level think-time between ADUs. A variety of contextual information is also printed, as shown in Table I. Table II also gives an example of the data format. To understand the inference, consider FIG. 1. The connection "begins" when the three-way handshake completes. This event is marked with a SEQ record. The monitor sees a data segment sent from the client (in this case a web browser) to the server and makes a note of the time it was sent. The next segment is another data segment, sent in the opposite direction and acknowledging the previous data. Thus, adudump may infer that the previous ADU (of 372 bytes) is completed, and generate a record with the ADU's size, direction, and subsequent think-time. The next segment, a pure acknowledgement (i.e. a segment without a payload) is not used in determining ADU boundaries. In general, adudump ignores pure acks. Next, the server continues its response. Again, note that adudump generates no record until it infers that the ADU is complete. Also, note that the think-times that adudump reports are relative to the position of the monitor in the network.

FIG. 3 is a block diagram illustrating a pattern of ADU exchanges between two endpoints of a connection that may be modeled or simulated using the methods and systems described herein. Specifically, FIG. 3 illustrates a one-pass A-B-T connection vector inference example where messages are exchange between HTTP client 100 and server 102 and where the message exchanges are passively monitored by monitor 114. The details of the connection close have been omitted for simplicity.

In order to generate a-b-t traces, data processing module 114 may analyze TCP sequence numbers. As a preliminary step, data processing module 114 may identify packets associated with the same connection using a combination of source IP address destination IP address, source TCP port, and destination PCT port. TCP connection establishment and connection terminating exchanges may be used to identify the start and end of each connection. Once the packets associated with each connection have been identified, data sequence numbers acknowledgement sequence numbers and time stamps may be used to identify ADUs and time periods between ADUs.

Referring to FIG. 3, HTTP client 100 may establish a connection with web server 102 through the exchange of the SYN, ACK, and SYN-ACK messages. Monitor 114 may utilize the SYN, ACK, SYN-ACK exchange to identify the start of the ADU exchange. Once the connection is established, a first data packet may be sent from HTTP client 100 with a sequence number of 372, representing sequence number of the last data byte in the segment. For example, at step 300, HTTP client 100 may send a SYN message to server 102. After a time period $t_0$, server 102 may return SYN/ACK 302 to HTTP client 100. Therefore, monitor 114 may infer a round trip time of $t_0$.

In response to this data packet, an acknowledgment packet with acknowledgment number (ackno) 372 may be sent from the web server 102. The acknowledgment number represents the highest sequence number received by web server 102 plus one. Because web server 102 has received a data packet with a sequence number of 372, the acknowledgment number of 372 may be sent to HTTP client 100 to inform HTTP client 100 that all 371 bytes were received. For example, HTTP client 100 may send ACK 304 and SEQ=372 306 to server 102. After a time period $t_1$, server 102 may return ACK=372 SEQ=1460 308 to HTTP client 100. Therefore, monitor 114 may infer that ADU>372. In step 310, HTTP client 100 may send ACK=1460 to server 102.

When web server 102 sends data packets to HTTP client 100, the sequence numbers in the data packets may be set to 2920 and 3030, respectively, representing the data byte with the highest sequence number, in packets 312 and 314. Following the data packets, HTTP client 100 may send an ACK 316 to web server 102 with an acknowledgement number of 3030 indicating that all 3029 bytes of the file transmitted from web server 102 were received. As a result, monitor 114 may infer a server-side think time of $t_2$ and that ADU>3030. Next, server 102 may return ACK=712 SEQ=3730 318 to HTTP client 100. Thus, monitor 114 may infer a server-side think time of $t_3$ and ADU>340. HTTP client 100 may return ACK=3730 320 and FIN 322 to server 102. Monitor 114 may then infer that ADU>700.

In steps 322-324 of the message flow diagram, the TCP connection is closed through the exchange of FIN and FIN-ACK messages. Monitor 114 may utilize the connection close procedure to identify the end of the connection.

According to another aspect of the subject matter described herein, sequence numbers and acknowledgment numbers can be used to determine ADU sizes as well as a change in the directionality of data transmission. For example, a first data unit may be transported using a single packet and have a size of 341 bytes, and a second data unit may be transported using two packets and have a size of 2,555 bytes. The boundary between the first data unit and the second data unit can be detected by analyzing when sequence numbers stop increasing in one direction and start increasing in the opposite direction.

Validation

The heuristics that adudump uses to infer TCP connection structure are complex. Therefore, it is important to validate the correctness of adudump against a "ground truth" knowledge of application behaviors. Unfortunately, doing so would require instrumentation of application programs. As this is not feasible, we instead constructed a set of synthetic applications to generate and send/receive ADUs with interspersed think times. To create stress cases for exercising adudump, the following were randomly generated from uniform distributions (defined by runtime parameters for minimum and maximum values) each time they were used in the application: number of ADUs in a connection, ADU sizes, inter-ADU think times, socket read/write lengths, and socket inter-read/write delays. There was no attempt to create a "realistic" application, just one that would create a random sample of plausible application-level behaviors that would exercise the adudump heuristics. The generated ADU sizes and inter-ADU think times as recorded by the synthetic applications comprise the ground truth, or the actual data. These synthetic applications were run on both sides of a monitored network link. We captured the packets traversing the link, saving the trace as a pcap file which we then fed as input to adudump, producing the measured data.5 In this way, we can determine how correctly adudump functions. We first tested adudump on sequential connections only and then on concurrent connections only. We will consider each of these cases in turn.

Data

The adudump tool reports the size of the ADUs, the application-level

TABLE 3.5 the types of records output by adudump

| Type | Information | Description |
|---|---|---|
| SYN | t, x, y, d | the initial SYN packet was seen at time t in direction d between host/port x and host/port y; connection-tracking state established |
| SAK | t, x, y, d | missed the SYN, but saw the SYN-ACK, giving us enough information to establish connection-tracking state |
| RTT | t, x, y, d, r | the SYN-ACK packet seen and round-trip-time measurement r |
| SEQ | t, x, y, d | the connection establishment |
| CONC | t, x, y, d | the connection has been determined to be concurrent |
| ADU | t, x, y, d, b, T | an application-level data unit was seen of size b bytes, and there was a think-time afterwards of T seconds. (The think-time is not always available.) |
| INC | t, x, y, d | report an ADU in progress (e.g. when input is exhausted) |
| END | t, x, y, d | the connection is closed; connection-tracking state destroyed |

"think time" between ADUs, and a variety of contextual information, as shown in Table 3.5. Table 3.6 shows the output of adudump for an example connection. I have used adudump to generate a six-month data set of records of all TCP connections entering the UNC campus from the Internet. It is this data set that will be used for the remainder of this paper. In this data, ADUs from concurrent connections constitute approximately 5% of the connections, 25% of the ADUs seen, and 30% of the size in bytes. Overall, I collected nearly five terabytes of data, modeling about nearly 6 billion connections. Tables 3.7 and 3.8 list the individual collections, which were punctuated by measurement faults such as power outages and full disks. The duration of an outage was simply as long as it took for me to notice the outage and restart the collection process. To preserve the privacy of UNC hosts (a requirement for capturing UNC traffic), only inbound connections (i.e. those for which the initial SYN was sent to the UNC network) were captured.

TABLE 3.6 adudump output format for an example connection (IP addresses (but not ports) have been anonymized.)

SYN: 1202706002.650917 1.2.3.4.443 < 5.6.7.8.62015
SEQ: 1202706002.681395 1.2.3.4.443 < 5.6.7.8.62015
ADU: 1202706002.688748 1.2.3.4.443 < 5.6.7.8.62015 163 SEQ 0.000542
ADU: 1202706002.733813 1.2.3.4.443 > 5.6.7.8.62015 2886 SEQ 0.045041
ADU: 1202706002.738254 1.2.3.4.443 < 5.6.7.8.62015 198 SEQ 0.004441
ADU: 1202706002.801408 1.2.3.4.443 > 5.6.7.8.62015 59 SEQ
END: 1202706002.821701 1.2.3.4.443 < 5.6.7.8.62015

TABLE 3.7

Dataset 1: adudump measurements from border link

| begin[a] | end | duration[b] | outage | size | records | ADUs | conns |
|---|---|---|---|---|---|---|---|
| Fr 03/14[c] 22:25 | Th 04/17 03:50 | 33:05:25[d] | 1:14:11 | 813 GB | 11.8 B | 8.8 B | 820 M |
| Fr 04/18 18:01 | We 04/23 07:39 | 4:13:37 | 0:03:35 | 106 GB | 1.6 B | 1.1 B | 116 M |
| We 04/23 11:14 | Th 04/24 03:00 | 0:15:46 | 0:07:38 | 16 GB | 234 M | 161 M | 19 M |
| Th 04/24 10:38 | Fr 05/16 11:19 | 22:00:41 | 0:07:04 | 530 GB | 7.7 B | 5.7 B | 532 M |
| Fr 05/16 18:23 | Fr 05/23 00:06 | 6:05:43 | 5:16:20 | 108 GB | 1.6 B | 1.07 B | 148 M |
| We 05/28 16:26 | Mo 06/30 16:45 | 33:00:19 | 2:20:57 | 482 GB | 7.3 B | 4.7 B | 686 M |
| Th 07/03 13:42 | Fr 08/01 07:07 | 28:17:25 | 0:00:10 | 361 GB | 5.7 B | 3.5 B | 563 M |
| Fr 08/01 07:17 | Tu 08/19 13:12 | 18:05:55 | 1:02:05 | 273 GB | 4.1 B | 2.7 B | 346 M |
| We 08/20 15:17 | Mo 09/01 22:36 | 12:07:19 | 0:21:15 | 242 GB | 3.6 B | 2.5 B | 271 M |
| Tu 09/02 19:51 | We 10/01 21:25 | 29:01:34 | n/a | 629 GB | 9.2 B | 6.5 B | 697 M |
| | | 188:01:44 | 7:04:55 | 3.53 TB | 52.8 B | 36.7 B | 4.2 B |

[a]all times local (EDT); all dates are 2008
[b]durations are listed as days:hours:minutes
[c]days are in MM/DD format
[d]data for Monday, March 17, was lost

TABLE 3.8

Dataset 2: adudump measurements from border link

| begin[a] | end | duration[b] | outage | size | records | ADUs | conns |
|---|---|---|---|---|---|---|---|
| Tu 12/09[c] 15:00 | Th 01/01 09:41 | 22:18:41 | 1:02:11 | 284 GB | 4.3 B | 2.7 B | 383 M |
| Fr 01/02 11:52 | Th 01/15 07:10 | 12:19:18 | 1:04:57 | 188 GB | 2.8 B | 1.8 B | 258 M |
| Fr 01/16 12:07 | Mo 01/19 11:22 | 2:23:45 | 2:03:55 | 54 GB | 773 M | 569 M | 49 M |
| We 01/21 15:17 | We 01/21 15:27 | 0:00:10 | 0:20:03 | 116 MB | 1.7 M | 950k | 146k |
| Th 01/22 11:30 | Fr 01/30 23:55 | 8:12:25 | 0:10:57 | 141 GB | 2.1 B | 1.4 B | 138 M |
| Sa 01/31 10:52 | >Tu 03/10 00:00[d] | >37:13:08 | n/a | >636 GB | >9.3 B | >6.2 B | >634 M |
| | | >82:15:27 | 5:18:03 | >1.3 TB | >19.3 B | >12.7 B | >1.6 B |

[a]all times local (EDT); all dates are December 2008-March 2009
[b]durations are listed as days:hours:minutes
[c]days are in MM/DD format
[d]As of April, 2009, data collection is still ongoing, hence the > symbol

Sequential Validation

These tests produced sequential traffic because the application instances using a TCP connection take turns sending ADUs. That is, they do not send an ADU until they finish receiving the previous ADU. A random packet loss rate of 1% was introduced by FreeBSD's dummynet mechanism, which was also used to introduce random per-connection round-trip times. As with application behavior I use plausible randomized network path conditions to test adudump, but I do not claim realism.

FIG. 3.4(a) plots the actual and measured per-direction ADU size distributions. The dis-tributions are nearly identical. The slight differences are because, in the case of TCP retrans-mission timeouts (with sufficiently long RTT), adudump splits the ADUs, guessing (incorrectly in this case) that the application intended them to be distinct. The default quiet time threshold, which governs this behavior, is 500 milliseconds, so RTTs shorter than this threshold do not split the ADU. I chose 500 ms as a reasonable trade-off between structural detail and solid inference of application intent.

Similarly, FIG. 3.4(b) plots the actual and measured think-time distributions. Note that the actual distributions were different for each direction. Note also that, unlike ADU sizes, adudump cannot exactly determine the actual time, because some non-negligible time elapses between the application's timestamp and the monitor's packet capture. Even so, adudump's measurements are quite accurate.

Concurrent Validation

Although I do not consider the problem of inferring server performance from concurrent connections in this dissertation, it is still useful to validate that adudump constructs correct connection vectors in such cases. In the concurrent tests, each application instance sends multiple ADUs with interspersed think times without synchronizing on the ADUs they receive. I did not introduce packet loss in this case.

TABLE 3.5 the types of records output by adudump

| Type | Information | Description |
|---|---|---|
| SYN | t, x, y, d | the initial SYN packet was seen at time t in direction d between host/port x and host/port y; connection-tracking state established |
| SAK | t, x, y, d | missed the SYN, but saw the SYN-ACK, giving us enough information to establish connection-tracking state |
| RTT | t, x, y, d, r | the SYN-ACK packet seen and round-trip-time measurement r |
| SEQ | t, x, y, d | the connection establishment |
| CONC | t, x, y, d | the connection has been determined to be concurrent |
| ADU | t, x, y, d, b, T | an application-level data unit was seen of size b bytes, and there was a think-time afterwards of T seconds. (The think-time is not always available.) |
| INC | t, x, y, d | report an ADU in progress (e.g. when input is exhausted) |
| END | t, x, y, d | the connection is closed; connection-tracking state destroyed |

FIG. 3.5(a) plots the actual and measured per-direction ADU size distributions. The measured data tracks the actual data well for most of the distribution, but diverges in the tail, demonstrating an important limitation of adudump's passive inference abilities: if one of the applications in a concurrent connection has a genuine application-level think time between ADU transmissions that is less than the quiet-time threshold, then adudump will not detect it, and it combines the two ADUs into one that is larger. This is a type of inference error that is unavoidable because I do not have access to applications running on end systems. Nevertheless, this is a sacrifice I gladly make, because it enables generic access to the behavior of any server without any server instrumentation.

FIG. 3.5(b) plots the actual and measured quiet-time distributions. The measured distributions track well with the actual distributions except that, as expected, there are no think times less than 500 ms, the quiet-time threshold.

Performance Anomaly Detection

The central metric for server performance is the server response time, the time between a request and the subsequent response, also called the server-side think-time. The response time is a special case of the think-time. Think-times and quiet-times are reported by adudump in ADU records. Unfortunately, the current output of adudump is not optimized for determining whether the time reported in an ADU record is a quiet-time, client-side think-time, or server-side think-time. To identify which it is, the subsequent ADU record for that connection must be considered. If (and only if) the current ADU record reports an incoming (i.e. client-to-server) ADU, and the subsequent ADU record reports an outgoing ADU, then the current ADU contains a response time. Thus, I must save a copy of the current record for each connection at all times.

Identifying response times from adudump output is an essential operation of any server performance analysis, and it is one of the first steps performed on the data from adudump. This operation is currently done offline for testing and implementation purposes. Because this operation is important yet requires a potentially large amount of memory, it would be desirable to change the output format of adudump and add logic to adudump to identify response times. For example, instead of a generic ADU record, I could report REQ records for request ADUs, RESP records for response ADUs, and QADU records for the ADUs separated by quiet-times. This is an area for future work.

Distribution Representations

Fundamentally, the requirement is to compare sets of measurements. For example, I often want to compare the set of response times for the past 24 hours with the set of response times over the previous month or two. In particular, note that these sets will almost never have the same number of elements. A very important issue is how the sets should be represented. Different representations lose different amounts of information, and some lend themselves more naturally to comparisons.

A univariate probability distribution is one way of representing a set of measurements. It gives, for each value in the set, a likelihood of a random variable having that value. Thus, the probability density function (PDF) of the random variable X is given by f(X), which has the constraints:

$$f(x) \geq 0, x \in X$$

$$\int_{x \in X} f(x) dx = 1$$

That is, no value in X can have negative probability, and the total probability of all values must sum to 1. This distribution can be equivalently described by a cumulative distribution function (CDF) F(X):

$$F(x)=\int_{-\infty}^{x} f(u)du$$

Intuitively, the CDF is the probability of the random variable being less than or equal to a given value. The CDF is a nondecreasing function. Another way of describing the distribution is by its quantile function (QF), which is also nondecreasing. The QF is the inverse of the CDF: for a given probability p, it yields the corresponding value x such that a random variable would be less than or equal to x with probability p. One complication is that there may be multiple values of x satisfying this condition; the minimum of them is chosen. Thus, the QF Q(p) is defined as:

$$Q(p)=\inf\{u:F(u)\geq p\}$$

One way of representing a set of measurements is with a parametric distribution, or a closed-form, analytical distribution. Many such parametric distributions exist, e.g. the familiar, bell-shaped Gaussian distribution, which has parameters $\mu$ (mean) and $\_2$ (variance). Comparing parametric distributions—whether it is merely the parameters that might be different or whether it is the distributions themselves that might be different—is typically straightforward. However, not all data sets are well described by a parametric distribution. Indeed, because I need a generic solution, I cannot assume that it will always be possible to find a parametric solution for a data set. Therefore, I will use non-parametric, or empirical distributions, which partition the domain of a PDF, CDF, or QF, and assign a value to each partition.

I have several goals in choosing a representation. First, I must be able to compare distributions from the same server, even when the number and range of observations might vary widely. Second, I want a compact representation. Third, I want to maximize the amount of information preserved by the representation; said another way, I want to minimize the amount of information lost by summarizing the distribution into a representation. Lastly, I want a representation for which the population of distributions varies linearly. I will discuss each of these goals in turn.

The first and most essential goal of choosing a representation is that the representations of different distributions can be compared in a natural, general way. For example, consider two distributions of response times from a particular server, one from last Sunday and one from last Monday. These distributions probably have a different size (i.e. the number of observations), and perhaps significantly different. Furthermore, they might have a significantly different range—especially if, say, there was anomalous behavior on Monday. We need a representation that lends itself to comparisons between distributions, even with such differences.

Second, I want a compact representation. This means that using a full empirical distribution (i.e. the entire set of observations) is not acceptable. Furthermore, as we will see, some representations can require additional information to be passed along with the representation itself, such as bin boundaries for discrete PDFs. Although bin boundaries would not preclude a representation, it would make that representation less desirable.

Any representation (other than the full empirical distribution) will involve some amount of information loss, because the representation is essentially a summary, or estimation, of the distribution. The third goal in choosing a representation is that I want to minimize the amount of information loss. The information in a distribution can be quantified with Shannon's information-theoretic notion of entropy, which we will introduce and use below.

Lastly, I want the set of distributions to vary linearly. Each distribution (e.g. the set of response times for a particular server and a particular day) will be summarized with a representation. We will see that these representations can be thought of as points in a high-dimensional space. I want the set of these points to form a linear space within this high-dimensional space. For example, I desire that the points might form a line (one inherent dimension), or a plane (two inherent dimensions), or a hyper-plane (three or more inherent dimensions), in this high-dimensional space. I do not want the points to form a curved space such as a curved line or a curved surface, because the analysis of such spaces is much more difficult and computationally intensive.

Given that we cannot use parametric representations (in which we could simply compare the parameters among distributions), we must find another way of allowing comparisons to be made between distributions. The typical way of doing this is to use a "binned" representation. In other words, the range of the empirical distribution is partitioned into a fixed number of bins, and the value of each bin is a function over the observations within that bin. Note that the number of bins will not change.

Perhaps the most common empirical representation is a histogram, which is a discrete PDF. The range of the distribution X is partitioned into subsets $p_i$, forming b "bins". Each observation falls into exactly one bin. Let $x_i$, i=1 ... N be the distribution of N observations, and let $[a_1, b_i)$ be the boundaries of partition $p_i$, with $\alpha_1=-\inf$ and $b_n=\inf$. Then a histogram $\underline{h}$, a vector, is defined as the count of observations per bin:

Note that the constraints of this discrete PDF are parallel to the constraints of a continuous PDF: $\Sigma_{i=1}^{b} h_i=1$ and $0 \leq h_i \leq 1$, i=1 ... b. Similarly, a cumulative histogram $\underline{H}$ is the discrete version of a CDF:

$$H_i=|\{x_j:x_j<b_i\}|, i=1 \ldots b$$

where $0 \leq H_1 \leq \ldots H_b \leq 1$.

In many applications, discrete PDFs and CDFs use bins of equal size. (That is to say, the "width" of bins, not the count of observations per bin, are typically equal.) However, this approach works poorly for most sets of server response times (and request/response sizes). Since the data varies over several orders of magnitude, a better choice for bins is to equalize their widths on a logarithmic scale. For example, FIG. 4.1 shows a PDF of response times for an example server with 100 bins, where the 99 bin boundaries are equally spaced between the logarithms of the minimum and maximum response times in the distribution. Unfortunately, even this scheme yields a histogram with many near-zero values. This effect is undesirable because the informational content of the histogram is then reduced. A histogram with b bins is essentially a vector of length b, which we can think of as a point in b-dimensional space. If one of the bins is always zero, then we actually have a (b−1)-dimensional space embedded in the b-dimensional space; in other words, we are wasting a dimension. This would be like using three dimensions to describe a set of points, even though all the points fall on the x-y plane.

The informational content of a histogram is defined using Shannon's entropy [Sha48], H($\underline{h}$), where h is a histogram as defined above, with b bins. Additionally, let n be the total number of observations. Then the entropy is:

$$H(h) = -\sum_{i=1}^{b} \frac{h_i}{n} \log_2\left(\frac{h_i}{n}\right)$$

Intuitively, the entropy is at its maximum value of $\log_2 b$ when each bin of the histogram has the same count (i.e. the histogram is "flat"), and the entropy is at a minimum value of 0 when all of the observations fall into a single bin (i.e. the histogram is a single "spike"). Recall that we want to minimize the amount of information lost when summarizing the original distribution into a representation. This means that we want to find a representation of the distribution with a large entropy. A simple approach to determining the bin boundaries is not acceptable because it will often result in many empty bins, and thus significant information loss. Therefore, we need to pick the bin boundaries more carefully.

However, because we need to compare distributions, we need a single set of bin boundaries to use for all the distributions of a particular server. Even a careful partitioning of the range of the distribution will result in a poor choice of bin boundaries for an anomalous distribution, because the range can vary significantly. Furthermore, a more carefully tuned scheme for selecting bin boundaries will result in a less compact distribution: instead of specifying bin boundaries with two values (e.g. "the bin boundaries are equally spaced between x and y"), we now need to give the entire set of (b−1) bin boundaries. Instead, consider a discrete version of the QF. The crucial difference between a QF and a PDF or CDF is that the domain of a QF is fixed. A PDF or CDF will have a domain defined by the range of observations seen in a distribution, whereas a QF's domain is always [0, 1], the set of valid quantiles. Therefore, a QF works equally well, regardless of the range of a distribution. Furthermore, dividing the domain of a QF evenly results in a set of bins that contain an equal number of observations (ignoring discretization effects), thus yielding maximum entropy. However, a simple count of the values in each bin would be rather boring, because it would always be flat, so instead, we average the values in each bin, thus preserving the effect of outliers. Let Q (a vector) be the discrete quantile function of a set X:

$$Q_i = b \int_{\frac{i-1}{b}}^{\frac{i}{b}} Q(x)dx, i = 1, \ldots, b,$$

For example, say we want the second value of the 10-bin discrete QF of the distribution X, or $Q_2$. The second bin corresponds to quantiles in the range of [0.10, 0.20), i.e. the 10th through 19th percentiles. If the 0.10 quantile corresponds to a value of j (meaning 10 percent of values in X are less than or equal to j), and the 0.20 quantile corresponds to k, then let c be the sum of all observations in X within the range U, k), and d be the count of the observations. Then $Q_2$ is simply c/d. Note that, when computing a 10-bin discrete QF of multiple distributions, the bin boundaries of e.g. [0.10, 0.20) will never change, even though j, k, c, d, and $Q_i$ will change among the distributions.

The discrete QF does not need to worry about finding appropriate bin boundaries, and it preserves more information than either a discrete PDF or a discrete CDF with poorly chosen bin boundaries. Clearly, it is the best choice of a representation so far. However, there is another option. We could let the quantile function over some "training" distribution (e.g. the first two weeks of response times for a server) define the permanent bin boundaries of PDFs/CDFs of corresponding measurements for that server. I will call these adaptive PDFs and CDFs. The aforementioned drawbacks to PDFs and CDFs still apply to adaptive PDFs/CDFs (or aPDFs/aCDFs): these bin boundaries would not adapt well to anomalous distributions with significantly different ranges, and they are not as compact because the bin boundaries must be saved. However, they have the advantage of minimizing the information loss for the PDF/CDF representations. We will compare these three representations (QFs, aPDFs, and aCDFs) in terms of the final goal: linearity among distributions.

Recall that, as I summarize a distribution into a b-bin PDF or CDF or QF, I can consider that representation (which is actually a vector of length b) as a point in b-dimensional space. The fourth and final goal of choosing a representation is stated in terms of the "spread" or variation of a population of such points in the b-dimensional space: I want the spread to be linear, forming a plane or hyper-plane in the space, rather than a nonlinear variation, which forms a curved manifold. Perhaps surprisingly, the choice of representation does affect the linearity of the variation. Broadhurst [Bro08] showed how different types of variation among distributions can have linear variation using certain representations. For example, if all of the distributions in a population are parametric (e.g. Gaussian), and the distributions vary in terms of the parameters, then the QF representation will have linear variation. FIG. 4.2 illustrates this effect. Consider two Gaussian distributions. Each can be represented as a PDF or a CDF, and each of these representations can be considered a point in a multidimensional space (where the number of bins determines the number of dimensions). An interpolation is a point in this space that lies on the line connecting the two distributions. An interpolation in the PDF (top) or CDF (middle) space yields a mixture of two Gaussian distributions, whereas an interpolation in the QF space (bottom) yields a pure Gaussian distribution. On the other hand, if the distributions are mixtures of parametric distributions, and they vary in terms of the weights of the mixture (e.g. one distribution is forty percent Gaussian and sixty percent Poisson, whereas another is fifty/fifty), then the PDF and CDF will have linear variation.

As mentioned above, however, I rarely see distributions in my data that conform to a well-known parametric representation. In such cases, Broadhurst uses PCA, or principal components analysis, to determine the extent to which a particular representation varies linearly among the population, relative to the other representations. Intuitively, if the data forms e.g. a two-dimensional plane in b-dimensional space, then PCA will compute the perpendicular vectors defining the plane, even if the plane is skewed from the input coordinate system. In such a case, the first two singular values returned by PCA, which are sorted descendingly, will be nonzero, and all others will be zero. The same is true if the data inherently varies linearly in any d-dimensional subspace, d<b: only the first d singular values (which, again, are sorted) will be nonzero. With real data (and computers with limited precision), the singular values are rarely zero, but can often be close enough to zero as to be negligible.

I briefly explore this issue below. I looked at 179 day-long distributions of response times for the top ten most popular servers in my data, thus forming ten populations, each of size 179 distributions (or points). These distributions were represented as 100-bin aPDFs (FIG. 4.3(*a*)), 100-bin aCDF (FIG. 4.3(*b*)), and 100-bin QF (FIG. 4.4(*a*)). For the aPDF and aCDF representations, I chose bin boundaries according to the QF of the entire population, so any widely varying ranges of response times were accounted for before the bin boundaries were chosen.

FIG. 4.4(*b*) shows the cumulative normalized singular values from PCA over each of the representations, for one of the ten servers. The quicker the curve converges to y=1, the better PCA is able to capture the variation of the population using a particular representation, and hence the more linear the variation using that representation. We see that the QF representation 65 yields the most linear variation for this server. Indeed, the same is true for all ten servers, though I omit the plots here. Therefore, I will only use the QF representation throughout this dissertation, unless noted otherwise.

<p style="text-align:center">Principal Components Analysis</p>

An important technique used in the subject matter described herein is called principal components analysis, or PCA. The input to PCA is a set of nb-bin QF vectors, which can be considered as n points in a b-dimensional space. Intuitively, PCA finds the directions of greatest variation among the points, and it is useful because it accounts for correlations among the bins of the QF vectors. Thus, for example, if a new distribution is consistently ten percent higher in all of its b QF bins, it is only penalized once, rather than b times.

The first k principal components (or directions of greatest variation) identified by PCA are used to form the normal basis. In addition, the (b−k) remaining principal components are combined for form a single "error component". These (k+1) components form what I call the "normal basis" for a server. Intuitively, the normal basis for a server is its profile defining what is normal performance for the server. It also defines the extent to which normal performance varies, e.g. from weekday to weekend or between different seasons. Recall that the fundamental operation of my anomaly detection techniques is to determine how dissimilar a new response time distribution is compared to its past performance. This past performance is defined by the normal basis and discusses how this comparison, called an "anomaly test," is performed. The output of the anomaly test is an anomaly score.

Principal components analysis, or PCA, finds the principal components, or the directions of greatest variation, in multivariate data. Because multivariate data is often correlated, the information contained in the data can often be represented in fewer dimensions. For example, data points in three dimensions (i.e. tri-variate data) might be planar, forming a two-dimensional object in three-dimensional space. PCA will find the vectors along which the data vary, and the extent to which the data varies along each of these vectors. So, in the example of planar data in three dimensions, PCA gives us three vectors, with the third being perpendicular to the data plane and having a corresponding weight of zero.

Say we have an n×b data matrix $X=\{X_{ij}\}$. The n rows of X are discrete quantile functions, vectors of b elements each. The b columns, vectors $\overline{X}_j$, are the measurements corresponding to a particular dimension (in this case a bin of the QF); for example, $\overline{X}_1$ is the first bin from each quantile function. Thus, X has dimensions n×b. To compute the principal components, we first compute the mean vector μ, or the row vector containing each of the column means:

$$\mu_j = \frac{1}{n}\sum_{i=1}^{n} x_{ij}, j = 1 \ldots b$$

We then center the data at the origin by subtracting out p to get a centered data matrix Z:

$$Z_{ij}=X_{ij}-\mu_j, i=1\ldots n, j=1\ldots b$$

Now, the mean of each column Z is zero. Now we compute C, the covariance matrix of Z. The covariance of two vectors $\overline{X}_i$ and $\overline{X}_j$ is given by:

$$cov(\overline{X}_i,\overline{X}_j)=E[(\overline{X}_i-E[\overline{X}_i])(\overline{X}_j-E[\overline{X}_j])]$$

Where E is the expectation operator:

$$E[X] = \frac{1}{|X|}\sum_{i=1}^{|X|} X_i.$$

Note that because we already centered the data, $E[\overline{Z}_j]=0, j=1\ldots b$, where $\overline{Z}_j$ is the $j^{th}$ column of Z. The covariance matrix C then gives the covariance of the columns (or dimensions) of Z:

$$C_{ij} = cov(\overline{Z}_i, \overline{Z}_j) = E[(\overline{Z}_i)(\overline{Z}_j)] = \frac{1}{n}\sum_{k=1}^{n} Z_{ik}Z_{jk}$$

At this point, PCA is simply the eigenvalue decomposition of C; that is, representing C in terms of its eigenvectors and eigenvalues. The eigenvectors are sorted by their corresponding eigenvalue so that the most significant eigenvector is first. The first eigenvector (or principal component), $V_1$, represents the vector of greatest variation among the original data. The second eigenvector, $V_2$, is orthogonal to the first, and represents the greatest remaining variation after ignoring the first eigenvector. This process repeats for all b eigenvectors, each of them linearly independent from all the previous ones, thus forming a b×b orthonormal basis V, which is also called a rotation matrix. The eigenvalues $\{\lambda_i\}$ specify the standard deviation of the data along each of these eigenvectors. In some cases, primarily when n<b, the rank of the covariance matrix will be less than b, and there will not be b legitimate eigenvectors. In such a case, the corresponding eigenvalues will be zero, and PCA will choose arbitrary vectors to complete the basis V, obeying the constraint that all vectors are mutually orthogonal.

<p style="text-align:center">Discrimination</p>

The basic operation of my methodology is to decide whether a given distribution of response times for a particular server is well described by the historical population of distributions of response times for the same server. If it is, the new distribution is considered "normal", or "non-anomalous". Otherwise, the distribution is considered anomalous.

This is a difficult operation because of the requirement that it work equally well on a wide variety of input data. The population of distributions might be normally distributed in the quantile-function space—but typically it is not. The population might have a wide "spread", or it might not. The shape of the distributions is completely arbitrary. In general, there are very few assumptions that I can make globally for all servers, and my methods must work well in all cases.

Let's assume we have a set of n distributions, each a b-bin quantile function, as the input data. We represent this dataset as a n×b data matrix, X. This data matrix is first zero-centered by subtracting the mean vector, and the means of each column are saved in the vector μ. The result is then analyzed according to PCA to determine the primary (orthogonal) components of variation (the eigenvectors or principal components, $V_i$), and the amount of variation accounted for by each component (the eigenvalues or singular values $\lambda_i$).

I then form a basis, which defines the sort of distribution that is considered "normal", or typical, based on the population seen so far. First, let L be the total variation of all the principal components, or $\Sigma_{i=1}^{b} \lambda_i$. Then let $R_i$ be the amount of variation remaining after principal component i:

$$R_i = \sum_{j=i+1}^{b} \left(\frac{\lambda_j}{L}\right), i = 1 \ldots b$$

Note that $R_i$ is always less than one, $R_b$ is zero, and the sequence of $R_i$ is nonincreasing. The "normal" basis is formed by including principal components until $R_i$ is less than some threshold value, which I call basis_error. In other words, if there are k principal components in the basis, then $R_k$ is the last value of R that is greater than basis_error. Intuitively, the basis_error parameter controls the specificity of the basis: the lower the value, the more specific to the input the basis will be, and the higher the value, the looser it will be.

The basis B is a b×k matrix, where k is the number of principal components included. This basis represents a k-dimensional subspace of the original b dimensions, and it is the inherent dimensionality of the data at a tolerance of basis error. Each of the input points (which are the original distributions) have a certain projection error onto this basis; that is, there is some distance between the original distribution and its projection onto the k-dimensional subspace. If Z is a (b-dimensional) point and Z' is its (k-dimensional) projection onto the basis, then let Z" be the projection expressed in terms of the original b dimensions, or $Z'B^T$. Then the projection error of Z is defined as the Euclidean distance from Z to Z":

$$PE(Z) = \left(\sum_{i=1}^{b} (Z_i - Z_i'')^2\right)^{\frac{1}{2}}$$

I call the mean of the projection errors $\mu_p$, and the variance of the projection errors $\lambda_p$. In this way, I essentially "roll up" all of the leftover dimensions into a single dimension, which I call the "error" dimension. Thus, the number of dimensions in the basis is controlled by the inherent dimensionality of the data, rather than an arbitrary choice of b.

I now describe the basic operation of the discrimination process, which I call the anomaly test. The idea is to compare a distribution to be tested for being anomalous against the basis formed by a population of distributions, and to quantify the extent to which the tested distribution is not described by the basis. First, the tested distribution (which is, in its QF representation, a b-dimensional point) is zero-centered by subtracting the mean vector, p, to get a (row) vector I will call T. T is then multiplied by the basis B to get T', the projection of T onto the basis. One can think of this operation as changing the coordinate system of T from the original coordinates (the quantile bin values from 1 . . . b) to the PCA-defined coordinates (the distance along principal components 1 . . . k). Then, I compute PE(T)–$\mu_p$, or the zero-centered projection error of T, and call it p.

At this point, I have T', the zero-centered coordinates of the test distribution in terms of the principal components, $\lambda$, the variances of the original data along each of the principal components, p, the zero-centered projection error of the test distribution, and $\lambda_p$, the variance of the original projection errors. In other words, I have k+1 zero-centered values along with the variance of each of these values as defined by the original population. I can now compute the standardized distance from the basis to the tested distribution. The standardized distance is a special case of the Mahalanobis distance in which the covariance matrix is diagonal. Our covariance matrix is diagonal because PCA returns a set of components that are mutually orthogonal, thus removing correlations among the original components. The standardized distance between two d-dimensional points X and Y is defined as:

$$SD(X, Y) = \sum_{i=1}^{d} \left(\frac{(X_i - Y_i)^2}{\sigma_i^2}\right),$$

Where $\sigma_i^2$ is the variance along the dimension i. In my application, I am measuring the distance of the test distribution to the origin to compute the output of the anomaly test, which I call the anomaly score:

$$AS(T) = \sum_{i=1}^{k} \left(\frac{(T_i')^2}{\lambda_i}\right), + \frac{p_2}{\lambda_p}$$

Intuitively, the anomaly score measures the extent to which the test distribution is not described by the basis. If the test distribution is well described by the basis, then its anomaly score will be near zero; otherwise, it will be large. Note that, because we are dealing with a standardized distance metric, the anomaly score is unaffected by the scale and the spread of the input population. In other words, an anomaly score of twenty is comparable, even between servers with drastically different variances. An anomaly score less than a parameter anom_thres is considered non-anomalous; otherwise, it is classified as an anomaly of some severity.

If the test distribution is deemed to be normal (or non-anomalous), then it is added to the set of distributions used to define the normal basis. This is done to make the process adaptive to gradual shifts in the behavior of a server, whether because of seasonal changes in the demand placed on the server, the gradual aging of the server, or other reasons. At a high level, this is a "windowing" operation: the oldest day in the input set is dropped out of the window as the newest normal day is incorporated. The size of the window, window size, is a parameter. Once the input set is established, the normal basis is recomputed using PCA, as detailed above. On the other hand, if the test distribution is considered anomalous, it is not added to the normal set, and the current basis is reused.

An astute observer might ask: why must you use PCA? Why not just compute the Mahalanobis distance on the original b dimensional input data and test distribution? The (generalized) Mahalanobis distance incorporates the correlation among dimensions, so that the test distribution is not penalized multiple times for being on the edge of some envelope. However, the Mahalanobis distance uses the covariance matrix, which will be singular if the number of samples is less than the number of bins—the so-called "high-dimension low-sample-size (HDLSS) situation". The HDLSS situation is common in my application, and a singular covariance matrix will yield infinite or otherwise nonsensical Mahalanobis distances, so we use PCA as an approach more robust to the HDLSS situation.

Bootstrapping

One problem is that, as response time distributions are being collected to form the normal basis, there is no guarantee that all the distributions will reflect normal operation. There is the possibility that some of these distributions will be anomalous. This section discusses this issue and offers a "bootstrapping" technique to cross-validate the input training set.

Bootstrapping is the process of selecting a set of input data to use as the definition of normal behavior for a server. The output of bootstrapping is referred to as the "initial basis" of normality for the server. This basis may change over time as distributions deemed to be normal are added to it and others are dropped. Bootstrapping is done as early as possible after measurements are collected, and it is complicated by the potential presence of abnormal values. The bootstrapping process, also called cross-validation, is intended to be as automatic as possible, but it is impossible to get it "right" (a subjective determination) in all cases. For example, the input set to be validated might have half or more abnormal distributions. Therefore, while automatic methods are used by default, not only are the parameters adjustable by the network manager, but the network manager can also select the initial basis manually.

First, a number of distributions are accumulated. The number is a parameter that I call tset_size. I must choose tset_size as a reasonable trade-off between the delay of making anomaly decisions and the stability of the training set. Too small a value of tset_size means that the basis can fail to account for the natural, non-anomalous variation of the server's operation.

The bootstrapping process, shown in pseudo-code in Algorithm 14, is composed of k iterations (where k is a parameter), for i from k down to 1 (lines 2-10). At each iteration, all combinations of i distributions among the training set are left out, i.e. C(n, i) total combinations, where n is the number of distributions and C is the combination function $$\frac{n!}{((n-1)!i!)}.$$

For each combination,

---

Algorithm 14 The bootstrapping process, where n is the number of distributions, k is the maximum number of days to exclude, and X is the array of n distributions. getAllCombinations returns all combinations of k items selected from n total items as an array of arrays.

1: bootstrap(n, k, X):
2:   for i ← k downto 1:
3:     C[ ][ ] ← getAllCombinations(n, k)
4:     for j ← 1 to length(C)
5:       Z ← {$X_{C[j][1]}, X_{C[j][2]}, \ldots$} // let Z be the distributions excluded from X
6:       Y ← {X – Z} // let Y be everything but the excluded distributions
7:       N ← formNormalBasis(Y)
8:       S[ ] ← anomScores(N, Z) // test each item of Z against the normal basis N
9:       A[j] ← mean(S)
10:     endfor
11:     m ← indexOfMaximum(A)

---

Algorithm 14 The bootstrapping process, where n is the number of distributions, k is the maximum number of days to exclude, and X is the array of n distributions. getAllCombinations returns all combinations of k items selected from n total items as an array of arrays.

12:     if A[m] > anom_thres:
13:       Z ← {$X_{C[m][1]}, X_{C[j][2]}, \ldots$}
14:       Y ← {X – Z}
15:       return formNormalBasis(Y)
16:     endif
17: endfor
18: return formNormalBasis(X)

--- the i left-out samples are individually tested (line 8) against the basis defined by the remaining n–i samples (line 7), and the average anomaly score for that combination is saved (line 9) as a measure of how dissimilar the left-out samples are from the rest. If the maximum for all the metrics (line 11) is greater than the anomaly score threshold (the same one used in the previous section for determining whether a single point is anomalous), then the bootstrapping process ends, defining the initial basis as that formed by the input set minus the maximally dissimilar combination (lines 13-15). Otherwise, if no combination yields an average score above the threshold, the process repeats for (I–1). If none of the k iterations gives any value above the threshold, then all n samples are substantially similar (or else more than k samples are dissimilar from the rest), and the initial basis is formed by all n samples (line 18).

Parameters

This section describes the various parameters used in the anomaly detection approach. While there is no "correct" setting for any of the parameters, each of them affects the ability of my methods to identify anomalies of interest to a network manager.

To show the effect of each parameter, I ran the anomaly detection analysis on several exemplary servers. The parameter settings were chosen according to the default settings given here, except when they are varied to demonstrate their effect. An initial training set of tset_size=21 days was chosen. The training set was bootstrapped, identifying at most two days to exclude when creating the normal basis. The basis is formed with a basis error setting of 0.01, and then the anomaly score was computed. If the anomaly score was less than anom_thres=50, then the test day is added to the window (the maximum size of which is window_size=60), and the new basis is computed at the same setting of basis error. Lastly, I use num_bins=40.

Basis Error

The basis error is the maximum amount of relative variation explained by the "error" dimension. In other words, principal components (which, remember, are sorted by importance) are added to the normality-defining basis until there is only basis_error*100 percent of the overall variance remaining.

Intuitively, the basis_error parameter controls the "tightness" of the fit of the basis. The closer basis_error is to zero, the more fully the basis will describe the data upon which it is based, and the lower the expected error. When another distribution is tested against the basis, it must also have a low projection error, or else it will be flagged as anomalous.

FIG. 4.17 shows a CDF of all of the anomaly scores for all servers, at various settings of basis error. Various anomaly thresholds (which we will use in later results) are shown as vertical lines. In general, the higher the setting of basis_error, the more tolerant the basis is, and the lower the anomaly score.

Window Size

The window_size parameter defines the maximum number of days to use when defining a new basis. After a new distribution is determined by the anomaly test to be non-anomalous, it is added to the "window" of most recent non-anomalous days from which to define a normal basis. If the addition of this distribution pushes the window over the limit defined by window_size, then the oldest distribution in the window is dropped.

Intuitively, the window_size setting is the amount of "memory" of the system. The larger the setting of window size, the more tolerant the basis is to different distributions, because a larger variety of distributions comprises the normal basis. If there is a natural "lull" during certain periods (such as the winter break at UNC), the window should be large enough that the distributions before the lull are not forgotten.

FIG. 4.18 shows the distribution of anomaly scores for the server address/port pairs in the corpus at various settings of window_size. Note that the window starts out, before the first anomaly test, at a size of tset_size minus whatever days were excluded by the bootstrapped (at most two). I am only testing the corpus through March 9th, which is 81 days or about 12 weeks from the beginning of the corpus. This is a major reason why a window_size of 100 gives almost identical results to a window_size of 70: there are a maximum of 21 days that the basis could possibly be different, and probably fewer because of the existence of anomalies (which do not grow the window).

Training Set Size

The tset_size parameter defines the number of distributions required for a training set, which will then be bootstrapped to determine whether, out of the first tset_size distributions, some are unusual and should be excluded when computing the initial basis of normality. We would like this parameter to be as small as possible, because it determines the number of days we must wait after starting data collection before making any real anomaly decisions.

FIG. 4.19 shows the distribution of the anomaly scores at various settings of tset_size. In general, the larger the setting of tset_size, the lower the anomaly score. Clearly, a setting of tset_size=5 is too small, because the anomaly scores are unreasonable. One might argue that a setting of 50 is too large: since at most two distributions can be excluded, some unusual distributions might be included in the initial basis of normality, thus reducing the anomaly score of legitimate anomalies.

I have not explored the effect of changing the maximum number of days that bootstrapping can exclude from the training set. With a tset size=21, I argue that 2 is a reasonable value for this parameter, so that, if one day per week is consistently unusual, then it will include that day in what is considered normal. Furthermore, increasing this value incurs exponential computational cost unless a more clever approach is invented. But regardless of algorithmic efficiency, it is important to keep in mind that bootstrapping is inherently a very subjective task; we cannot know a priori what distributions, out of the first few, will prove to be normal. For this reason, I have provided a way for the network manager to reset the basis, even manually deciding which distributions should be considered normal.

Number of Bins

The num_bins parameter controls how a distribution of e.g. response times is represented as a quantile function (QF). The more bins, the greater the granularity of the QF, the higher dimensional space each QF resides in, and the more information is preserved when summarizing the distribution as a QF.

FIG. 4.20 shows the distribution of anomaly scores at various settings of num_bins. In general, the fewer bins, the lower the anomaly score. This occurs for two reasons. First, recall that the number of summands in the anomaly score is equal to the number of dimensions in the basis, plus one for the projection error. Therefore, as the number of dimensions increases, the anomaly score tends to increase as well. When there are fewer bins overall, the number of dimensions in the normal basis tends to be smaller, hence the generally lower anomaly score. The other reason is that, if the population of distributions varies in a nonlinear fashion in the b-dimensional space, the effects of the nonlinear variation will increase as b (or num_bins) increases. However, this is not a reason to choose a lower setting for the num_bins parameter, because the fewer bins, the less information is captured in the QF.

Anomaly Threshold

The anom_thres setting controls two things: the threshold of the anomaly score by which a distribution is judged as anomalous, and the decision of whether to include that distribution in the window of distributions used to define a normal basis. Actually, we will consider several different thresholds for the anomaly score that define a range of severities— so the latter effect is more significant.

Intuitively, the anom_thres parameter defines the "stability" or even "stubbornness" of the basis: the lower the anom_thres setting, the more resistant the basis is to change, because too abrupt a change will not be added to the window used to compute the basis. If we desire to track only very gradual changes in the operation of a server, then we should set this parameter lower. If, on the other hand, we want to permit a relatively wide range of distributions to be considered non-anomalous, and only flag the egregious distributions as anomalous, then we should set this parameter higher. FIG. 4.21 demonstrates this intuition with an example. With an anomaly threshold of 50, most of the distributions after a shift on January 7th are considered anomalous, whereas an anomaly threshold of 200 allows the distribution from January 7th to be considered normal, which causes all of the following distributions also to be considered normal.

FIG. 4.22 shows the distribution of anomaly scores at various settings of anom_thres. In general, the lower the setting, the higher the anomaly score. An example will help explain why this is the case. Consider two successive days of response times for a particular server that have the exact same shape. Let's say that the distribution of the first day yields an anomaly score of 150. If that is above the setting of anom_thres, then the day will not be added to the window, and the second day will yield the same score. On the other hand, if the anomaly score of 150 is below the threshold, then the first distribution will be added to the window, and the distribution will be part of the set of days used to define the normal basis, and the second distribution will yield a much lower anomaly score (although not necessarily zero). Thus, the higher the setting of anom_thres, the lower the anomaly score.

Under certain assumptions, we do not need to guess at a good setting of anom_thres. Recall that the distributions, represented as QFs, can be considered points in some high-dimensional space. The points are translated into the PCA-computed normal basis, which we will say uses u components to define normality. Thus the translated points now reside in u-dimensional space—plus one dimension for the error component. The mean of each coordinate in this (u+1)-dimensional space is zero, because we initially zero-centered the input data before doing PCA by subtracting the mean. Recall that the anomaly score is the sum-of-squares distance of the zero-centered test point in this space, in units of the standard deviation along each component. An equivalent way of measuring the "standardized distance" of the test point is to first divide the i coordinate of each zero-centered point by where a is the standard deviation along coordinate i, for i=1 . . . u. Considering each coordinate independently, each of them now has zero mean and a standard deviation of one, and the anomaly score is simply the square of the Euclidean distance to the test point.

If the QFs are distributed according to a (u+1)-variate Gaussian (or normal) distribution—in other words, if the distribution of values along each coordinate conforms to a Gaussian distribution—then the anomaly score corresponds exactly to the definition of a $x^2$ distribution with (u+1) degrees of freedom. Thus, if this assumption holds, we can then assign a likelihood of seeing the test point, where the likelihood ranges from zero to one, zero being impossible and one being certain. This would give us a nicer approach to the anomaly threshold, because it would be independent of u, whereas the current anomaly score tends to be larger as u is larger.

Unfortunately, this assumption frequently does not hold for our data. For example, see FIG. 4.23, which is a QQ (or quantile-quantile) plot of the first coordinate for a server. The QQ plot shows the quantile of the input distribution against the quantile of a Gaussian distribution with the same $\mu$ and $\sigma^2$ as the input distribution, to determine whether the input distribution is well described by a Gaussian distribution. If it is, the line will appear roughly linear, and it will appear closer to linear as the number of points in the distribution increases. In this QQ plot, there are 100 blue lines of random Gaussian distributions, each with a sample size equal to the number of samples in the input distribution. In this way, the blue lines provide an intuitive sense of the typical range of variation when given an input distribution that truly is Gaussian. The red line is the QQ line of the input distribution (i.e. the first coordinate of the QF points as translated into the normal basis). It is clearly very different, falling well outside the envelope of the blue lines; thus, the input data was not Gaussian. Hence, we cannot use the $x^2$ distribution when deciding whether a point was anomalous, and we must continue to use the more general anomaly score.

Timescales

Thus far, I have only discussed the anomaly detection methods at a generic level, not specifying the time-scale of the input distributions. All of the examples discussed so far have been at a time scale of one day (i.e. distributions of response times over a 24-hour period). Because a QF can be computed, in principle, for any distribution, my methods are in fact agnostic to the time-scale, as long as there are enough samples in each distribution (a caveat I will discuss later). This section shows how to use the anomaly detection methods at different time-scales. The goal here is to quickly detect performance issues as soon as possible after they occur.

To illustrate this issue, I will examine at different time-scales a performance issue that occurred in January of 2009 with one of the web servers in the UNC network. This particular web server is involved with registration-related tasks. In particular, this web server provides an interface to a course search engine, which searches for courses matching certain criteria (e.g. subject=COMP and availability=OPEN), and lists the results in a web page.

FIG. 4.44 shows the anomaly scores resulting from the same day-by-day analysis that we saw in the previous section, in which response time distributions from a full, 24-hour day comprise the individual QFs upon which the anomaly detection methods operate. The figure shows that the anomaly score steadily increases from Saturday, January 3rd until it reaches a critical anomaly on Tuesday, January 13th.

Instead of grouping 24 hours of response times into a distribution, I have aggregated only 6 hours, for a "quarter-day" time-scale. In this analysis, the response times occurring from midnight to 6 AM were considered group A, 6 AM to noon is group B, noon to 6 PM is group C, and 6 PM to midnight is group D. For a given day, each group was compared only with distributions from the same group, comprising four distinct anomaly detection tests per day (each with its own basis). In other words, all non-anomalous group A distributions formed a group A basis used in the anomaly test for the group A distribution from the current day, and likewise for groups B, C, and D. I used this approach because the response times, along with many other traffic characteristics, are not stable, but have diurnal patterns, fluctuating consistently through the course of a day, so it would therefore be unwise to compare e.g. noon traffic to midnight traffic. The results of the quarter-day analysis are shown in FIG. 4.45. Each quarter-day block is color-coded according to its anomaly score, as shown in the legend. Quarter-day blocks are colored black if there was a data collection outage for at least part of the block (i.e. the adudump process running on the monitor failed for some reason). The figure gives us greater resolution when viewing the overall issue. For example, we can now see that the early morning hours are often non-anomalous (and, in general, less anomalous) during the issue than are the other hours. Furthermore, the anomaly scores are in the critical area for the entire day except the early morning hours.

For even greater resolution, see FIG. 4.46. The idea is the same as the previous figure, except that instead of grouping response times by quarter-day, I group them by one hour periods. There is one additional feature of this figure: there are two blocks colored grey, which signifies that there were too few response times in the distribution to perform the anomaly detection. This situation occurs when there are fewer samples (or response times) than bins in the QF.

The hourly time-scale results in greater resolution, but it does so at a price. FIG. 4.46 shows that it also is a noisy analysis: there are many hours flagged as relatively severe anomalies whose neighbors are not anomalous, and there does not seem to be much stability as to whether each time of day is anomalous. Furthermore, many anomalies appear at the hourly time-scale for which the quarter-day analysis gives no indication. One could imagine a set of heuristics based on the hourly analysis to decide when to actually alert a human; for example, alert if five of the last eight hours were at least a error anomaly, or if seven of the last eight were at least a warning anomaly. However, these would add needless complexity and parameters to the anomaly detection system.

The hourly time-scale is noisy because there are relatively few response times in each distribution. This increases the effects of sampling error and results in an analysis that we have less confidence in. Ideally, we would like a method that reacts quickly to new response times yet does not suffer from sampling error.

I have made steps towards this ideal by implementing a sort of rolling-window time-scale. I aggregate response times over a 24-hour period, yet I advance this 24-hour window every 15 minutes. This solution achieves both robustness to sampling error as well as a quick reaction to new response times. FIG. 4.47 shows the results of this "rolling-day" analysis. The anomaly scores increase and decrease more gradually, and in general the time-series is more stable. At the same time, however, long response times quickly influence the anomaly score. Note that, as the grey blocks indicate, I do not test a rolling-day distribution unless it is entirely unaffected by outages.

The rolling-day analysis can potentially introduce more computational overhead than could keep up with the incoming data. A naive approach would involve joining 96 quarter-hour distributions, every 15 minutes. I will outline a better approach, and the one I actually used, here. Assign each quarter-hour distribution its respective number: the midnight until 12:15 AM distribution gets the number 0, the 12:15-12:30 AM distribution gets the number 1, and so on. Furthermore, consider these numeric labels in binary. Every second quarter-hour distribution (i.e. those whose binary numeric labels end in "1"), combine the distribution with the previous distribution to form a half-hour distribution, and save the result. Every fourth distribution (i.e. those whose binary labels end in "11"), combine and save the half-hour distribution as before, and also combine and save the hour distribution. At every eighth distribution, do the same with half-hour, hour, and two-hour distributions. Continuing on in this fashion up to the 16-hour distribution, I form a hierarchy of saved combinations in the form of a binary tree. I can then exploit this tree to compute the rolling-day analysis by combining $\lceil \log_2(96) \rceil = 7$ distributions (6 combinations), rather than 96 distributions (95 combinations), thus achieving the same results with a fifteen-fold reduction in the number of combinations and a large speed increase.

Ordinal Analysis

This section introduces what I call ordinal analysis. In an ordinal analysis, the emphasis is on the order of a request, response, or response time within its connection. In ordinal" analysis, for a given server, there is a likely correlation between the first response times of connections, so it makes sense to consider all first response times as a group, all second response times as a group, etc. For example, consider all the response times for a particular server on a particular day. Instead of treating the entire set as a single distribution, I partition the set by the ordinal of the response time within its connection, so that the set of e.g. first response times from each connection comprises the distribution for ordinal 1, the set of second response times comprises the distribution for ordinal 2, etc.

In this way, I can account for the commonalities among connections imposed by the application protocol. For example, an SMTP dialog has some number of smaller requests and responses, followed by a large request that contains an email message. There are also commonalities imposed by a particular instance of a server. For example, some web servers, such as those hosting a portal or content management system, might dedicate the first one or two exchanges of each connection to authentication and session management, saving the real work for later exchanges, thus making it likely that the first one or two response times are much shorter than the third. In any event, an ordinal analysis gives visibility into the statistically "typical" connection, which can unlock deeper insights into the differences between the connections comprising normal versus anomalous traffic.

I use ordinal analysis several different ways. First, I can simply compare the distributions of e.g. first response times (or second response times, or first request sizes, et cetera) between normal and anomalous traffic—assuming, as always, that there are a sufficient number of measurements. However, I can also do a full discrimination analysis on a particular response time ordinal. For example, perhaps the regular anomaly detection test (involving all the response times for a server) reveals an anomaly, but the first and third response times are not anomalous. Then we might conclude that the second response time is the cause of the problems. In general, the ordinal analysis can provide insight into the nature of performance issues.

Resetting the Basis

Sometimes, the traffic for a server shifts profoundly and permanently, resulting in continuous, unceasing anomalies. For example, an SMTP server may begin having critical anomalies on Tuesday, Feb. 3, 2009, and not stop for weeks. In such cases, the network manager might wish to change the definition of normality for the server, essentially saying that what is normal for this server has changed. My methods allow for such a redefinition, which I call "resetting the basis".

Recall that the definition of normal is computed by doing PCA on a set of training distributions. Recall also that, although this definition of normal evolves over time, distributions deemed to be anomalous are not included. Typically, the set of training distributions will be bootstrapped (or cross-validated) to eliminate dissimilar distributions from the set. However, I also allow the network manager the ability to manually override the cross-validation step, giving him manual control over the selection of training distributions. If he simply includes some of the previously anomalous distribution in the set of distributions used as input to the PCA-based normal basis definition, other distributions that are anomalous in a similar way will then be considered normal.

The disclosure of each of the following references is hereby incorporated herein by reference in its entirety.

REFERENCES

[1] A. Feldmann, "BLT: Bi-Layer Tracing of HTTP and TCP/IP," in Proc. of WWW-9, 2000.

[2] D. P. Olshefski, J. Nieh, and E. Nahum, "ksniffer: determining the remote client perceived response time from live packet streams," in Proc. OSDI, 2004, pp. 333-346.

[3] D. Olshefski and J. Nieh, "Understanding the management of client perceived response time," in ACM SIGMET-RICS Performance Evaluation Review, 2006, pp. 240-251.

[4] F. Smith, F. Hernandez-Campos, and K. Jeffay, "What TCP/IP Protocol Headers Can Tell Us About the Web," in Proceedings of ACM SIGMET-RICS '01, 2001.

[5] M. C. Weigle, P. Adurthi, F. Hernandez-Campos, K. Jeffay, and F. Smith, "Tmix: a tool for generating realistic TCP application workloads in ns-2," in ACM SIGCOMM CCR, vol. 36, no. 3, 2006, pp. 65-76.

[6] F. Hernandez-Campos, "Generation and Validation of Empirically-Derived TCP Application Workloads," Ph.D. dissertation, Dept. of Computer Science, UNC Chapel Hill, 2006.

[7] F. Hernandez-Campos, K. Jeffay, and F. Smith, "Modeling and Generation of TCP Application Workloads," in Proc. IEEE Int'l Conf. on Broadband Communications, Networks, and Systems, 2007.

[8] R. E. Broadhurst, "Compact Appearance in Object Populations Using Quantile Function Based Distribution Families," Ph.D. dissertation, Dept. of Computer Science, UNC Chapel Hill, 2008.

[BC98] Paul Barford and Mark Crovella. Generating representative web workloads for network and server performance evaluation. In ACM SIGMETRICS Performance Evaluation Review, pages 151-160,1998.

[BCG+07] Paramvir Bahl, Ranveer Chandra, Albert Greenberg, Srikanth Kandula, David A. Maltz, and Ming Zhang. Towards highly reliable enterprise network services via inference of multi-level dependencies. In SIGCOMM '07: Proceedings of the 2007 conference on Applications, technologies, architectures, and protocols for computer communications, pages 13-24, New York, N.Y., USA, 2007. ACM Press.

[Bro08] Robert Elijah Broadhurst. Compact Appearance in Object Populations Using Quantile Function Based Distribution Families. PhD thesis, Dept. of Computer Science, UNC Chapel Hill, 2008.

[CKK01] Kenjiro Cho, Ryo Kaizaki, and Akira Kato. Aguri: An aggregation-based traffic profiler. In COST 263: Proceedings of the Second International Workshop on Quality of Future Internet Services, pages 222-242, London, UK, 2001. Springer-Verlag.

[ESV03] Cristian Estan, Stefan Savage, and George Varghese. Automatically inferring patterns of resource consumption in network traffic. In SIGCOMM '03: Proceedings of the 2003 conference on Applications, technologies, architectures, and protocols for computer communications, pages 137-148, New York, N.Y., USA, 2003. ACM Press.

[FDL+01] Chuck Fraleigh, Christophe Diot, Bryan Lyles, Sue Moon, Philippe Owezarski, Dina Papagiannaki, and Fouad Tobagi. Design and Deployment of a Passive Monitoring Infrastructure. In Lecture Notes in Computer Science, 2170:556-567, 2001.

[Fel00] Anja Feldmann. Blt: Bi-layer tracing of http and tcp&slash;ip. Comput. Netw., 33(1-6):321-335,2000.

[FVCT02] Yun Fu, Amin Vandat, Ludmila Cherkasova, and Wenting Tang. Ete: Passive end-to-end internet service performance monitoring. In ATEC '02: Proceedings of the General Track of the annual conference on USENIX Annual Technical Conference, pages 115-130, Berkeley, Calif., USA, 2002. USENIX Association.

[GKMS01] A. Gilbert, Y. Kotidis, S. Muthukrishnan, and M. Strauss. Quicksand: Quick summary and analysis of network data dimacs technical report, 2001.

[HBP+05] Alefiya Hussain, Genevieve Bartlett, Yuri Pryadkin, John Heidemann, Christos Papadopoulos, and Joseph Bannister. Experiences with a continuous network tracing infrastructure. In Proc. SIGCOMM MineNet, pages 185-190, 2005.

[HC06] Felix Hernandez-Campos. Generation and Validation of Empirically-Derived TCP Application Workloads. PhD thesis, Dept. of Computer Science, UNC Chapel Hill, 2006.

[HCJS07a] Felix Hernandez-Campos, Kevin Jeffay, and F. Donelson Smith. Modeling and Generating TCP Application Workloads. In Proc. IEEE Broadnets, 2007.258

[HCJS07b] Felix Hernandez-Campos, Kevin Jeffay, and F. D. Smith. Modeling and Generation of TCP Application Workloads. In Proc. IEEE Intl Conf. on Broadband Communications, Networks, and Systems, 2007.

[LH02] Kun-Chan Lan and John Heidemann. Rapid model parameterization from traffic measurements. ACM Trans. Model. Comput. Simul., 12(3):201-229, July 2002.

[MJ98] Robert G. Malan and Farnam Jahanian. An extensible probe architecture for network protocol performance measurement. In SIGCOMM '98: Proceedings of the ACM SIGCOMM '98 conference on Applications, technologies, architectures, and protocols for computer communication, pages 215-227, New York, N.Y., USA, 1998. ACM.

[ON06] David Olshefski and Jason Nieh. Understanding the management of client perceived response time. In SIGMETRICS '06/Performance '06: Proceedings of the joint international conference on Measurement and modeling of computer systems, pages 240-251, New York, N.Y., USA, 2006. ACM.

[ONA04] David Olshefski, Jason Nieh, and Dakshi Agrawal. Using certes to infer client response time at the web server. ACM Trans. Comput. Syst., 22(1):49-93, February 2004.

[ONN04] David P. Olshefski, Jason Nieh, and Erich Nahum. ksniffer: determining the remote client perceived response time from live packet streams. In OSDI '04: Proceedings of the 6th conference on Symposium on Opearting Systems Design & Implementation, page 23, Berkeley, Calif., USA, 2004. USENIX Association.

[Pax99] Vern Paxson. Bro: A system for detecting network intruders in real-time. In Computer Networks 31(23-24), pages 2435-2463, 1999.

[Plo00] Dave Plonka. Flowscan: A network traffic flow reporting and visualization tool. In LISA '00: Proceedings of the 14th USENIX conference on System administration, pages 305-318, Berkeley, Calif., USA, 2000. USENIX Association.

[Sha48] Claude E. Shannon. A mathematical theory of communication. Bell System Technical Journal, 27:379-423, 623-656, July, October 1948.

[SHCJ01] F. D. Smith, Felix Hernandez-Campos, and Kevin Jeffay. What TCP/IP Protocol Headers Can Tell Us About the Web. In Proceedings of ACM SIGMETRICS '01, 2001.

[Udu96] Divakara K. Udupa. In Network Management System Essentials. McGraw-Hill, USA, 1996.

[VV06] Kashi V. Vishwanath and Amin Vandat. Realistic and responsive network traffic generation. In SIGCOMM '06: Proceedings of the 2006 conference on Applications, technologies, architectures, and protocols for computer communications, pages 111-122, New York, N.Y., USA, 2006. ACM.

[WAHC+06] Michele C. Weigle, P. Adurthi, Felix Hernandez-Campos, Kevin Jeffay, and F. D. Smith. Tmix: a tool for generating realistic TCP application workloads in ns-2. In ACM SIGCOMM CCR, volume 36, pages 65-76, 2006.

The disclosure of the dissertation entitled, "Passive, automatic detection of network server performance anomalies in large networks" submitted by Jeffrey Terrell in 2009 to the University of North Carolina at Chapel Hill Department of Computer Science is incorporated herein by reference in its entirety.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for real-time computation of an endpoint performance measure based on transport and network layer header information, the method comprising:
   (a) passively collecting transport and network layer header information from packet traffic in a network;
   (b) modeling connections in the network using an abstract syntax for characterizing a sequence of bidirectional application-level interactions between endpoints of each connection and delays between the interactions;
   (c) determining application-level characteristics of the packet traffic based on the modeled connections, wherein determining the application level characteristics includes creating a performance profile that provides a representation of normal performance of an endpoint under network conditions of interest;
   (d) computing a performance measure of at least one endpoint based on the application-level characteristics and the modeled connections; and
   (e) detecting a performance anomaly of the endpoint by comparing the computed performance measure to the performance profile.

2. The method of claim 1 wherein passively collecting transport and network layer header information includes collecting transport and network layer header information without installing monitoring software on any of the endpoints and without initiating communications with any of the endpoints.

3. The method of claim 1 wherein passively collecting transport and network layer header information from packet traffic includes monitoring packet traffic on a packet forwarding device in the network.

4. The method of claim 1 wherein passively collecting transport and network layer header information from packet traffic includes copying packets traversing links between the endpoints.

5. The method of claim 1 wherein detecting a performance anomaly includes comparing the computed performance measure to a historical performance measure associated with the endpoint at a previous point in time.

6. The method of claim 1 wherein detecting a performance anomaly includes determining a basis performance measure that describes a set of distributions of a performance metric for an endpoint, where the performance metric is observed multiple times per predetermined time period.

7. The method of claim 6 wherein the set of distributions of a performance metric includes at least one of distributions of response times, request sizes, and dialog lengths of a connection.

8. The method of claim 6 wherein detecting a performance anomaly includes determining at least one of a basis error, window size, training set size, number of bins, anomaly threshold, and timescale.

9. The method of claim 6 wherein the performance measure is computed in or near real-time.

10. The method of claim 6 wherein detecting a performance anomaly further comprises determining an anomaly measure that describes the extent to which the collected transport and network layer header information for the endpoint is not described by the basis performance measure.

11. The method of claim 10 wherein detecting a performance anomaly includes defining an anomaly threshold value and comparing the anomaly measure to the anomaly threshold value.

12. The method of claim 1 wherein modeling application-level connections includes modeling one of a sequential connection and a concurrent connection.

13. The method of claim 1 wherein modeling application-level connections includes cross-validating an input training set by selecting an input data set to use as the definition of normal behavior for a server and outputting an initial basis of normality for the server.

14. The method of claim 13 comprising changing the initial basis over time.

15. A method for real-time computation of an endpoint performance measure based on transport and network layer header information, the method comprising:
   passively collecting transport and network layer header information from packet traffic in a network;
   modeling connections in the network using an abstract syntax for characterizing a sequence of bidirectional application-level interactions between endpoints of each connection and delays between the interactions;
   determining application-level characteristics of the packet traffic based on the modeled connections;
   wherein computing a performance measure of an endpoint includes detecting a performance anomaly of the endpoint;
   wherein detecting a performance anomaly includes determining a basis performance measure that describes a set of distributions of a performance metric for an endpoint, where the performance metric is observed multiple times per predetermined time period;
   wherein detecting a performance anomaly further comprises determining an anomaly measure that describes the extent to which the collected transport and network layer header information for the endpoint is not described by the basis performance measure;
   wherein detecting a performance anomaly includes defining an anomaly threshold value and comparing the anomaly measure to the anomaly threshold value and further comprising;
   determining whether the anomaly measure has a predetermined relationship with the anomaly threshold value;
   in response to determining that the anomaly measure has the predetermined relationship with the anomaly threshold value, determining that a performance anomaly exists; and
   in response to determining that the anomaly measure does not have the predetermined relationship with the anomaly threshold value, determining that no performance anomaly exists.

16. A system for performing real-time computation of a server performance measure based on transport and network layer header information, the system comprising:
   at least one processor comprising a hardware element;
   a data collection module for passively collecting transport and network layer header information from packet traffic in a network; and
   a data processing module executable by the at least one processor for:
      modeling connections in the network using an abstract syntax for characterizing a sequence of bidirectional application-level interactions between endpoints of each connection and delays between the interactions;
      determining application-level characteristics of the packet traffic based on the modeled connections, wherein determining the application level characteristics includes creating a performance profile that provides a representation of normal performance of an endpoint under network conditions of interest;
      computing a performance measure of at least one endpoint based on the application-level characteristics and the modeled connections; and detecting a performance anomaly of the endpoint by comparing the computed performance measure to the performance profile.

17. The system of claim 16 wherein at least one of the endpoints includes one of a teleconferencing server, post office protocol (POP3) server, portal web server, and a simple mail transfer protocol (SMTP) server.

18. The system of claim 16 wherein the data collection module is located at packet forwarding device.

19. The system of claim 16 wherein the data collection module includes a network splitter for passively copying packets traversing links between the endpoints in or near real time.

20. A non-transitory computer-readable medium comprising computer executable instructions embodied in a tangible, non-transitory computer-readable medium and when executed by a processor of a computer performs steps comprising:

(a) passively collecting transport and network layer header information from packet traffic in a network;
(b) modeling connections in the network using an abstract syntax for characterizing a sequence of bidirectional application-level interactions between endpoints of each connection and delays between the interactions;
(c) determining application-level characteristics of the packet traffic based on the modeled connections, wherein determining the application level characteristics includes creating a performance profile that provides a representation of normal performance of an endpoint under network conditions of interest;
(d) computing a performance measure of at least one endpoint based on the application-level characteristics and the modeled connections; and
(e) detecting a performance anomaly of the endpoint by comparing the computed performance measure to the performance profile.

* * * * *